US010282766B2

(12) United States Patent
Rellas et al.

(10) Patent No.: US 10,282,766 B2
(45) Date of Patent: May 7, 2019

(54) DISTRIBUTION OF PRODUCTS

(71) Applicants: Nicholas Rellas, Sherborn, MA (US);
Justin Robinson, Cambridge, MA (US); Spencer Frazier, Boca Raton, FL (US)

(72) Inventors: Nicholas Rellas, Sherborn, MA (US);
Justin Robinson, Cambridge, MA (US); Spencer Frazier, Boca Raton, FL (US)

(73) Assignee: Drizly, Inc., Boston, MA (US)

( * ) Notice: Subject to any disclaimer, the term of this patent is extended or adjusted under 35 U.S.C. 154(b) by 629 days.

(21) Appl. No.: 13/742,004

(22) Filed: Jan. 15, 2013

(65) Prior Publication Data
US 2014/0201001 A1    Jul. 17, 2014

(51) Int. Cl.
| | |
|---|---|
| *G06Q 10/08* | (2012.01) |
| *G06Q 20/20* | (2012.01) |
| *G06Q 30/02* | (2012.01) |
| *G06Q 30/06* | (2012.01) |

(52) U.S. Cl.
CPC ....... *G06Q 30/0607* (2013.01); *G06Q 10/087* (2013.01); *G06Q 20/203* (2013.01); *G06Q 30/0261* (2013.01)

(58) Field of Classification Search
USPC ......................................................... 705/22
See application file for complete search history.

(56) References Cited

U.S. PATENT DOCUMENTS

| | | | |
|---|---|---|---|
| 6,782,369 B1 * | 8/2004 | Carrott | G06Q 10/0639 705/27.1 |
| 7,275,042 B1 | 9/2007 | Kelly | |
| 8,600,796 B1 * | 12/2013 | Sterne | G06Q 30/0201 705/7.29 |
| 8,880,427 B1 * | 11/2014 | Jones | G06Q 10/087 705/22 |
| 2002/0072984 A1 | 6/2002 | Rothman et al. | |
| 2002/0087408 A1 | 7/2002 | Burnett | |
| 2003/0069813 A1 * | 4/2003 | Burk | 705/28 |
| 2004/0068443 A1 * | 4/2004 | Hopson et al. | 705/26 |
| 2004/0243468 A1 | 12/2004 | Cohagan et al. | |
| 2004/0243472 A1 * | 12/2004 | Vadjinia | 705/15 |
| 2005/0216339 A1 * | 9/2005 | Brazell | G06Q 30/02 705/14.52 |
| 2006/0155556 A1 | 7/2006 | Harris | |
| 2006/0167878 A1 * | 7/2006 | Hartman | G06F 17/30306 |

(Continued)

OTHER PUBLICATIONS

Application including pending claims for U.S. Appl. No. 14/590,552 as of Jan. 29, 2014.
U.S. Appl. No. 14/590,552, filed Jan. 6, 2015 Pending.

*Primary Examiner* — Luna Champagne
(74) *Attorney, Agent, or Firm* — Danielson Legal LLC

(57) ABSTRACT

Among other things, information is maintained that associates competitors with respective territories for which the competitors have rights that are to be exclusive relative to other competitors for items associated with the territories. A user can enter, through a user interface, an expression of interest that can be associated with one of the territories. In response to the expression of interest, a user is automatically enabled to interact with the competitor that has the exclusive right to the territory, without automatically enabling the user to interact with a competitor that does not have the exclusive right.

9 Claims, 72 Drawing Sheets

(56) References Cited

U.S. PATENT DOCUMENTS

| | | |
|---|---|---|
| 2007/0106617 A1 | 5/2007 | Mabray et al. |
| 2008/0052091 A1 | 2/2008 | Vawter |
| 2008/0313060 A1* | 12/2008 | Damodaran ......... G06Q 10/087 |
| | | 705/28 |
| 2012/0030553 A1 | 2/2012 | Delpha et al. |
| 2012/0197975 A1 | 8/2012 | Samson et al. |
| 2013/0097055 A1 | 4/2013 | Kramer et al. |
| 2013/0112746 A1 | 5/2013 | Krell et al. |
| 2014/0095352 A1 | 4/2014 | Woodall et al. |
| 2015/0186963 A1 | 7/2015 | Rellas et al. |

* cited by examiner

FIGURE 11

C

Figure 11:
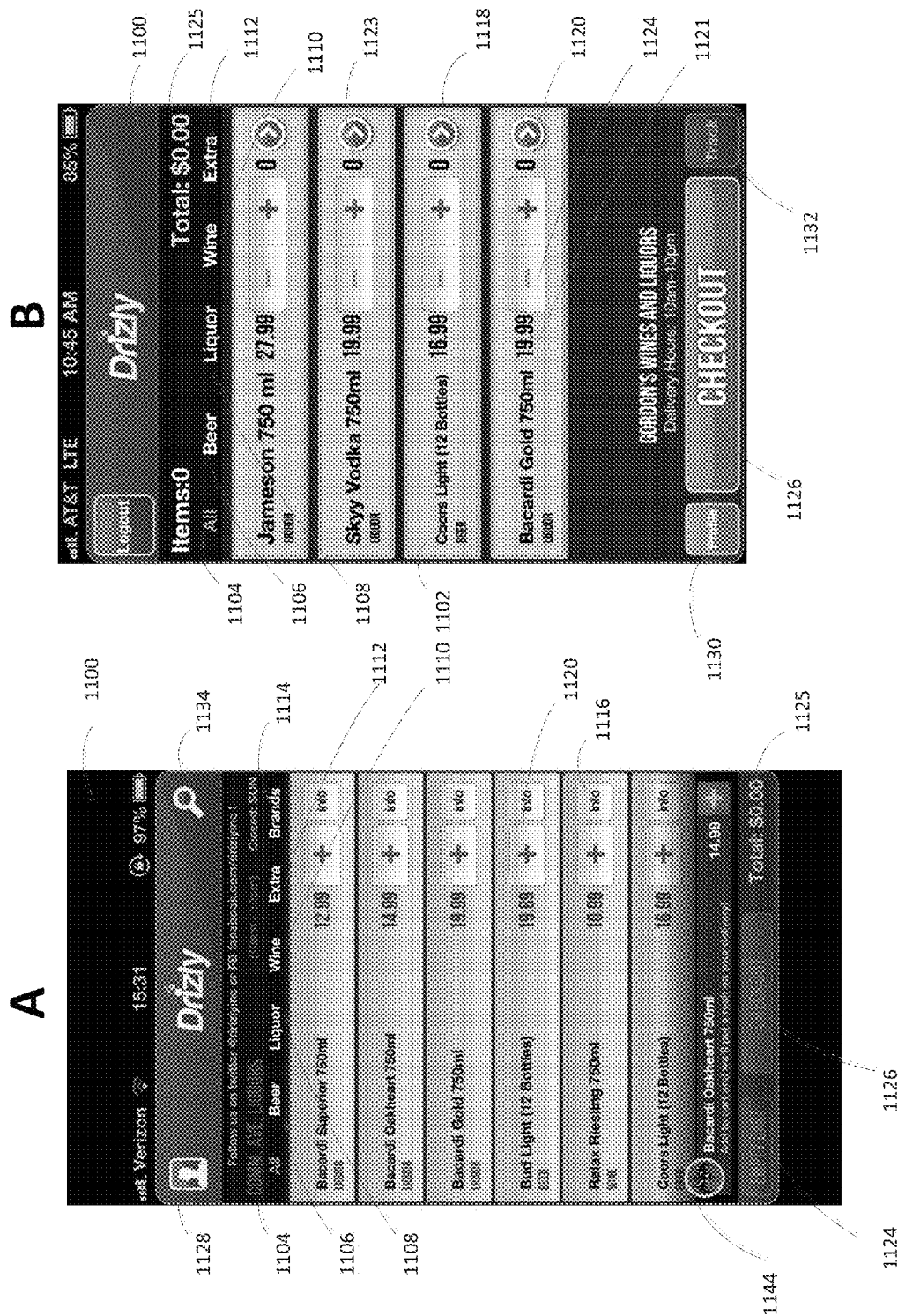

FIGURE 11
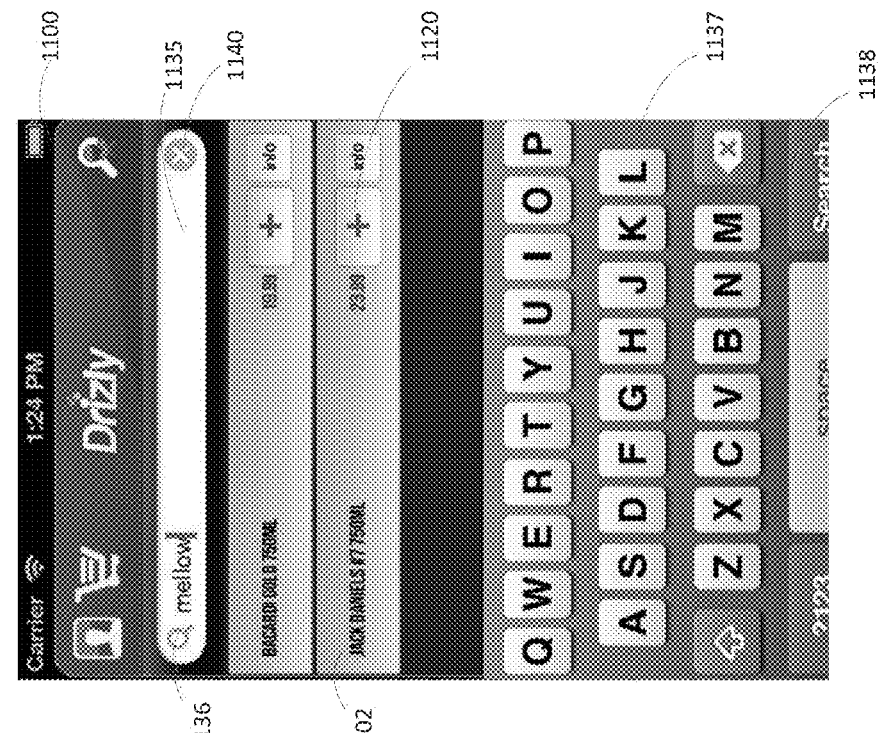
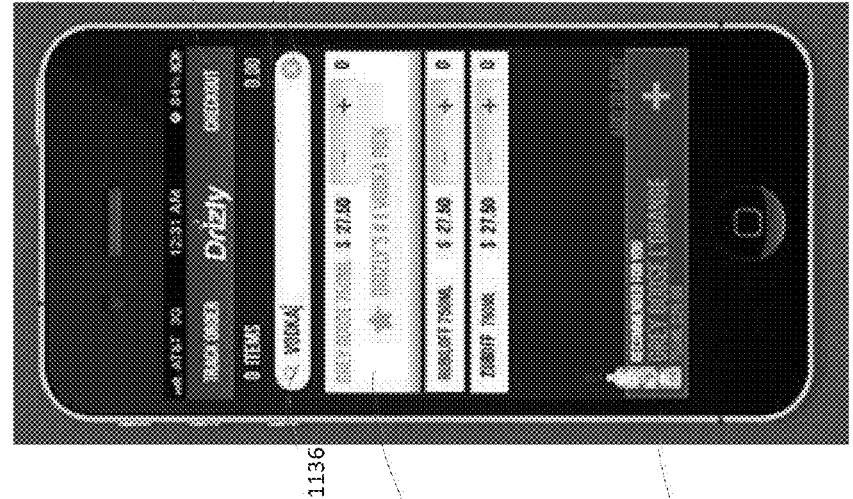

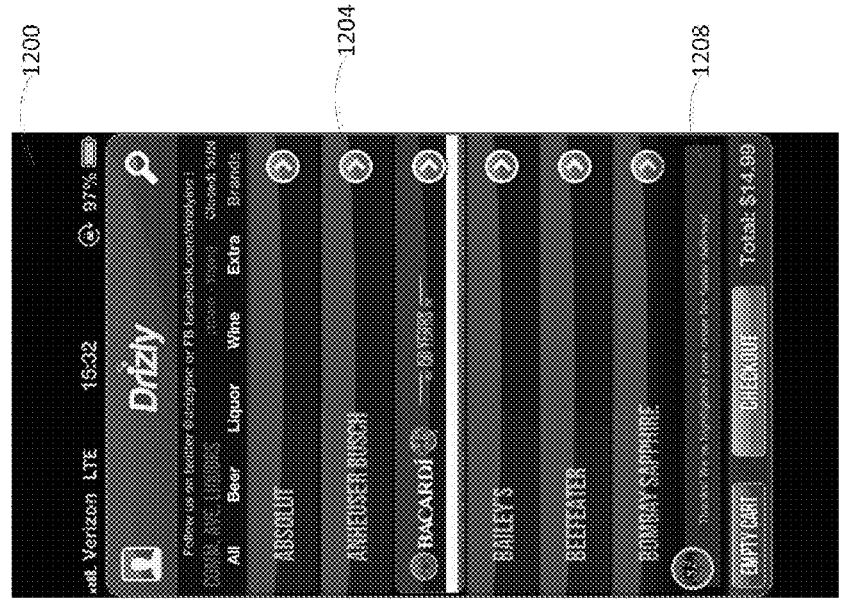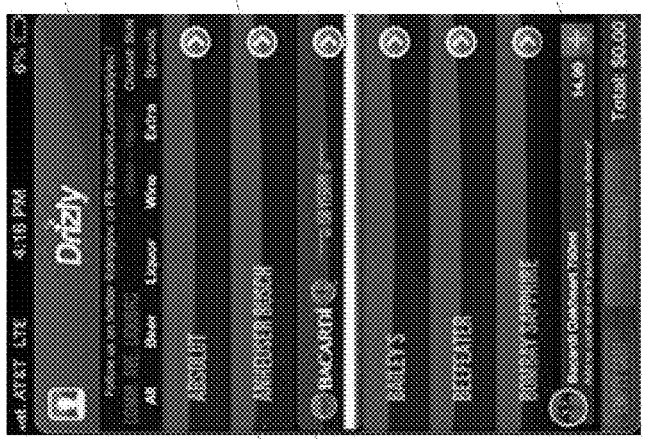
FIGURE 12

FIGURE 16
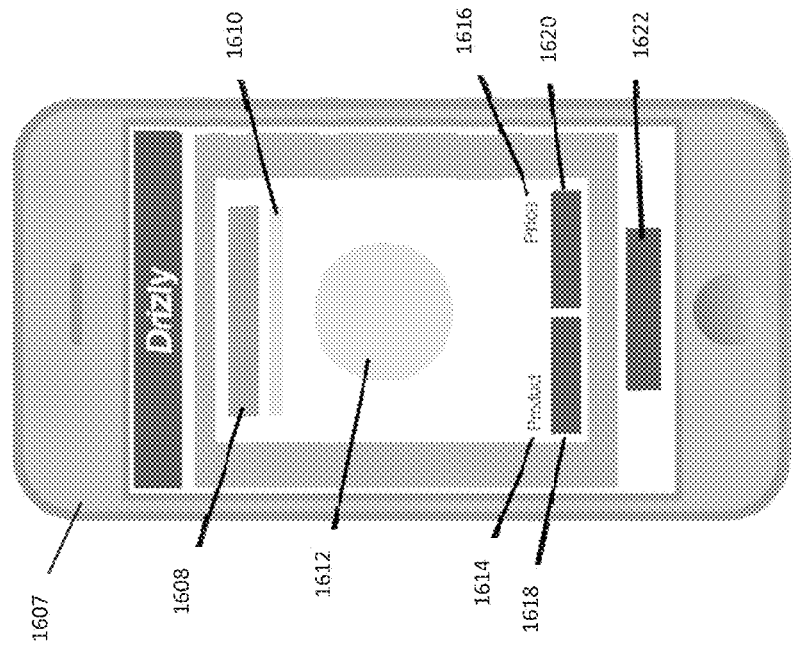
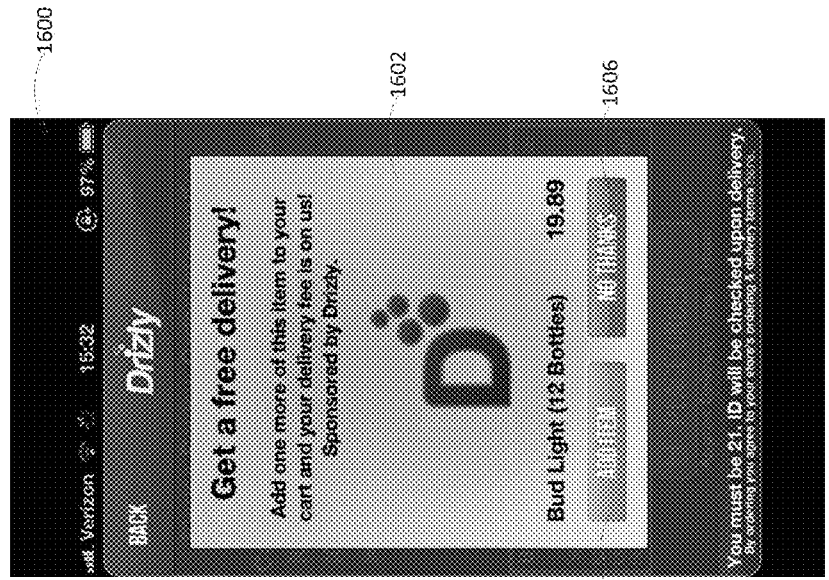

FIG. 17

Figure 20:
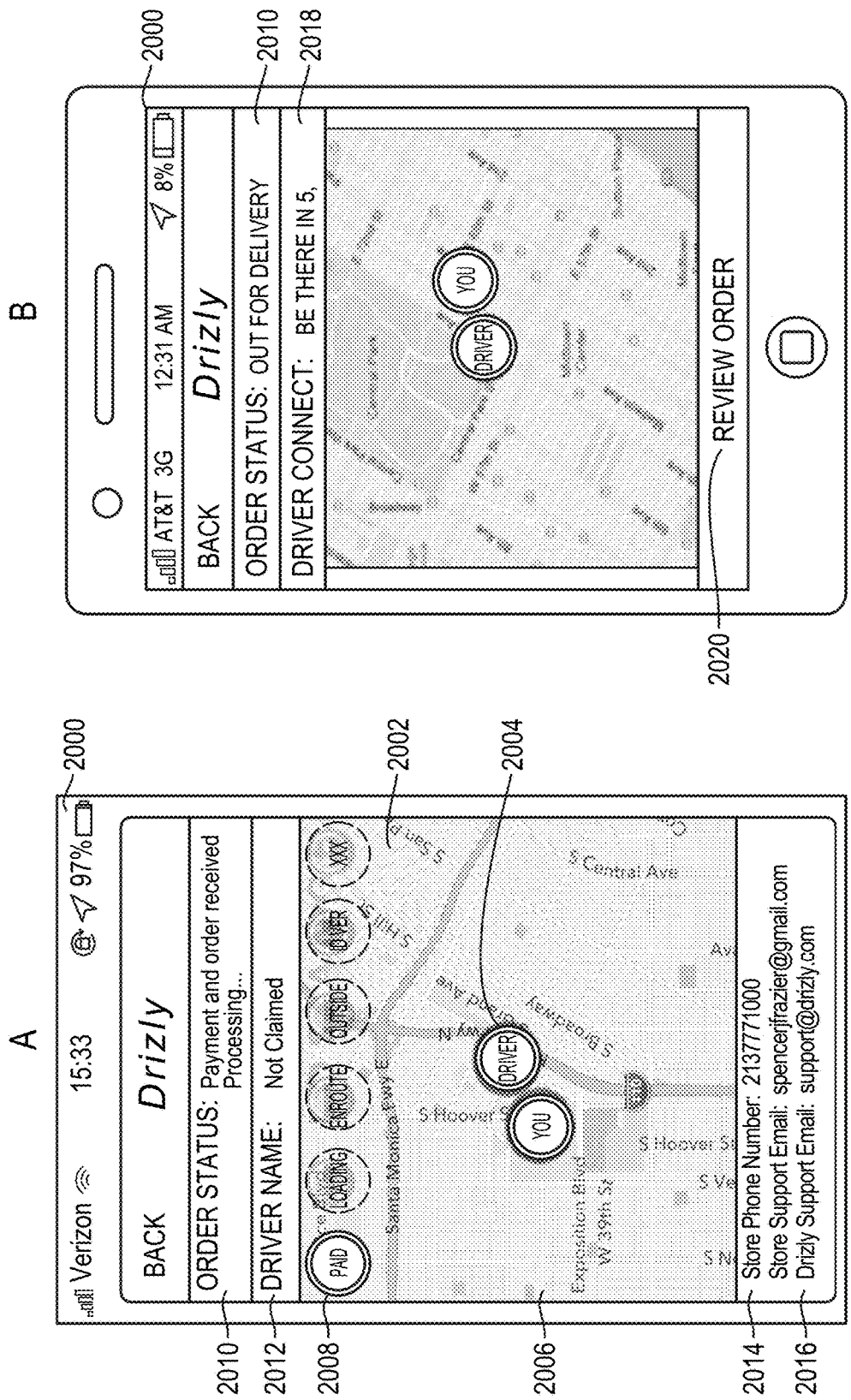
Figure 20:
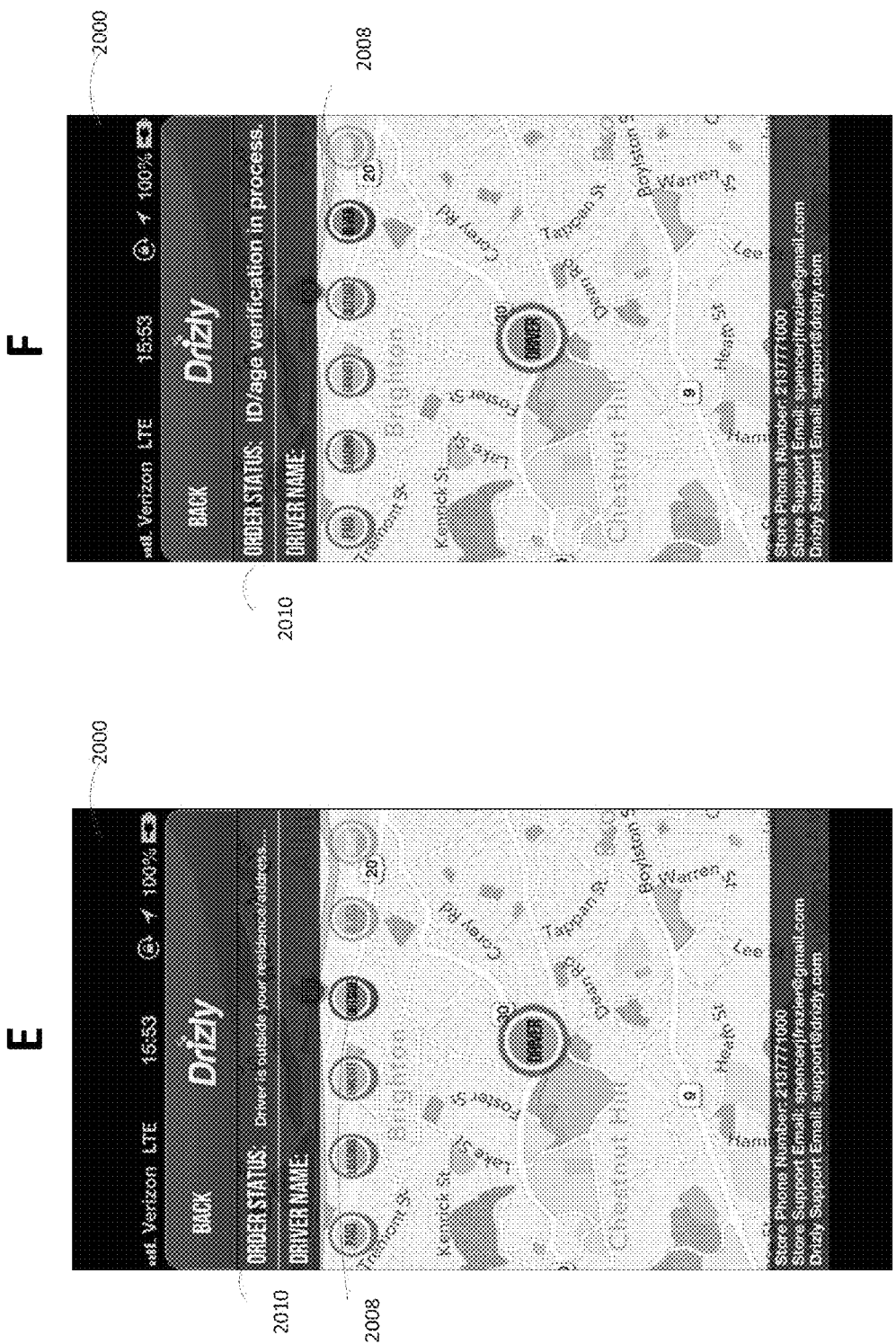
Figure 20:
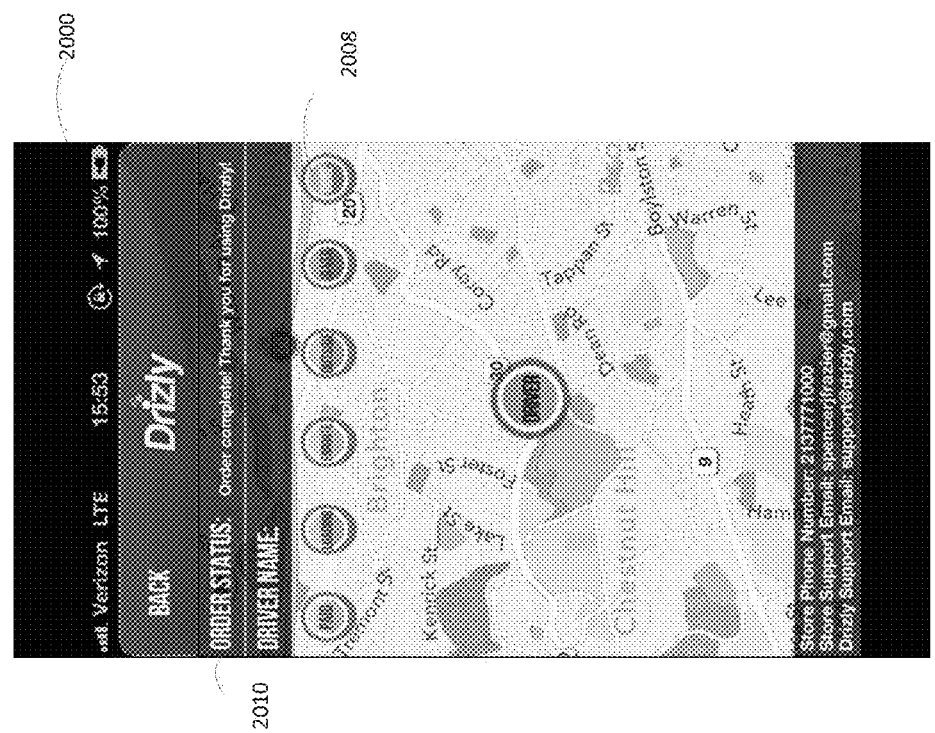

FIGURE 20
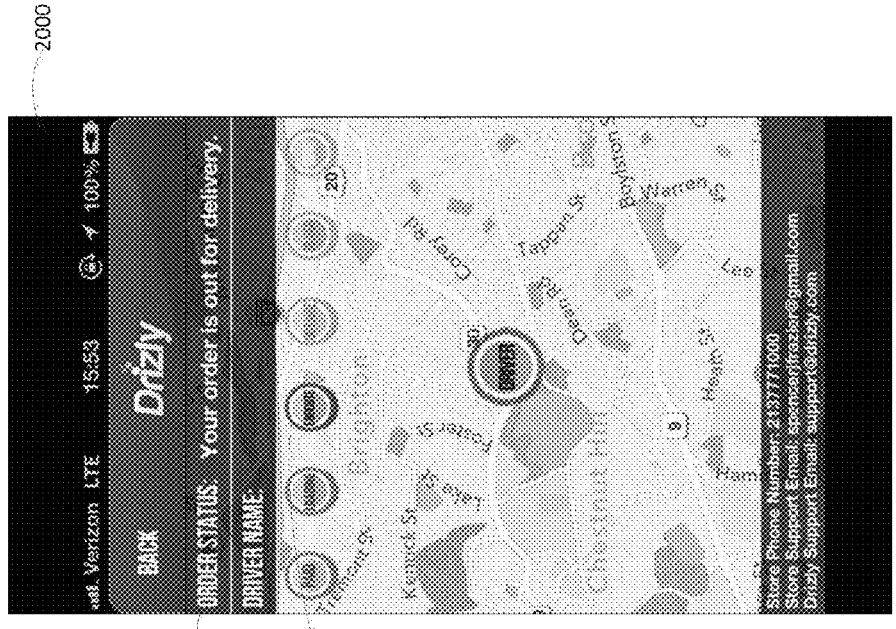
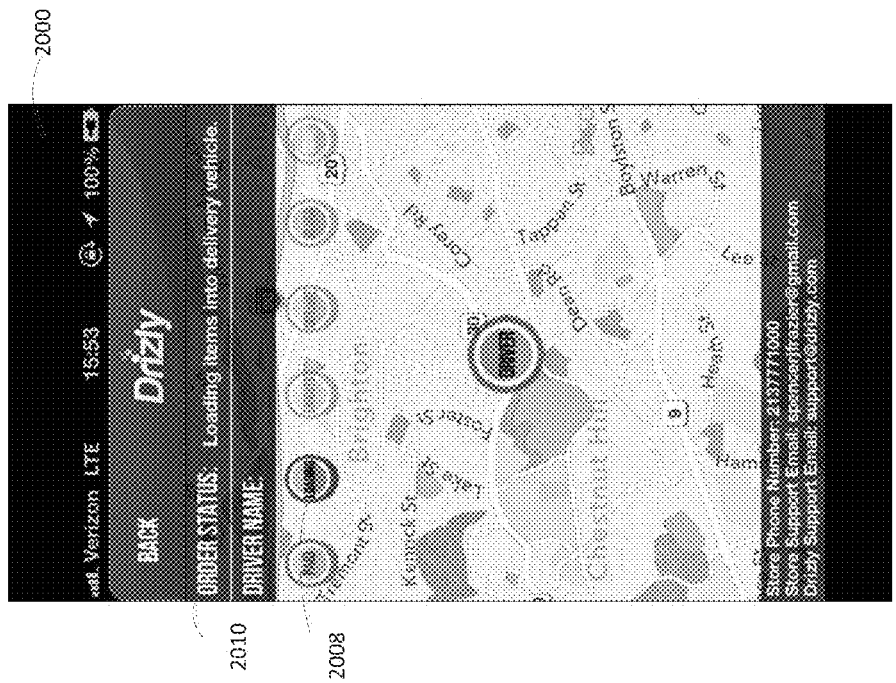

FIGURE 22

Figure 22:
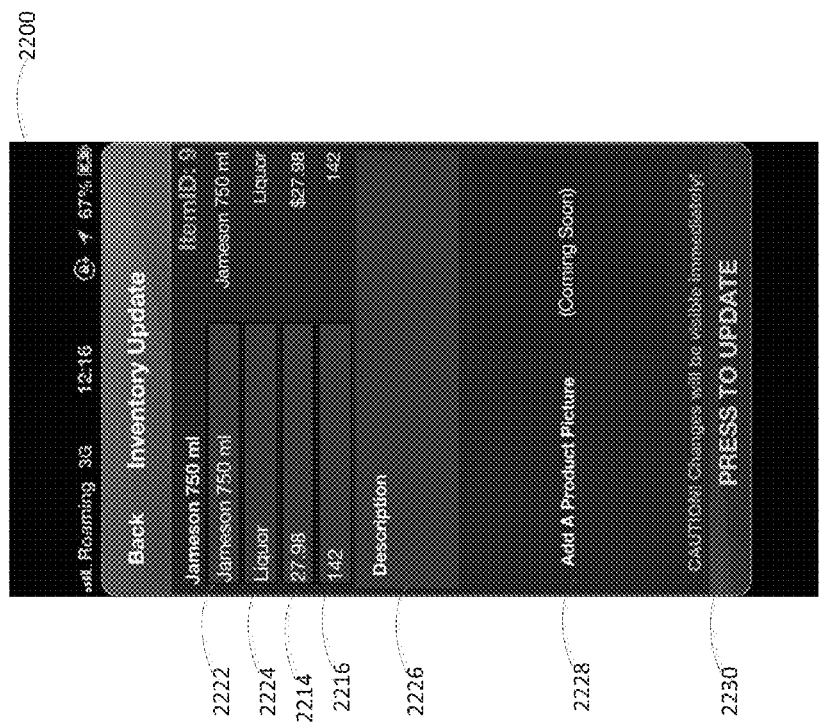

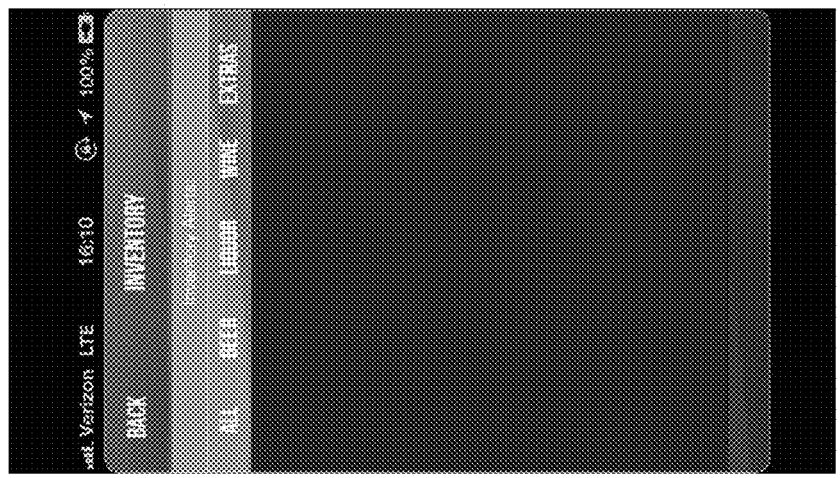
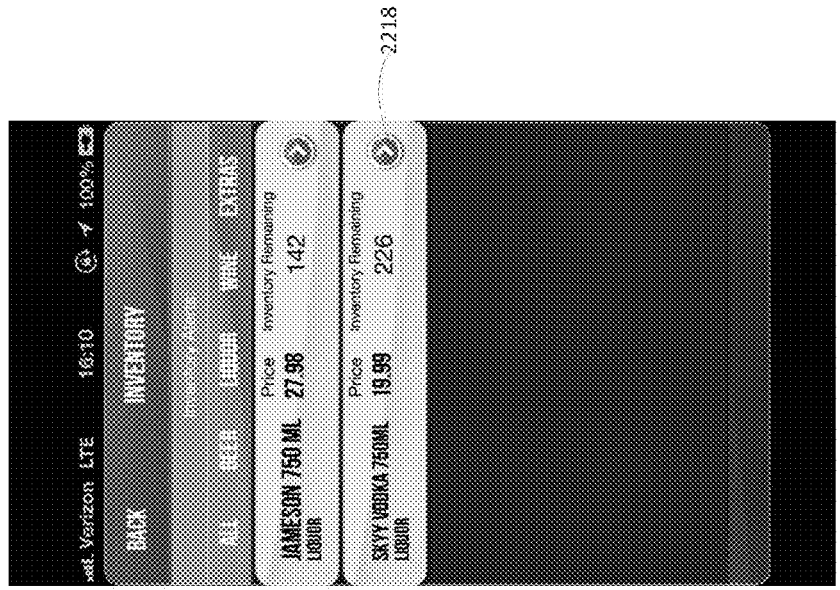
FIGURE 22

FIGURE 23
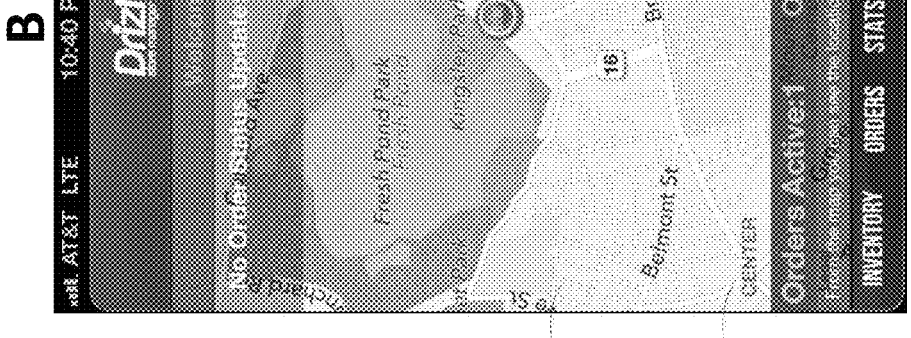
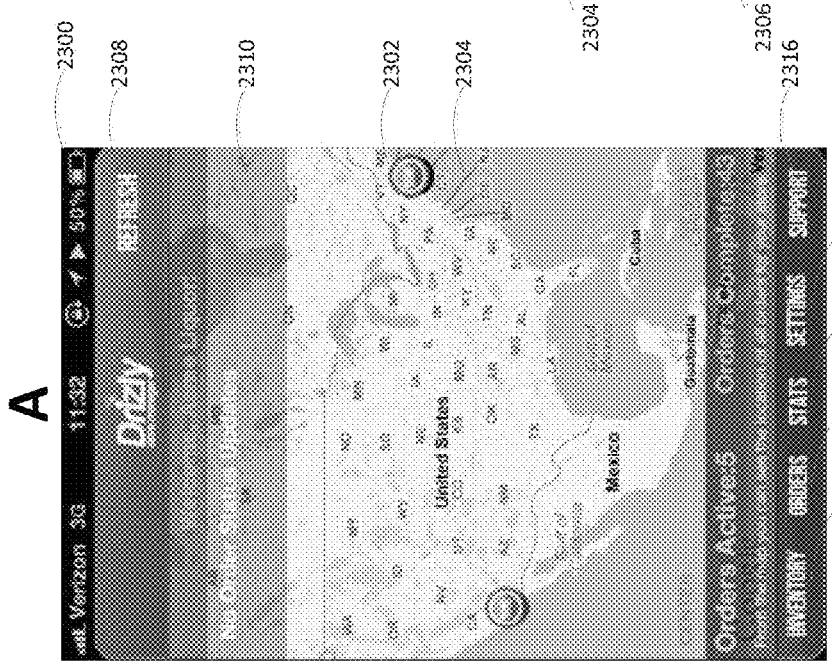

FIGURE 23
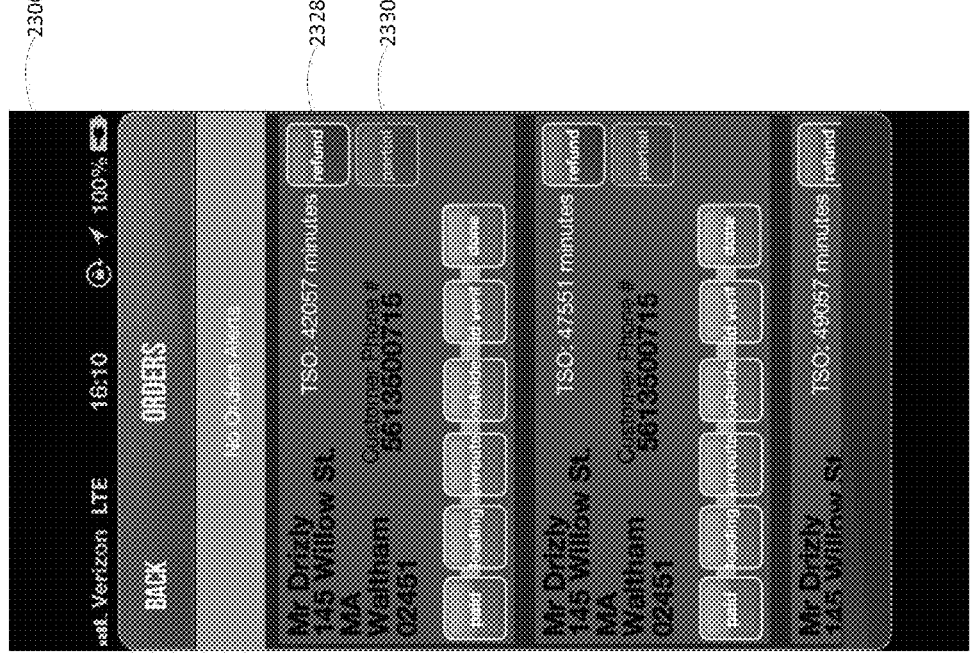
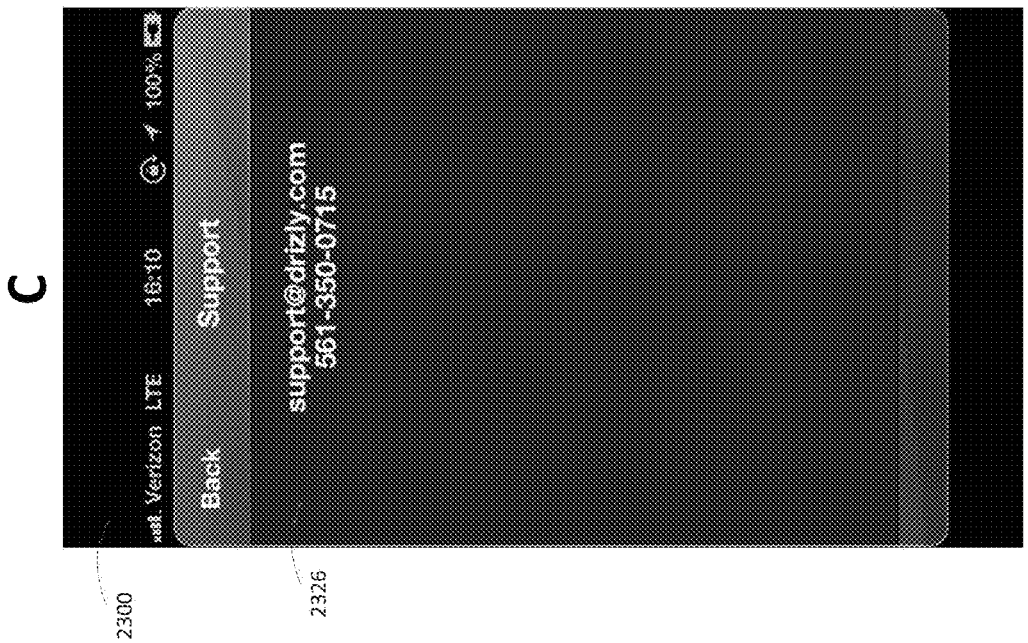

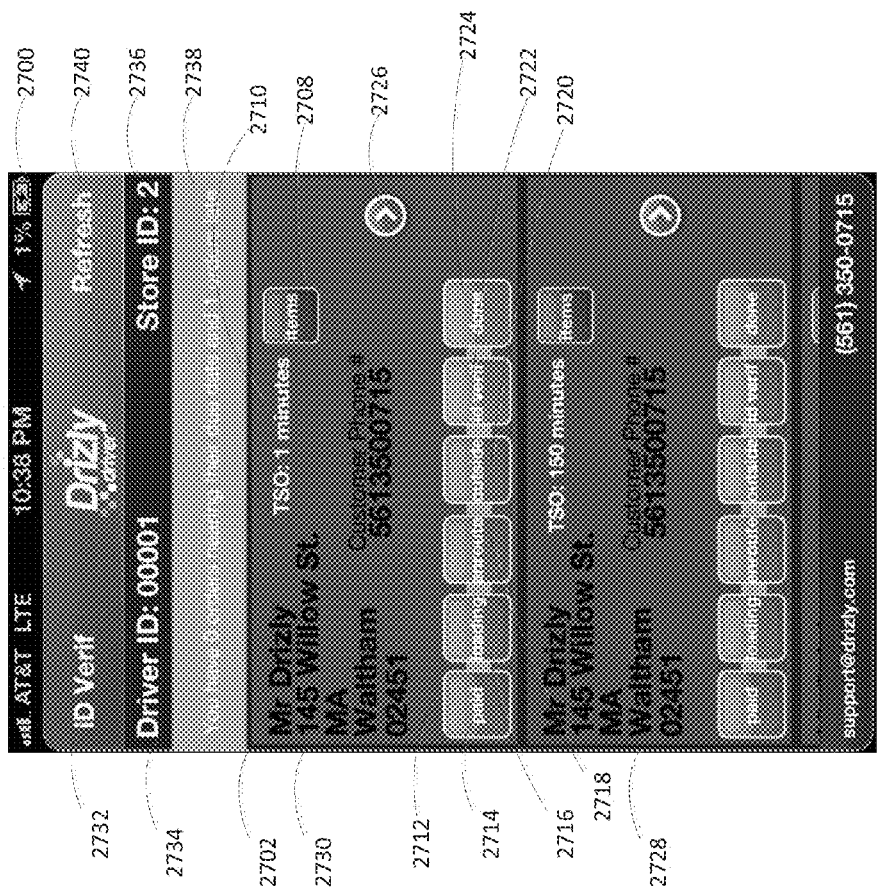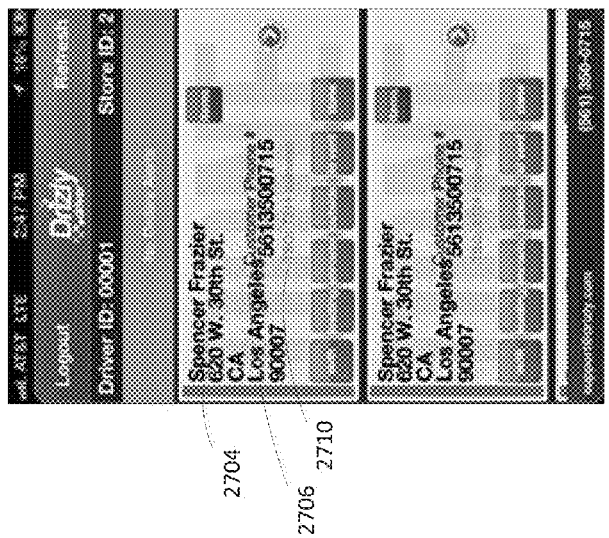
FIGURE 27

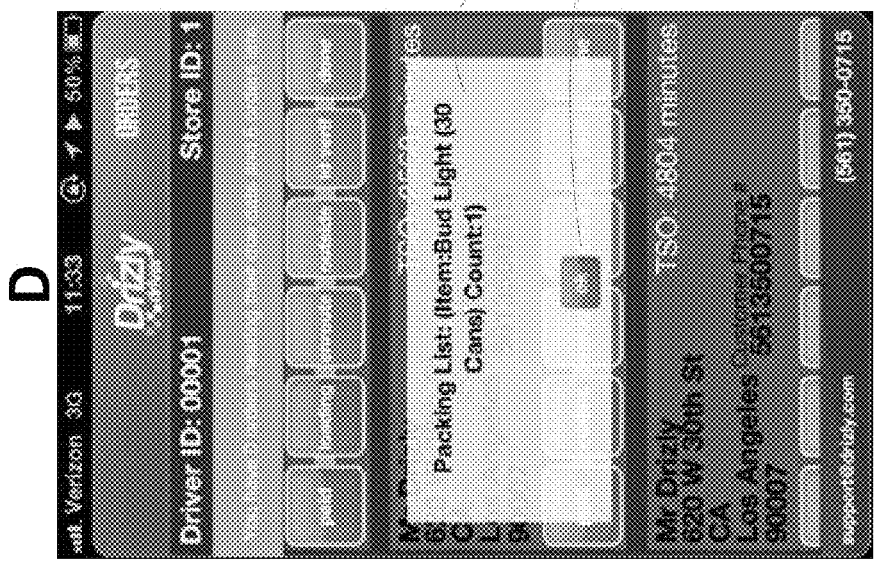
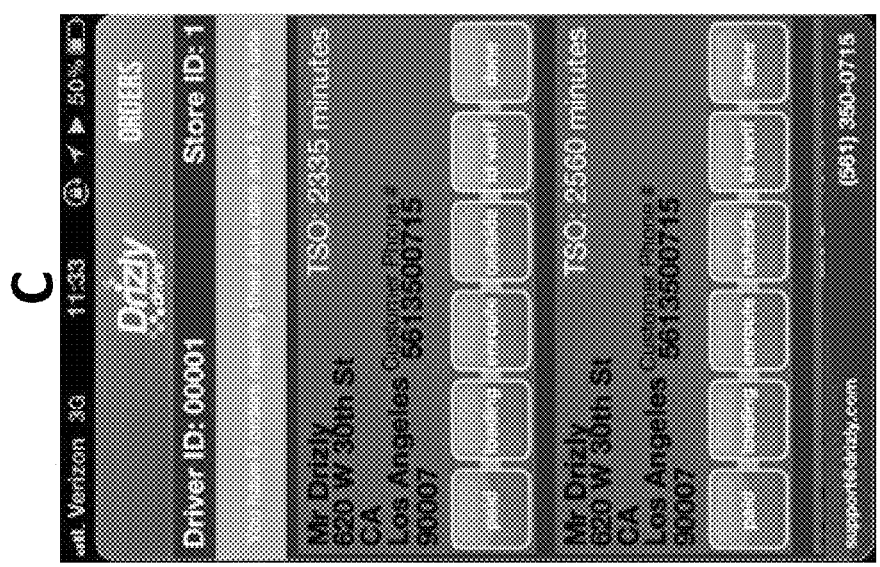
FIGURE 27

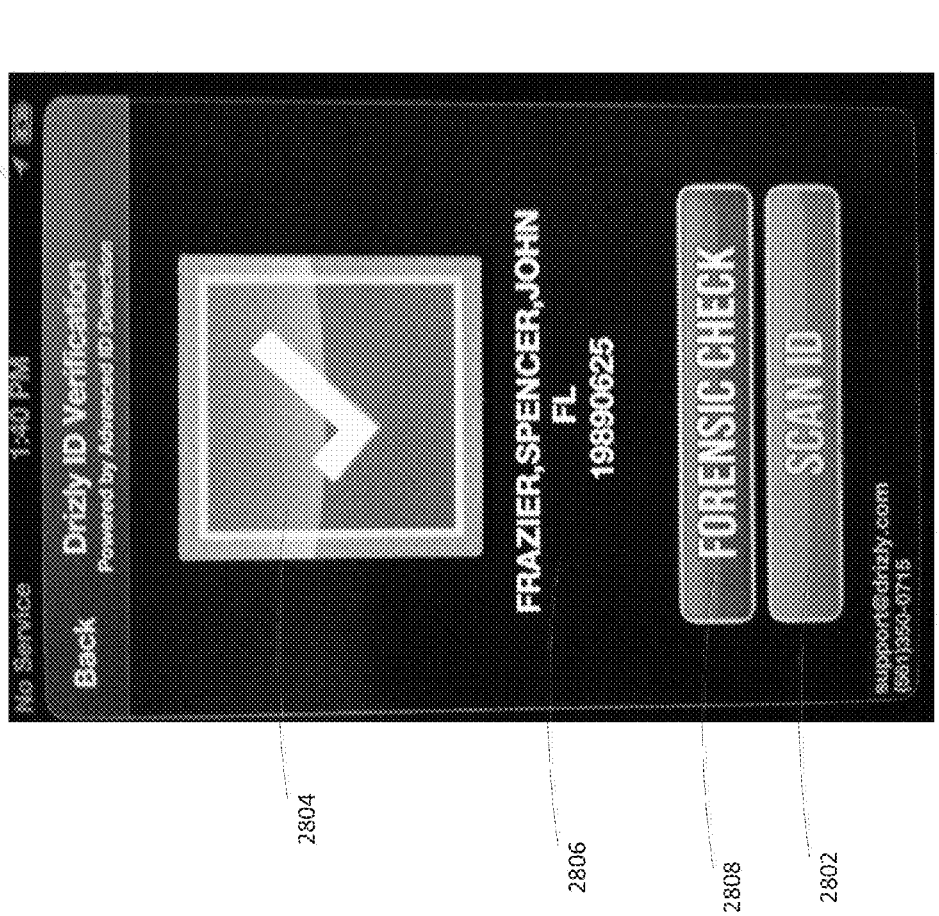
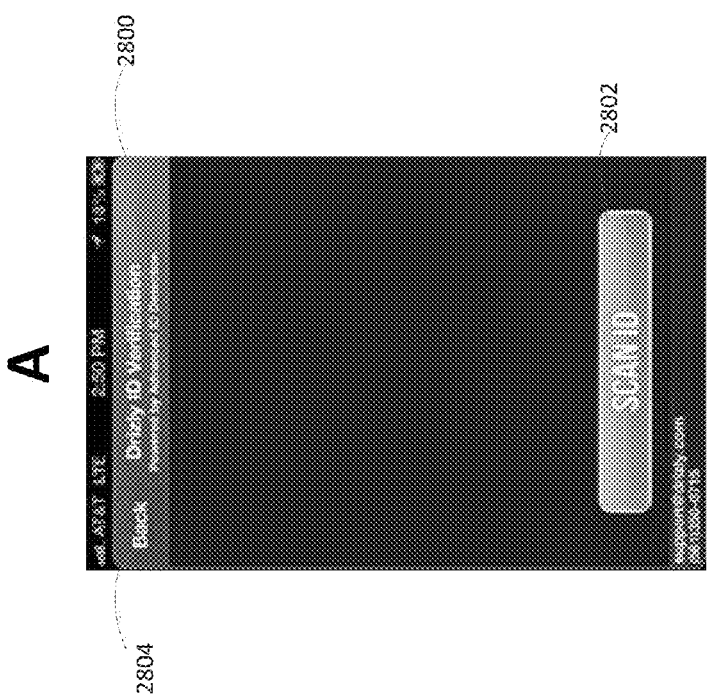
FIGURE 28

- PRINTING
  - Deliberate Errors/known flaws
  - Duplex Patterns (2 color)
  - Fine Line Background (Guilloche)
  - Fine Line Foreground
  - Front to Back see through register
  - Ghost Image
  - Lavered printing
  - Micro optical imaging (12000 dj)
  - Microprinting/Nanoprinting
  - Moire pattern
  - Non standard Type fonts
  - Rainbow printing
  - Security code

- INKS
  - Chemically reactive
  - IR fluorescent
  - IR dropout
  - Metallic, pearlescent, iridescent
  - Metameric
  - Phosphorescent
  - Tagged
  - Thermochromatic
  - UV fluorescence

- SUBSTRATE INCLUSION
  - Core inclusion
  - Embedded thread, fiber
  - Opacity Mark
  - Security Bonding
  - UV Features
  - Metalized DOVID
  - De-metalized OVD
  - Transparent DOVID
  - Film - Color Shifting OVD
  - Ink - Color Shifting OVD
  - Liquid Crystal - Color Shifting OVD
  - Personalized OVD
  - Virtual Image OVD

- PHYSICAL SECURITY FEATURE
  - Biometric feature
  - Covert Device (2D BC)
  - Covert Variable Pixel Manipulation
  - Digital Seal
  - Embedded Image
  - Laminates (security)
  - Laser encoded optical image
  - Laser Engraving
  - Laser Perforation
  - Machine Readable Technology
  - Magnetic Media Fingerprinting
  - Optical Media Fingerprinting
  - Optical Watermark
  - Overlay
  - Overlapping Data
  - Redundant Data
  - Retroreflective Device

FIG. 28C

Figure 30:
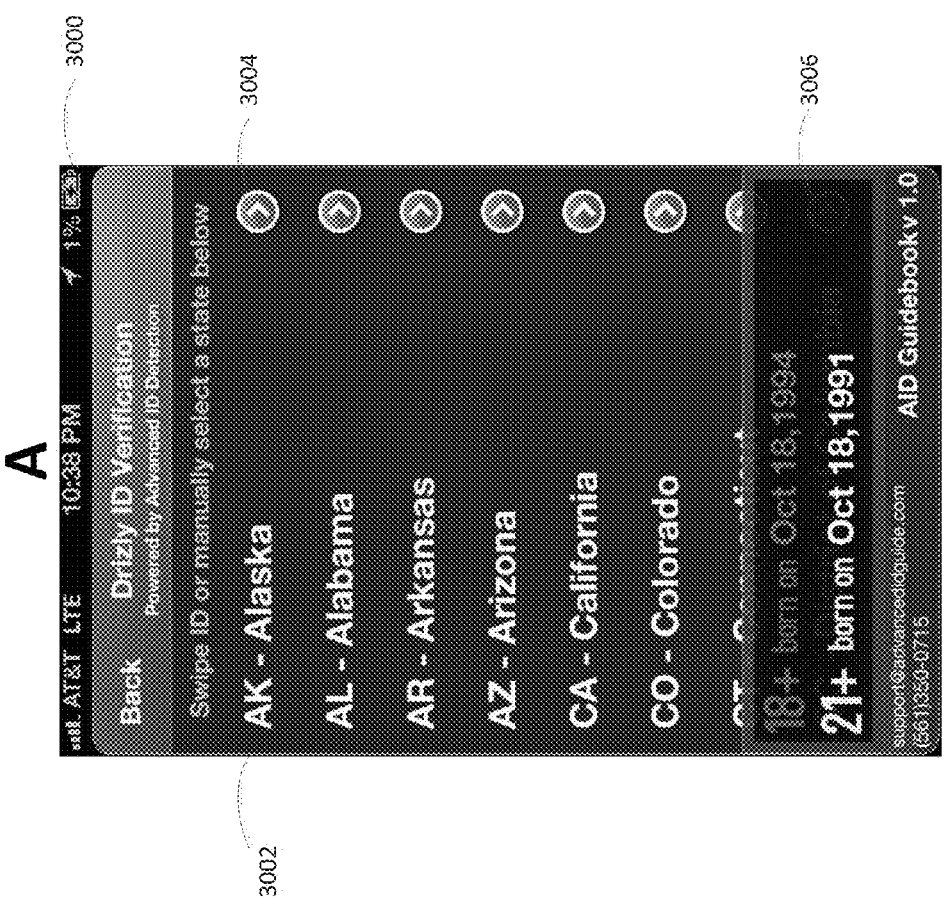
Figure 31:
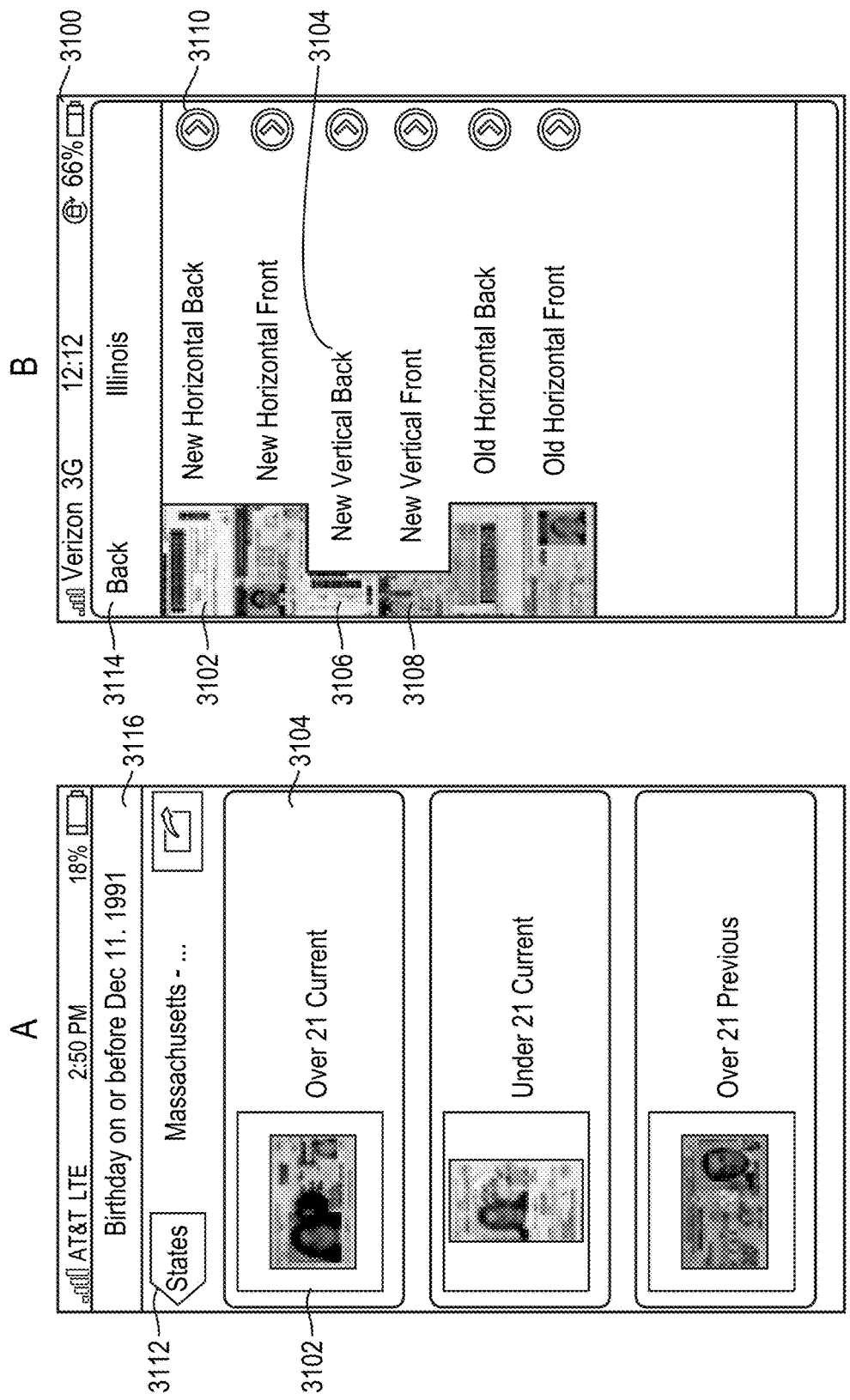
Figure 31:
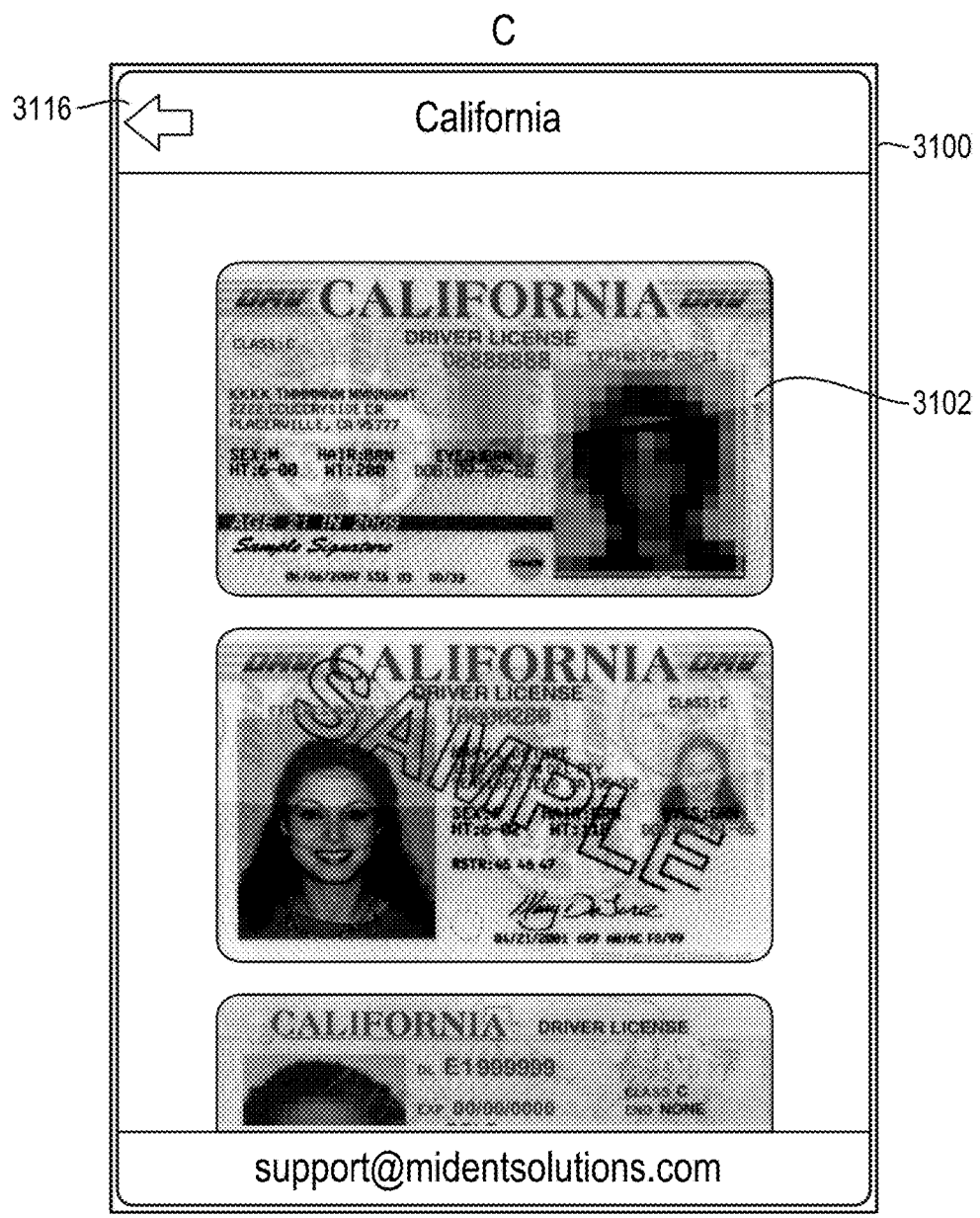
Figure 32:
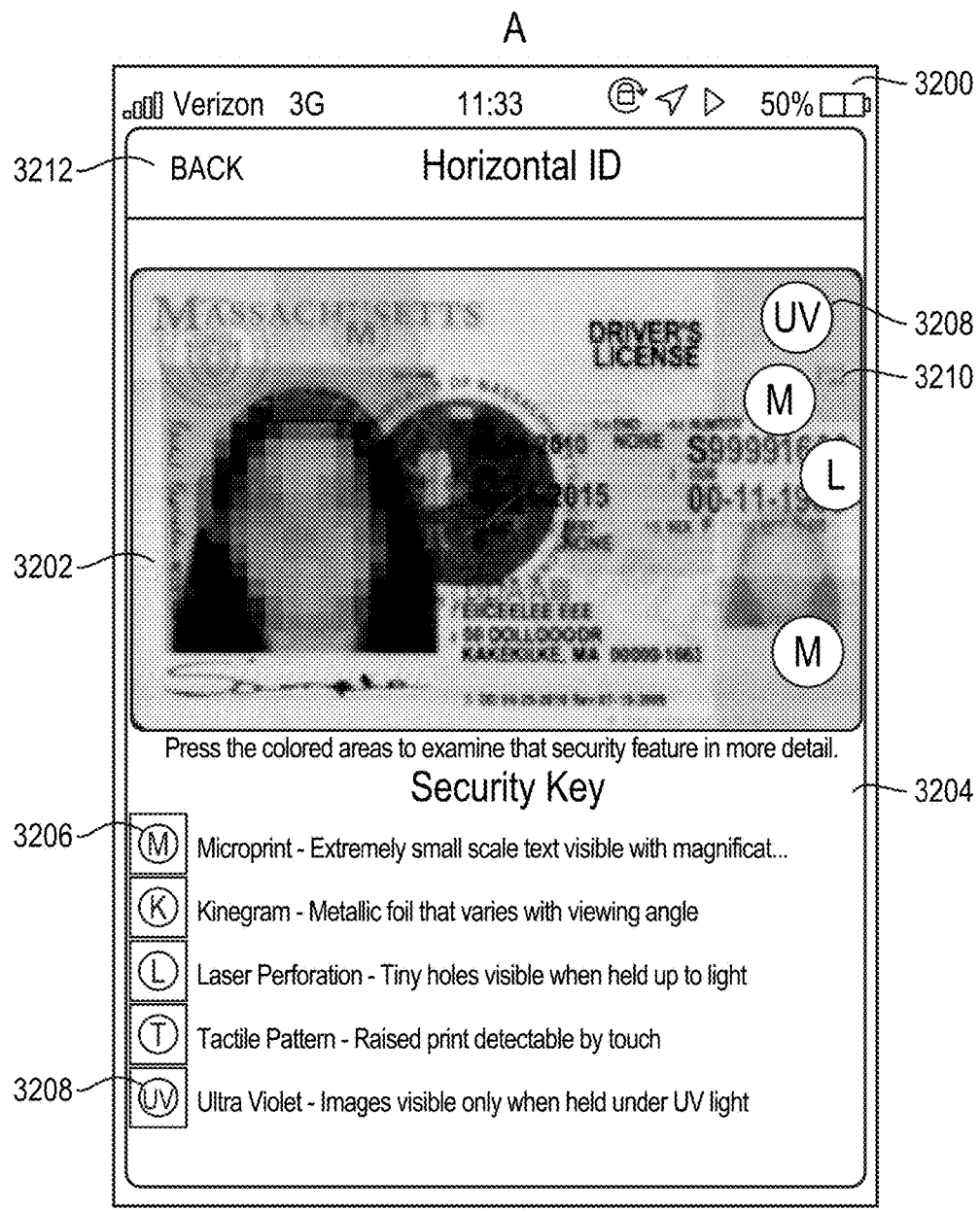
Figure 32:
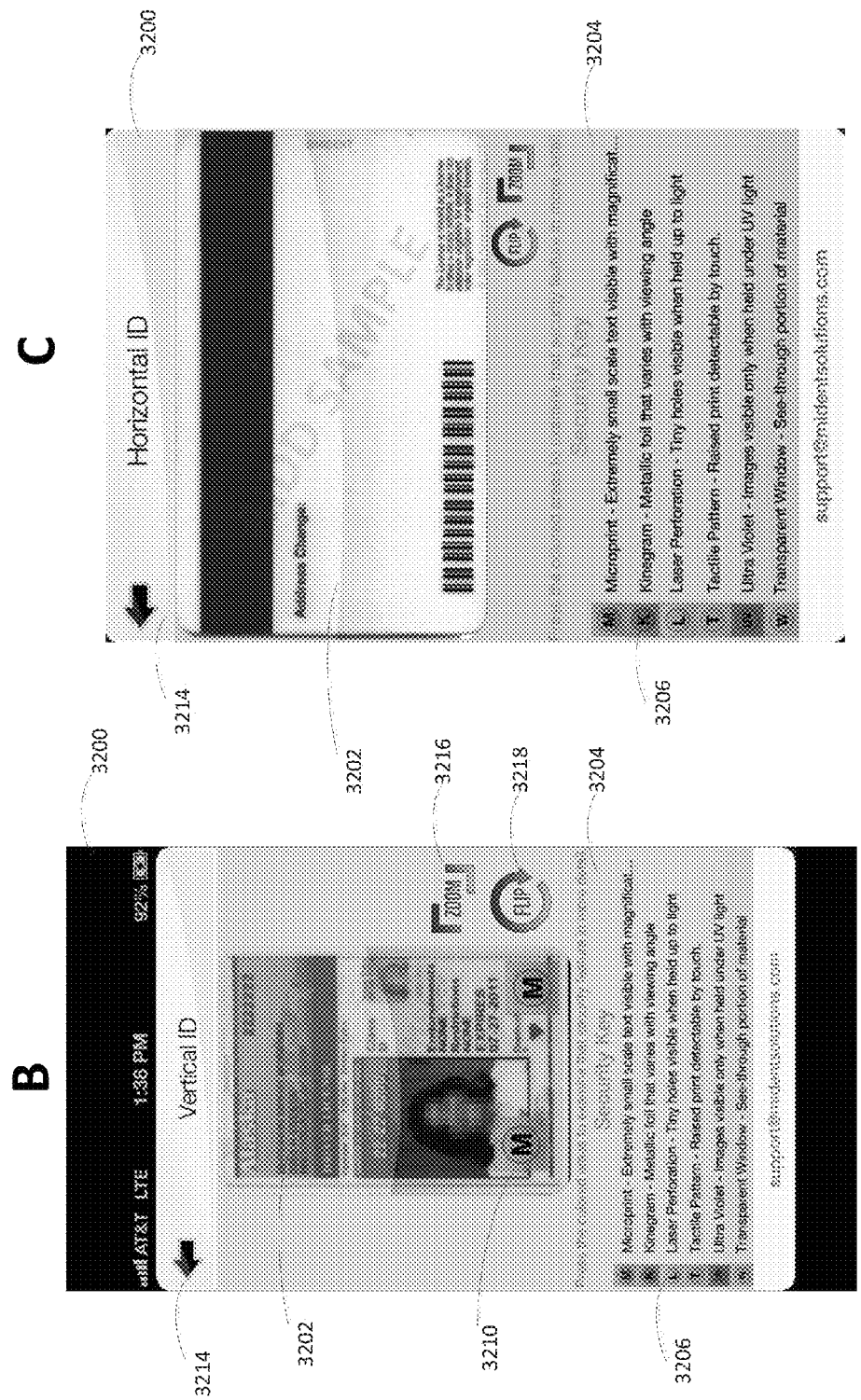

FIGURE 30
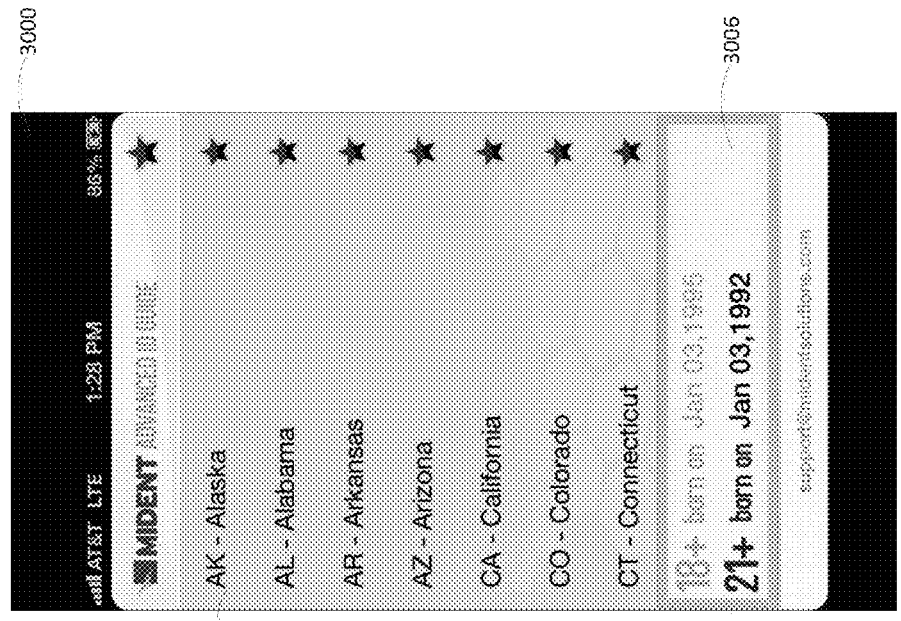
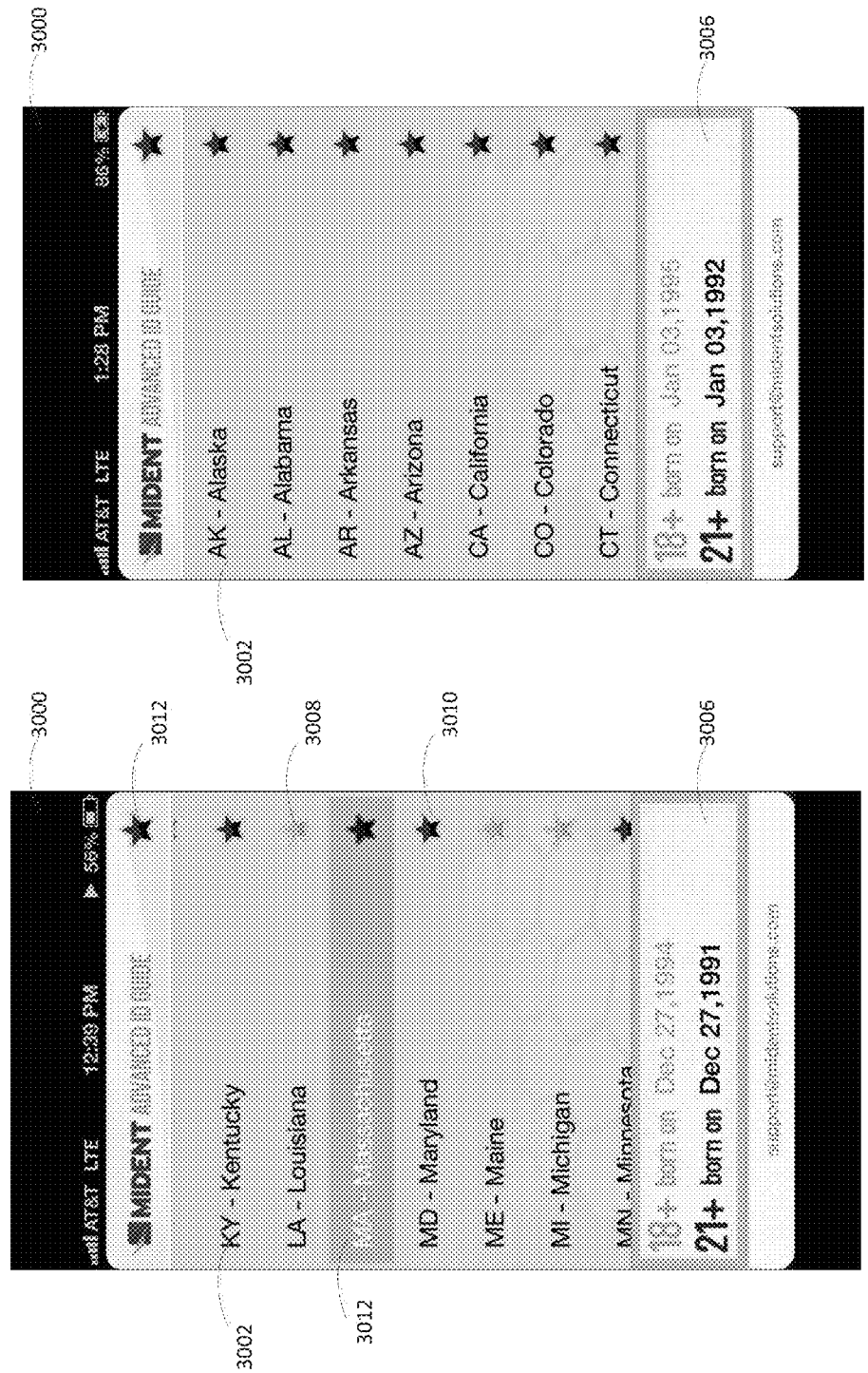

DISTRIBUTION OF PRODUCTS

TECHNICAL FIELD

This description relates to the distribution of products.

BACKGROUND

In some contexts, in the distribution of a product, for example, when a product is delivered to a customer, it may be important to confirm that the customer is the person he or she purports to be. This may be important when the product is one that the customer may or may not be entitled to receive. For example, in most jurisdictions, liquor can only be sold to and delivered to a person older than a certain age. In that context, for example, a liquor store can insist on seeing government-issued evidence that the person is old enough to buy liquor. If the liquor is to be delivered to the person, the checking must occur outside the store at the point of delivery. Similar requirements can exist for other kinds of products.

In many cases and for various reasons, liquor stores and other kinds of retail stores do not deliver to their customers, but rather depend on the customers coming into stores to buy products. In some industries, independently operated retail stores that sell certain kinds of products tend to market and sell those products in relatively small geographic areas to customers who live in or frequent those areas. In some cases, the retail stores are selling products that can be characterized as commodities. For those kinds of products, it is common to find competing independent retail stores located in space-apart locations each serving a relatively small geographic area in the vicinity of store.

Typically, such retail stores must engage successfully in a variety of business activities including purchasing, inventory management, customer identification, and in some cases delivery, among other things.

SUMMARY

In general, in an aspect, information is maintained that associates competitors with respective territories for which the competitors have rights that are to be exclusive relative to other competitors for items associated with the territories. A user can enter, through a user interface, an expression of interest that can be associated with one of the territories. In response to the expression of interest, a user is automatically enabled to interact with the competitor that has the exclusive right to the territory, without automatically enabling the user to interact with a competitor that does not have the exclusive right.

Implementations may include any of the following features or combinations of any two or more of them. The exclusive rights include rights to deliver products. A delivery is made to the user. The territories include geographic territories. The competitors include stores. The expression of interest is associated with an item or service of interest to the user. The information is maintained on a server under the control of a party that is independent of the competitors. The territory includes a geographic territory. The territory includes one or more identified products. The territory includes one or more identified brands. The user interface through which the user is enabled to enter the order is configured to represent the competitor that has the exclusive right. The user interface is presented to the user on behalf of the competitor, under the control of a party that is independent of the competitor that has the exclusive right. The user interface presents information about products that are available from the competitor that has the exclusive right. The expression of interest is of products that include alcohol. Advertising or promotions are exposed to the user through the user interface. The advertising or promotions are of brand owners. The user can a payment through the user interface before a product that is the subject of the expression of interest is delivered. The user can review lists of products available for order from the competitor that has the exclusive right.

In general, in an aspect, a supplier can manage deliveries of products to people at locations in accordance with orders received from customers of the supplier. The managing of the deliveries includes at least one of: receiving the orders, receiving payments for the orders, tracking deliveries of the orders, receiving confirmation that the recipients of the deliveries were the people at the locations, and tracking inventory of products based on the orders and deliveries.

Implementations may include any of the following features or combinations of any two or more of them. The locations are in a territory in which the supplier has a right that is exclusive relative to other suppliers to deliver the products. The products include alcohol. The deliveries are made only to people who are confirmed to be proper people to receive the products. Information about the orders is received from and sent to a server that maintains order information for the supplier and for other suppliers with respect to similar products. The supplier can manage the deliveries from a point of sale terminal at the supplier.

In general, in an aspect, a brand of products can manage relationships with customers of products that are delivered to the customers by competitors that are operated independently of one another and independently of the brand. Information is received from a server about the products that are delivered by the competitors, including contact information for the customers to whom the products are delivered and identification of the products delivered.

Implementations may include any of the following features or combinations of any two or more of them. The products include alcohol. The brand communicates directly with the customers of the products based on the information received from the server. The communicating includes advertising or promotion. The brand can analyze the information from the server in connection with a brand advertising or promotion campaign. The brand can analyze the information from the server to determine demographics of customers for the brand. The brand can analyze the information from the server to determine geographic distribution characteristics of its products.

In general, and an aspect, an apparatus includes a terminal at a supplier that has a user interface to (a) display information about products available for sale by the supplier and delivery to locations within a territory served by the supplier and (b) receive order information about products to be delivered to customers within the territory. A communication facility is to communicate with mobile devices of people who deliver the products to the locations in accordance with the order information. A processor is to track inventory of the products based on order information and delivery information from the mobile devices, to manage information about customers and delivery locations of the orders, and to enable a user to analyze customer demographics and geography of order deliveries.

Implementations may include any of the following features or combinations of any two or more of them. The terminal includes a point of sale terminal. The communication facility is also to communicate with a server that maintains information about the products, orders, customers, and deliveries on behalf of the supplier. The communication facility is also to communicate order information to a payment processor. The supplier has a right, exclusive relative to other suppliers, to deliver the products within the territory. The territory includes a geographic area. The territory includes a brand of products. The user interface is also to receive payment information about the products to be delivered.

In general, in an aspect, an apparatus includes a set of applications or websites or both to run on mobile devices or computers or both in conjunction with deliveries of products from competitors to customers at locations within mutually exclusive territories by the respective competitors. Each of the applications or websites is associated with a corresponding one of the competitors. All of the applications or websites of the set provide similar functions with respect to the deliveries of the products from the competitors to the customers at the different locations. Each of the applications or websites is presented to customers through an interface that is white-labeled for the correspond competitor.

Implementations may include any of the following features or combinations of any two or more of them. Each of the interfaces provides information about products and prices that are offered by the corresponding competitor. Each of the interfaces is exposed only to customers at locations within the exclusive territory of the competitor to which the interface corresponds. Information used by and presented through the user interfaces by all of the applications or websites is managed at a central server hosted independently of any of the competitors.

In general, in an aspect, a server runs an application in a software-as-a-service-mode to enable the server to communicate with devices at competitors and mobile devices of customers of the competitors. The application enables the server to manage mutually exclusive rights of respective competitors to deliver products to customers at locations in respective territories of the competitors.

Implementations may include any of the following features or combinations of any two or more of them. The application is also to enable the server to communicate with the mobile devices of the customers to enforce the mutually exclusive rights. The application is also to enable the competitors to manage deliveries and inventories of the products. The application is also to enable the competitors to initiate and receive payments for the products that are delivered.

In general, in an aspect, credit card data is received from credit card holders. The information is stored in a gateway facility for use in transactions between the card holders and merchants. For each of the transactions between one of the card holders and one of the merchants, on behalf of the merchant the credit card data is used to debit a credit card account of the card holder and to credit a bank account of the merchant.

Implementations may include any of the following features or combinations of any two or more of them. A party other than the merchant or the card holder causes the credit card data to be so used. The credit card data includes a credit card number. The credit card data includes an expiration date. The credit card data includes a security code. The merchant has no access to the credit card data. A party that stores the information is a party other than the merchant or the card holder or the party that causes the credit card data to be so used is. A party that causes the credit card data to be so used determines which merchant will be a party to the transaction with the card holder. The merchants are competitors and have respective exclusive rights to engage in transactions with the card holders.

These and other aspects, features, and implementations, and others, can be expressed as methods, apparatus, program products, methods of doing business, systems, components, methods and steps for performing functions, and in other ways.

These and other aspects, features, and implementations will be apparent from the following description and from the claims.

DESCRIPTION

Figure 1:
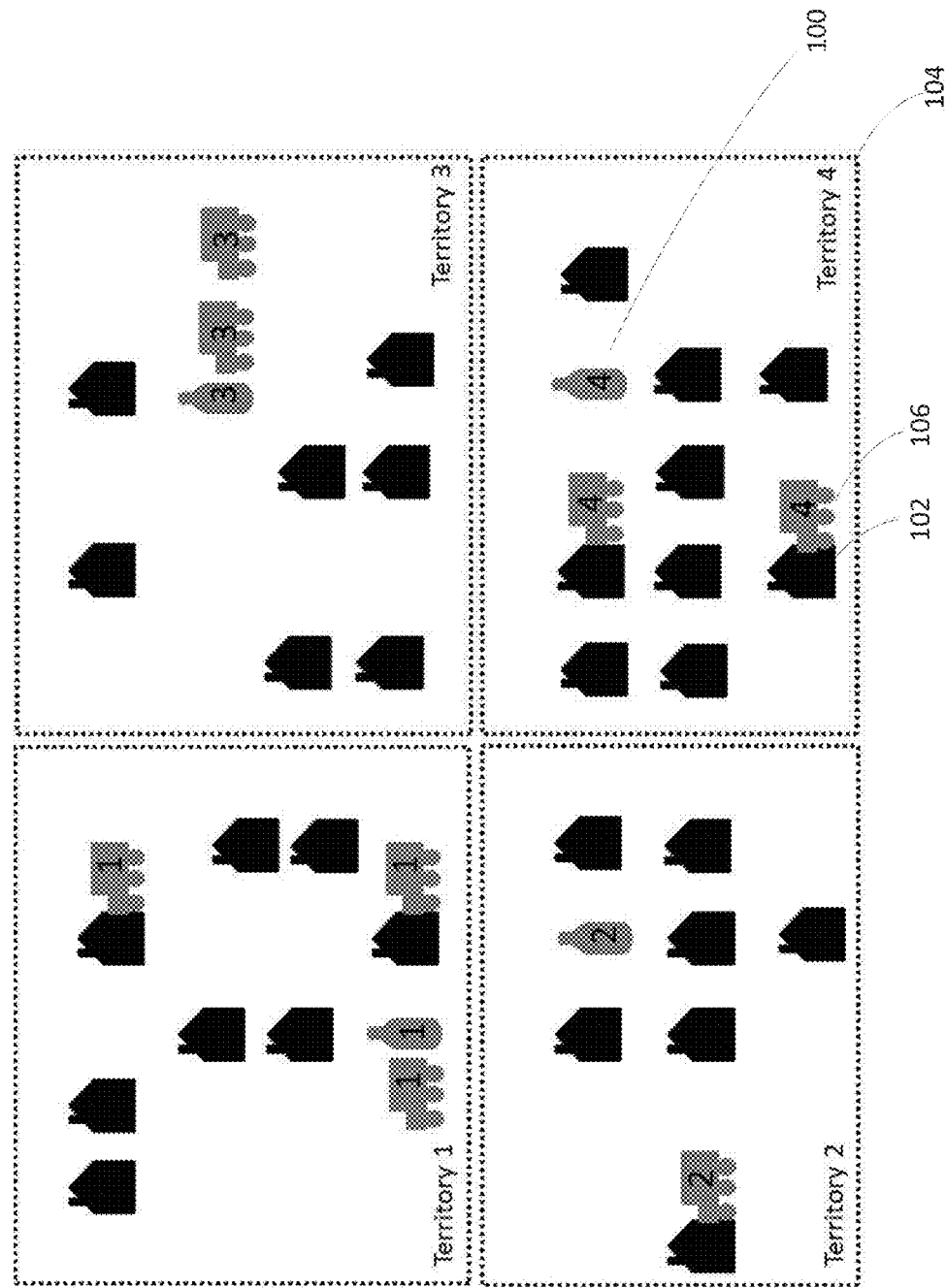

FIG. 1 is a schematic of exclusively licensed zones.

FIGS. 2, 3, 4, 5, and 56 are block diagrams.

FIGS. 6, 21, 25, 33 and 55 are flow charts.

FIGS. 7-15, 16A, 17-20, 22, 23, 26, 27, 28A-28B, 29, 30, 31, 32, and 41-52 are screenshots.

FIGS. 16B, 24, 34-40, 53, and 54 are wireframes.

FIG. 28C is a list of features used to authenticate IDs.

Here we discuss a system that, among other things, can allow a customer to easily browse through consumer product offerings, and easily order, pay for, and have delivered consumer products. The system can also enable a store such as a retail store to increase sales, expand its customer base, assure itself of the identity of its customers, manage its inventory, and comply with the law regarding delivery of certain products to customers, among other things. In addition, the system can benefit brands, by, for instance, allowing them to obtain detailed consumer information, and efficiently advertise and market directly to customers in targeted ways, without requiring them to conduct the advertising or marketing communications indirectly through wholesale or retail operations. As discussed below, our system also can impact many other activities, including customer and identification (ID) verification and authentication, and in-store terminals and point-of-sale systems.

In some examples, our system can be implemented in a low-margin highly fragmented or highly regulated local retail industry. In some situations, retail stores (or other stores) in those industries may primarily draw their customers from the local population, as mentioned earlier. For instance, Liquor Store X's customers may primarily be made up of customers for whom Liquor Store X is the closest liquor store. Using some examples of our system, the retail store may be able to reach additional customers and a broader geographic area. Furthermore, using some examples of our system, retail stores may be able to offer delivery of consumer products in an economical, lawful, and uncomplicated manner. In some cases, our system can further benefit retail stores by helping them efficiently manage inventory and improve customer and/or ID characterization, verification and authentication. The system can help retail stores obtain and manage customer and purchasing data, such as the demographics (age, gender, location) of customers, the types and quantities of consumer products sold, and the number of sales per time period. A retail store that is able to understand this data may be able to use it to increase sales and expand its customer base.

Our system may also enable retail stores to tap into new markets and expand existing markets through the use of computers, mobile devices, and other devices able to connect to the Internet or other networks. For instance, the system can create an exclusive zone for each retail store that participates. Then, any purchase through the system by any customer in that zone may be fulfilled only by that retail store. The system allows and enforces the exclusive zones in a way that is different from typical market situations for some kinds of stores.

FIG. 1 shows one example of this concept schematically. In this example, an individual retail store 100 may be able to exclusively serve the houses 102 (or residents or offices or travelers or other facilities) within a territory 104 defined for it. Delivery vehicles 106 of the retail stores then can deliver consumer products from the retail store 100 in a given territory 104 to the houses 102 in the given territory. The houses are only exemplary; deliveries may be made to apartments, other stores, or public locations, or combinations of them.

Although the territories are shown in FIG. 1 as having simple contained rectangular boundaries that separate a region and simple, non-overlapping territories, the territories could be arranged in a wide variety of ways. For example, a given retail store could have the exclusive right to distribute to families within a broader region while another retail store can have the exclusive right to distribute to offices within the broader region. In that sense, the territories in which the respective retail stores would have exclusive rights would overlap geographically. The cost of delivery suggests that territories whose boundaries are based on geography would be typically desirable. However, other circumstances could suggest geographically overlapping territories. In addition, it would not be necessary for the retail store to be located geographically on the territory that it serves, although in many cases that would be sensible as well. Therefore, we use the word "territory" in a broad sense to include, for example, any set of potential customers that can be associated with one or more stores, without regard to how the customers are identified or associated with the stores.

We use the words "retail stores," "stores," "sellers," "retailers" and "merchants" interchangeably and broadly. All refer to sellers of consumer products, goods or services, typically, to customers, purchasers, end users, or consumers, for example. We use the word "seller" (and interchangeably with it, "suppliers") in their broadest sense to include, for example, any business entity, organization, group or individual that offers for sale or sells good, products, or services. Sellers and suppliers can be parts of chains and can be affiliates or partners or have a corporate relationship among them. Sellers and suppliers can in some cases be present online only or can be so-called brick-and-mortar stores, or can be a combination of the two. We use the term competitor in its broadest sense to include any seller, supplier, retailer, merchant, or store, or any other party that competes in any way in a market. We use the word "brand" broadly to include, for example any entity that creates, controls, markets, or promotes products, goods or services that are identified by marks, typically recognized marks.

In some examples of our system, consumer product offerings, listings, or catalogs can be viewed online or on a web application or through a mobile app by individual customers (or users or consumers). The customers may be able to sort the consumer products in a variety of ways—for instance, by brand, price, size, and quantity, among others. Customers can make purchases of consumer products online, and either pick-up pre-purchased consumer products in a store or have them delivered to a specified location. Our system is compatible with consumer product sales that require identification or a signature and is able to enforce those requirements. Our system can also be adapted to comply with local, state, and federal laws governing the sale and distribution of certain consumer products. Our system is therefore able to provide a platform for the sale and delivery of alcoholic beverages, as described below.

We use the words "consumer goods," "consumer products" and "products" interchangeably and broadly. All refer to products or services of any kind We use the terms "products" and "services" in their broadest possible sense to include, for example, food, drinks, clothing, medications, toiletries, jewelry, furniture, office supplies, grooming services, lawn care services, or any other sellable and purchasable objects or services, to name a few.

Our system may be attractive to brand owners because it can provide direct access to individual customers, tailor-able advertising with a high return on investment, and important customer purchasing data. For instance, in some examples, the brand owners can pay a customer's delivery fee imposed by a retail store in exchange for the customer choosing that brand's products over a competitor's products. This payment by the brand can increase the value proposition for the customer and empower brand interaction with customers. In some cases, the system can allow brand owners to promote their products for free, and only require brand owners to pay when the customer purchases the brand's product. The system may also give brand owners access to customer data, including demographics, contact information, and purchasing information. In some cases, the same advantages can be available to wholesalers or retailers to enhance their own brands.

Figure 2:
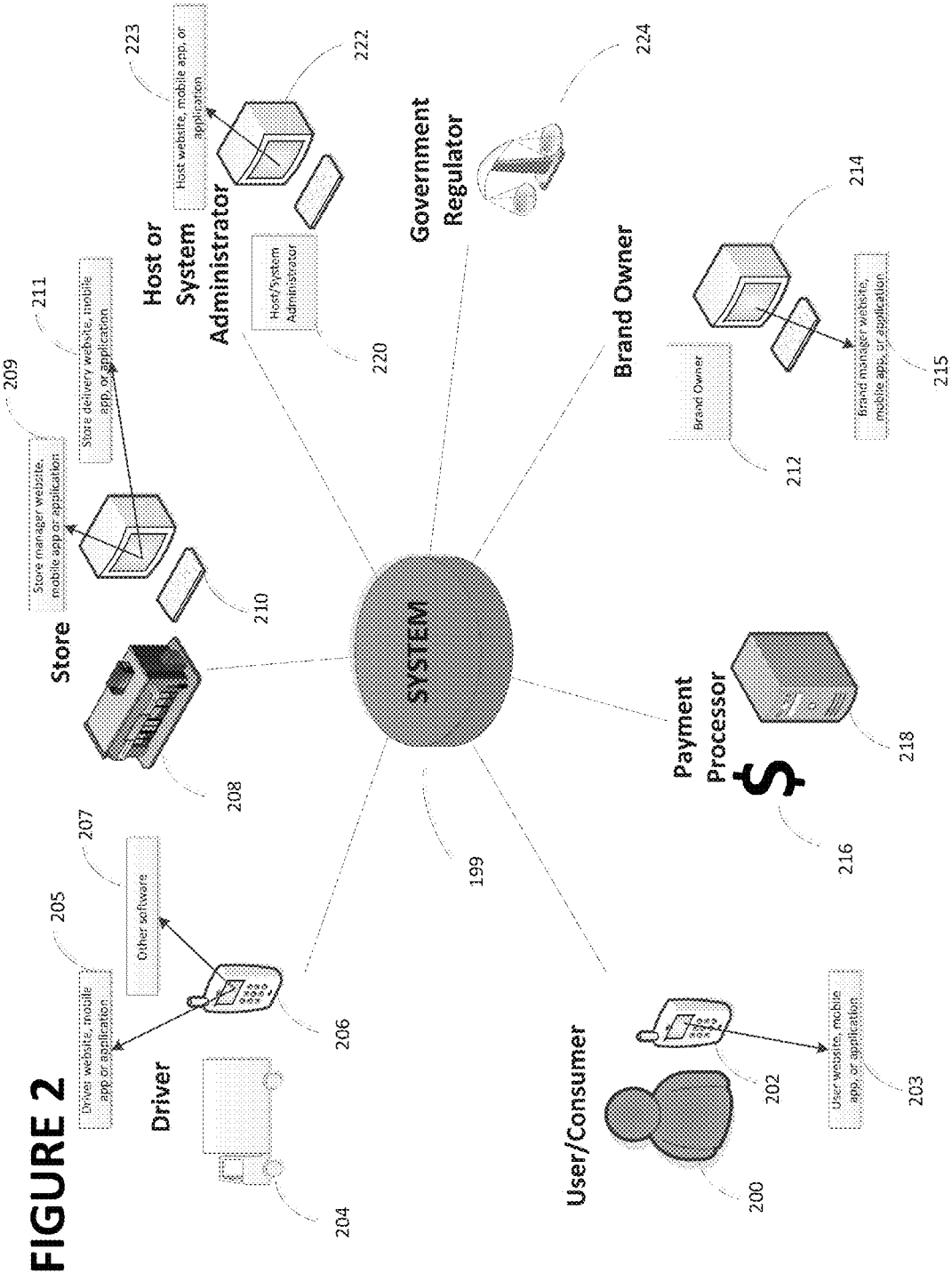

FIG. 2 shows certain entities and participants involved in the operation of some examples of our system 199, and some of the devices associated with each entity. Not every entity is necessary as a participant in every implementation. The system can include software solutions utilizing over-the-counter hardware products, although it is possible that specialized hardware products can be developed.

A customer (or user or consumer, terms that we use broadly and interchangeably) 200 can have one or more customer or user devices 202. The device 202 may be a smart phone (e.g., an iPhone or an Android phone), a personal computer, a laptop, a tablet, a workstation, a kiosk, or any other device able to communicate with the system, among others. In some examples of our system, the customer can use the device 202 to access the system through an easy and affordable user application, mobile app, or website (running on a wide variety of platforms, e.g., iOS, Web, Android) 203 that allows customers to quickly and easily investigate available products, place orders, pay for the products, and arrange for delivery, or any combination of those and other functions. Although only one user or customer is shown in FIG. 2, a large number of customers (dozens, under it, or thousands, for example) could use the system for purchases from a given store. Taking account of all of these stores and brand owners who may use the system, the number of customers could be as large as millions.

In some uses, the device or application enables the customer to identify an address (or more than one address) where the consumer product or products are to be delivered. If the system has been configured to give a certain store exclusive access to the customers in a certain territory (e.g., a geographic area), the user application enforces the geographic restriction. When a customer in that area uses the user application, then system can assure that she can be automatically "connected" only with the store that has the exclusive license. In some examples, the user application allows customers to create an account, store a credit card, and place an order for delivery. In some examples, the user application is "white-labeled." That is, the user application may have the same functionality described above, but may appear to be created for and presented by a retail store or a brand.

In some cases, it may be possible for the system to enforce more complicated exclusive, and semi-exclusive arrangements for stores, by dividing the customers and geography in complex ways based on demographics, time periods, location, and product type, among others. For example, one retail store might have the exclusive right to serve any customer in the so-called Western suburbs of Boston but only with respect to certain brands of liquor and only during holiday seasons. A different retail store might have the exclusive right to serve those same customers in the same territory but only with respect to other brands of liquor or only with respect to other periods of time. A wide range of other examples are possible.

References to the "user application" include a user website, an online service, an application running on a personal computer or workstation, a mobile app, and other executable facilities, and vice versa.

We use the words "user," "consumer," "customer," and "guest" interchangeably and broadly. All refer to purchasers of consumer products or goods. We use the word "purchaser" in its broadest sense to include, for example, any individual, group, organization, or business entity, and any representative of any group, organization or business entity, among others.

The retail stores 208 can also have one or more retail store devices 210, such as a computer, terminal, laptop, terminals, point-of-sale terminal (in the broadest sense), smartphone, tablet, among others, on which store employees, managers, and owners can access a store manager website or application 209 associated with system. The store manager website or application can be used to track statistics (e.g., customer demographics and purchasing data) and manage inventory, among other things.

Store employees, managers and owners can also have access to a store delivery application 211, which can be a separate application from the store manager application or can be integrated into the store manager application. The store delivery application may be run on the same device or a different device from the store manager application. Among other things, the store delivery application notifies the retail store when a customer places an order for a consumer product. The store manager application and the store delivery application are sometimes collectively referred to the retail store terminal application or website.

References to a "store manager application" include an application that is installed on a store computer or terminal, a mobile app, or a store manager website hosted by a central server, or a combination of those kinds of software, and references to a "store delivery application" include an application that is installed on a store computer or terminal, a mobile app, or a store delivery website hosted by a central server, or a combination of those kinds of software, and vice versa.

The applications can be provided by and the websites can be served from servers controlled by a host 220 of the system. When a product is ordered for delivery, the person making the delivery (sometimes called the driver) 204 can have one or more driver devices 206 on which the driver 204 can access the driver website or application or mobile app 205 (and other software 207, such as ID verification software, an ID guidebook application, or other applications, and combinations of them). Each of the devices 206 can be a smartphone, a laptop, or a scanning device like an iPod with a Linea Pro sleeve (sometimes referred to as a "scanning sled"), among others, or combinations of them. Each of the devices may also be a mobile phone coupled to a scanner. The driver can use the device to find, process, and complete the orders at the point of delivery, and characterize, verify and authenticate (or some combination of them) the customer or the customer's ID card or other form of identification or both. The scanner may obtain or store customer data (for example, a customer's date of birth, the customer's full name, the state of ID issuance, and other data related to the customer, to the store, to the transaction, or to combinations of two or more of those). The data may be sent to the retail store, brand owners, government officials, or others. Characterization, as described below, may involve scanning a bar code or a magnetic strip on an ID card and identifying several characteristics about the ID (e.g., the state of issue, whether it is a new or old version of the state's ID, and whether it is an ID for someone aged 21 and over, or under 21). In some implementations, verification, as described below, may involve verifying that the ID is scannable and displaying some basic information associated with the scanned ID (e.g., name associated with the ID, state of issuance and ID number). Authentication, as described below, may involve manual forensic checks to verify the validity of the ID, or identify the ID as a fake.

References to a "driver application" include a driver application, a driver mobile app, or a driver website, and vice versa.

Although the driver 204 can be employed by any party or more than one party (including one or more of the stores or the brand owner or even the host of the system or combinations of them), in many cases, the driver 204 will be employed by a single retail store 208. The word "driver" can refer to any type of delivery person or persons, including someone who delivers products by walking, bicycling, skateboarding, flying, or using any other form of transportation. The delivery person(s) can deliver any type of product or service.

The consumer product brand owners 212 can also have one or more brand owner devices 214, such as a computer, terminal, laptop, smartphone, tablet, or combinations of them and others, on which brand employees and agents can access a brand manager application or a brand manager website served by a host from a central server, or a mobile app 215, to view customer data (such as demographic information) and purchasing data (such as brands, product identifiers, prices, dates, and locations, and combinations of them); purchase advertising space; or run customizable promotions targeting individuals or groups; or combinations of those. By using the brand manager application, brand owners can create advertising campaigns that have set budgets that target specific demographics. They can also choose the types of advertisements to run.

References to the "brand manager application" include a brand manager website, application or mobile app, or combinations of them, and vice versa.

We use the words "brand owners" broadly to include, for example, any individual, group, organization, or business entity, among others, that has an interest in increasing the sales of a certain product brand.

A payment processor 216 that includes a server 218 can process payments from and returns to the customer 200, and payments to and returns from the retail store 208. In some examples, the retail stores do not obtain the customer payment information. Rather, the information is stored on the host or system administrator servers and sent directly to the payment processor.

A system administrator (or host) 220 can also have one or more devices 222, such as a computer, terminal, smartphone, laptop, tablet, among others, on which the system administrator can access the host application, mobile app or website 223. The host application can be operated on a server, can be connected to all stores, and can manage the tasks of updating the inventory at each store with each purchase or refund, interfacing with the brand owners for advertising, maintaining databases of customer information (including payment information), enabling the stores to manage deliveries, managing payment processing on behalf of stores, enable analysis and review of accumulated transaction and customer data, and any combination of those and other features.

The system administrator may maintain a server, or multiple servers, such as a product delivery data management server that aggregates the sales data, analyzes the data across stores, and makes the data available for a variety of purposes. The same or a different server may maintain the contact and billing information for customers who have created accounts on the user application. The system administrator may also be involved in advertising efforts, for instance, by promoting the use of the system among customers.

References to the "host application" include references to a host website, host application, host mobile app, and any combination of them.

Other entities can also be involved, such as a government regulator 224 that ensures that the system operates lawfully (e.g., that underage people are not obtaining alcohol).

In some examples, the system can be described using a software-as-a-service (SaaS) model. As described above, it is possible to implement this system with software installed or accessed on over-the-counter hardware products, such as iPhones, Android phones, tablets, personal computers and laptops, and other devices and combinations of them. In some examples, the software includes at least (1) a user application (e.g., iPhone application, Android application or website), (2) a driver application, (3) retail store application(s) (such as the store manager application and the store delivery applications described above) and (4) a brand terminal or application. The services for the user include allowing the user to place an order for delivery. The services for the driver include allowing the driver to manage orders from the retail store and/or characterize or verify or authenticate customers or forms of ID. The services for the retail store include allowing the store employees, managers and owners to manage orders, track order metrics and update and change inventory. The services for the brand owners include creating advertising campaigns, setting budgets for advertising campaigns, selecting target demographics for advertising, and selecting the types of advertisements to run.

The system shown in FIG. 2 can be operated and facilitated by a single party that we sometimes refer to as a host or system administrator 220. The host can provide or make available some or all of the various applications and websites that we have mentioned here to a wide variety of parties including drivers, stores, wholesalers, distributors, brands, customers, payment processors, advertisers, and other parties, partners, and other participants, and individual employees, agents, consultants, and representatives of any participant entities. The software, online functions, and other facilities provided to and used by the participants in the system can be designed to work together so that the exclusive rights discussed above can be enforced across multiple stores and sellers, across multiple territories, and across multiple geographic regions. Communication among the parties and partners in the system can be achieved through the Internet or other public network, or in some cases through dial up or other dedicated communication channels, or both.

To provide the facilities to the participants and to enable the system to work effectively with multiple participants, the host can maintain one or more servers in one or more locations that are accessible by participants. The host can maintain databases that store information about participants in the system (users, customers, stores, sellers, payment processors, brands, advertisers), transactions, deliveries, and payments, among other things. The databases or analysis of data held in them can be made accessible to some or all of the participants in the system.

Figure 3:
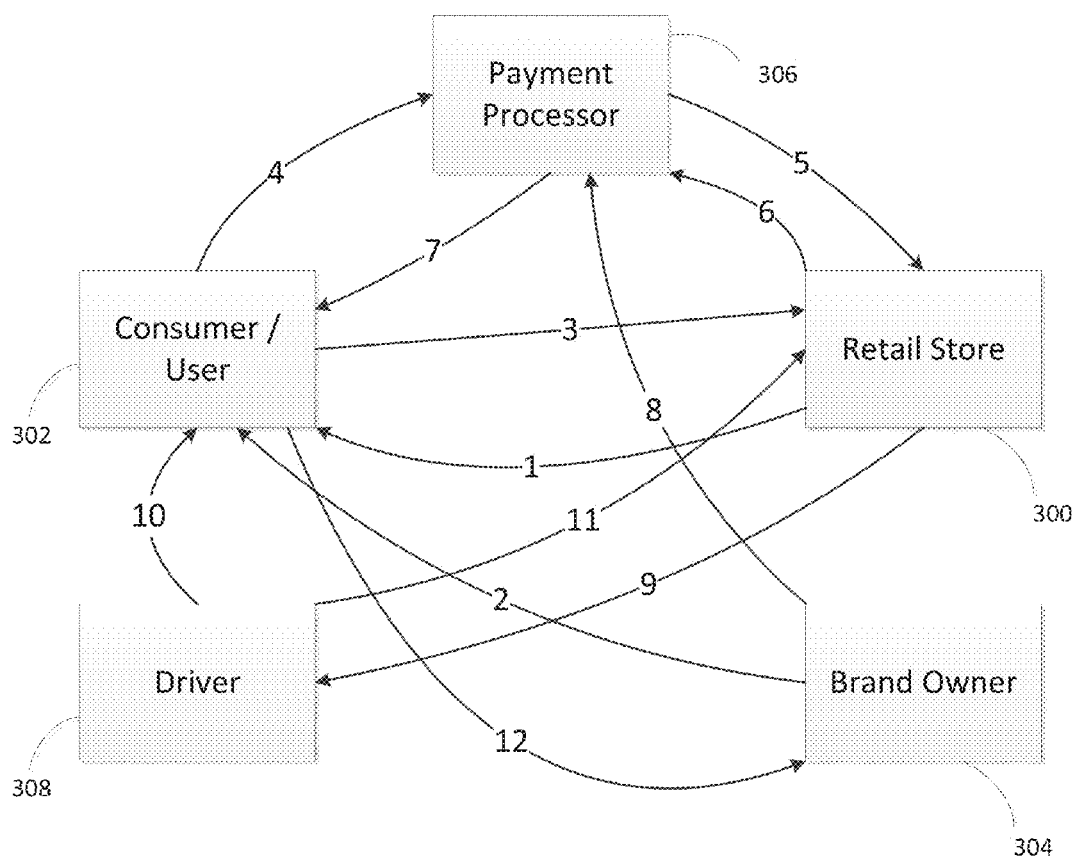

FIG. 3 shows the connections among some of the participants in some examples of our system. Although connections are shown directly from one participant to another in the figure, at least some of the connections can be implemented indirectly through the servers operated by the host and using data stored in and fetched in databases maintained by the host. Connections not shown in the figure are also possible, some of which are mentioned in the following discussion. Other connections are also possible.

For instance, as shown in the connection labeled 1 in FIG. 3, the retail store 300 communicates its product offerings to the customer 302. In some cases, this is done directly. In some cases, the product offerings can be stored centrally by the host and presented from the host's servers to applications and apps being used by the customer.

In connection 2, the brand owner 304 advertises directly to the consumer 302 through conventional advertising media or through applications and apps that are specially configured for use in the system. The advertising is typically of products that are within the offerings of proposed offerings of the brand or of a store served by the customer. The advertising by the brand and the distribution of information about offerings of a store can be coordinated. In some cases, the store can advertise directly or indirectly to the customer about products, brands, or services of the store.

The consumer 302 places an order by communicating his purchasing decision to the retail store 300 (connection 3) which can be done at the store in person, by direct communication between devices of the customer and devices of the store, or indirectly through the host's servers. When orders are placed, data about them can be communicated to and stored by the host servers in host-maintained databases.

Figure 56:
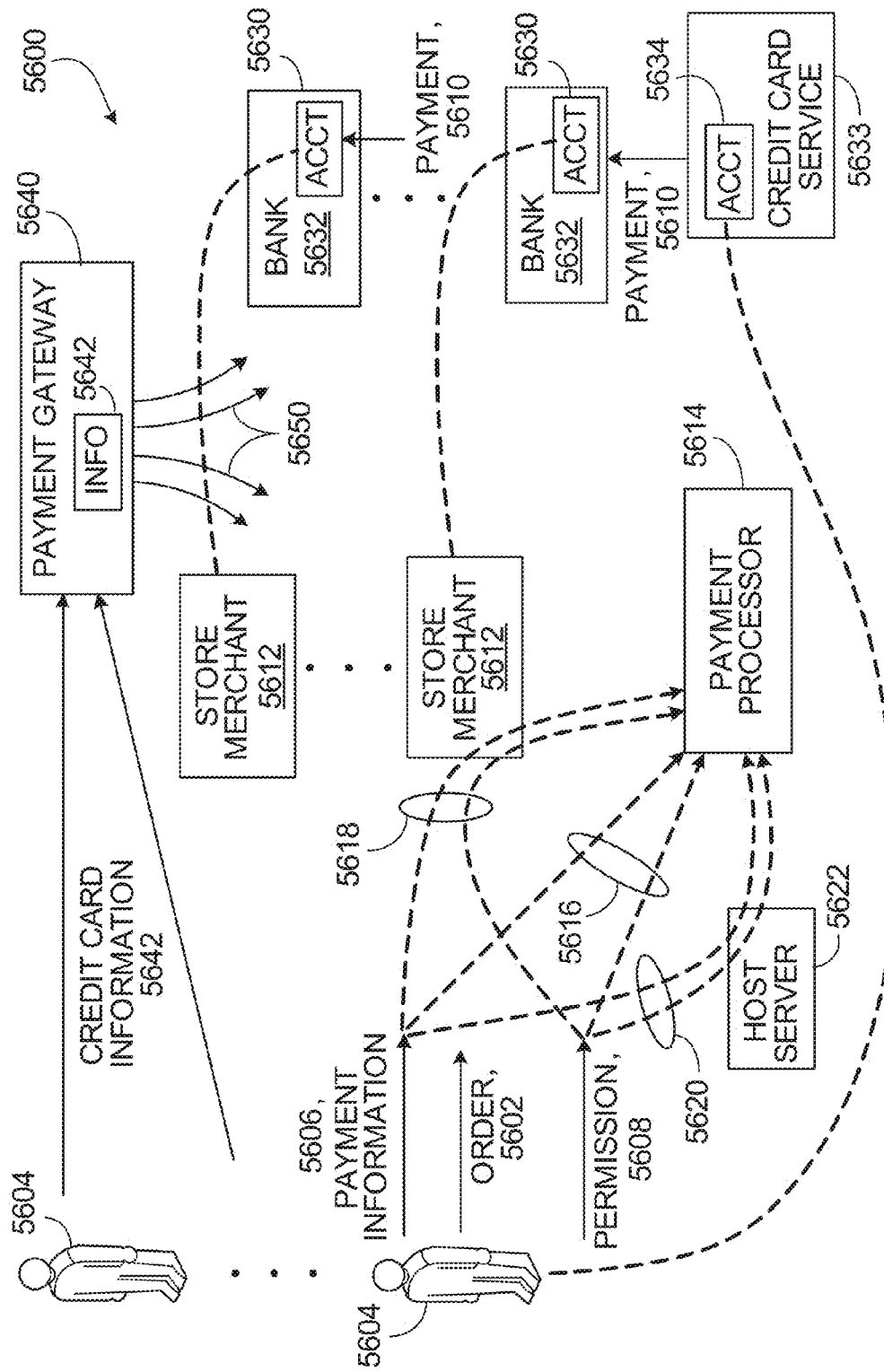

As shown in FIG. 56, which illustrates the flow and architecture of the payment process 5600 associated with system, in connection with (as part of or before or after) a placed order or other transaction 5602, a consumer 5604 can also send payment information 5606 or a permission 5608 (or both) to authorize the processing of a payment 5610 from the account 5634 of the consumer at the credit card service 5633 to the bank account 5630 of the merchant 5612 associated with the transaction. The payment information can be provided directly 5616 to the payment processor 5614 (connection 4 in FIG. 3), or indirectly 5618 to the payment processor 5614 through the store or merchant, or indirectly to the payment processor 5614 through the host servers 5622 to the payment processor 5614, for example.

In some implementations, additional parties may be involved in payment processing. Each store typically will have its merchant account 5630 within its corresponding bank 5632. The bank can process the payments into the merchant account. Another party 5640 (which we call the PG, for simplicity) may act as a payment gateway (for instance, storing sensitive user information 5642 like credit card numbers or transaction histories) to connect the user (or the system host 5622 acting on behalf of the user and the merchant) with the store's bank account. For instance, user 5604 may connect to a store's bank account through a PG. In some implementations, one party (e.g., a bank) acts as both the payment gateway 5640 and the payment processor 5614. One example of a company that can provide payment gateway services is Braintree Payment Solutions, LLC located in Chicago, Ill.

In some industries or contexts, a payment gateway is not necessary. In some contexts, such as in the alcohol, tobacco, and firearms industries, a third-party gateway may be useful or even required due to the sensitive nature of what is being sold. Having a payment gateway also serves a purpose for the host of the system. A PG's software may allow the host to move the servicing of its system around and connect the PG to a wide range of different store bank accounts 5630. This is a new way of connecting parties for payment transactions, by pooling sensitive credit card identification number (CIN) data 5642 for a set of customers with a PG and then sending 5650 the relevant CIN and other data to a particular merchant (or to the customer's credit card account service on behalf of the particular merchant and the customer) when a particular user is purchasing from that merchant's store. This pooled CIN data can be held by the PG on behalf of the customers and sent to multiple other parties (merchants, banks, and others) as needed.

In conventional payment systems, when you order from an online merchant, the merchant obtains your credit card data (CIN) and stores it. They use the credit card data to process your transaction. The money flows from the bank that services your credit card, through the merchant's gateway into the merchant's account (the gateway and processor are combined, which is normal for large retailers). It's a linear flow, with CIN data being stored and processed by only one party.

By parsing that payment flow into its parts and assigning each part to a third party, a wide variety of possible branches 5650 may be followed at the end of the transaction. Unlike a large retailer, we are storing the CIN data at a PG for multiple future uses, and then sending it for one-time uses to individual accounts or merchants. The third-party payment gateway in this situation assumes the risk that is normally assumed by the retailer, by storing the CIN data and making it available for one-time uses by a variety of merchants on behalf of customers of the system.

The payment flow and architecture that we have described enables a fully mobile, card-less transaction system in which users can engage in credit-card purchase transactions with vendors without needing to present the card or any information about the card to the vendor. The customer credit data is held centrally by a third party host of that data (a PG, for example, or another party that provides similar functions).

In some implementations, to achieve this, the system operated by the host provides a user interface through which the customer interacts with the merchant to engage in a transaction. Payment for the transaction is achieved by the host sending information identifying the user and the transaction to the PG. The customer need not provide any credit card information to the merchant, and the merchant need not ask for or store any credit card information of customers. The PG uses the stored credit card information to effect the payment on behalf of the merchant and the customer.

In the context of exclusive territories served by different merchants, the host can determine to which territory a customer belongs, then on the fly associate that customer with a specific merchant. The system can then provide to the PG information about the amount of the payment, the merchant, and the customer. The PG fetches the stored credit card of the customer and uses it, the merchant's identity, and the payment amount to effect the payment through the merchant's bank and the customer's credit card service. In effect, the PG stores and then applies, for the benefit of the currently relevant merchant, the customer's centrally stored credit card data to cause a transaction payment to be made from the customer's credit card account to the merchant's bank account, seamlessly and transparently to the merchant and the customer. The PG thus provides a service to both the mobile customer, who need not provide the credit card information to the merchant or repeatedly to many merchants, and a service to the merchant who need not receive and deal with the credit card information directly but rather can allow the PG to perform that function and assume the associated risk.

Customers who want to take advantage of the system may register with the PG in advance and provide the credit card information for storage there for use in the future with a wide variety of merchants. In a system of the kind that involves an arrangement of exclusive territories of merchants managed by a host, the registration with the PG can be part of the process by which the customer registers with the host to participate in its system.

In a broad sense, then, credit card payments to recipients can be made on behalf of credit card holders by enabling the holders to register credit card information that is required for the payments to be authorized, in a common gateway, and then having the gateway effect the payments from the holders' accounts to the recipients accounts using the stored information, in response to instructions from the holders or the recipients or a host of a system that facilitates transactions between the holders and the recipients.

Referring again to FIG. 3, the payment processor 306 remits the payment to the retail store 300 (connection 5) directly or indirectly. Refunds involve the retail store 300 remitting funds directly or indirectly to the payment processor 306 (connection 6) which then repays the consumer 302 (connection 7).

The brand owner 304 (or retail store 300) may also be connected to the payment processor 306 when it pays for advertising (connection 8). When an order is placed, the retail store 300 may communicate with the driver 308 (connection 9), or the host server may directly update the driver application. The driver 308 delivers consumer products from the retail store 300 to the consumer 302 (connection 10). The driver 308 tells the retail store 300 whether the sale was successful or not (connection 11). In making a purchase, the consumer 302 shares purchasing and/or demographic data with the brand owner 304 (connection 12) and the retail store 300 (connection 3). The numbering of the connections does not imply that they must occur in any given order.

As noted earlier, these connections can occur using cellular service, the Web, in person or through any other method of communication. Many of the connections can route through the system administrator or host server or other party. For instance, for connection 4, the customer 302 can communicate a payment authorization to the host server, which can then send stored payment information to the payment processor 306. Likewise, for connection 2, the brand owner 304 may select advertisements, and send those selections to the host server which updates the user application.

Figure 4:
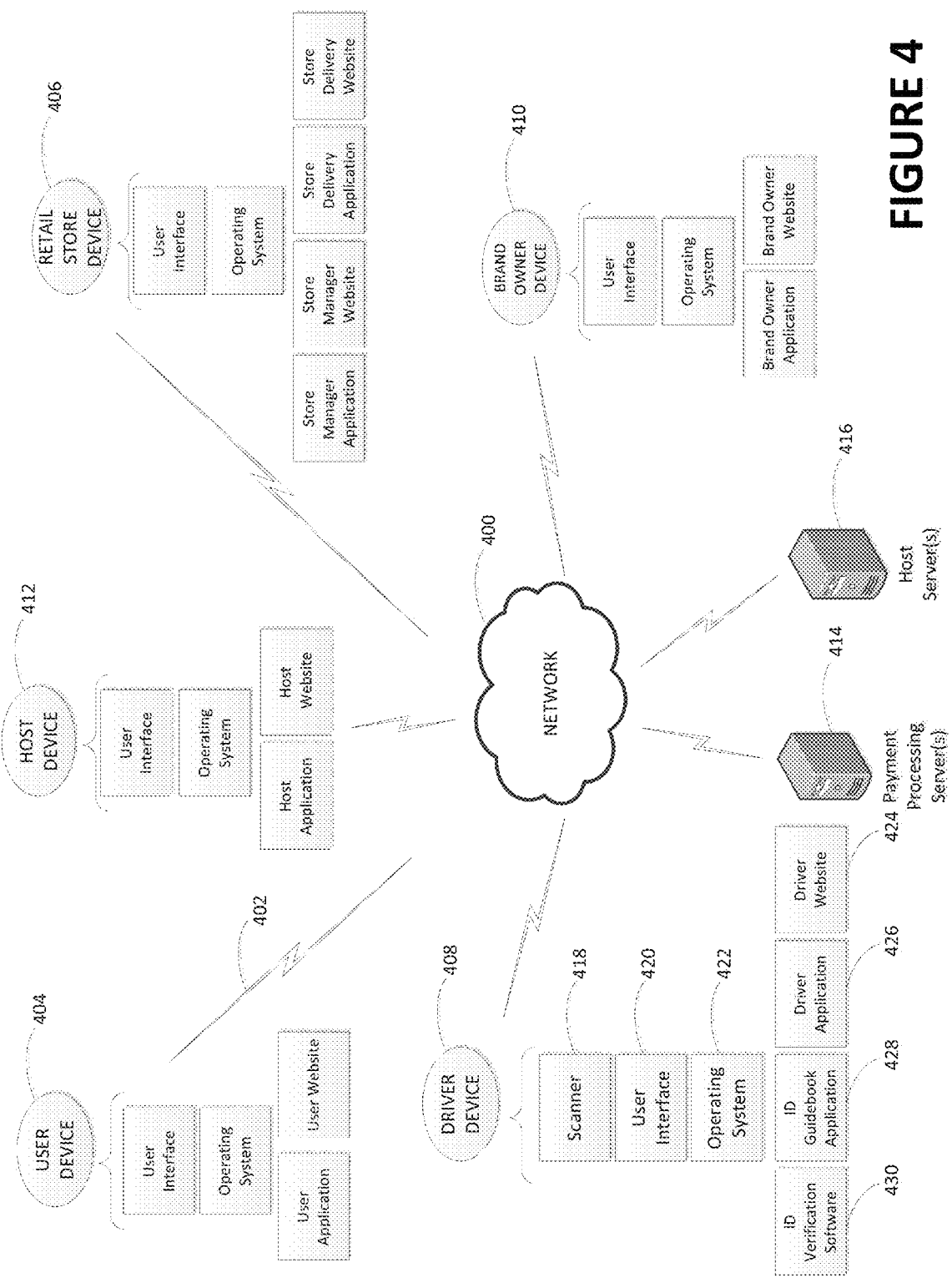

FIG. 4 shows some of the devices and servers involved in some implementations of our system, some pieces of software and hardware associated with each device, and the connections 402 between the various devices and servers and the network 400. FIG. 4 shows a user device 404, a retail store device 406, a driver device 408, a brand owner device 410, a host device 412, a payment processing server 414, and a host server 416. A wide variety of other devices and combinations of them can be used in implementations of the system.

The devices 404, 406, 408, 410 and 412 may be cellular phones, smartphones, tablets, laptops, personal computers, or terminals, and others, and combinations of them. Some examples of our system may include more devices, such as multiple host devices or multiple brand owner devices. The connections 402 may be Internet connections, cellular connections, radio connections, dial up connections, and any other communication connections of any kind. The network 400 may be the Internet, a cellular network, a local area network, a wide area network, a virtual private network, and other kinds of networks and combinations of them. Some of the pieces of software and hardware associated with each device are also depicted. For example, the driver device 408 can include a scanner 418, a user interface 420, an operating system 422, a driver website 424, a driver application 426, an ID guidebook application 428 and ID verification software 430.

Figure 55:
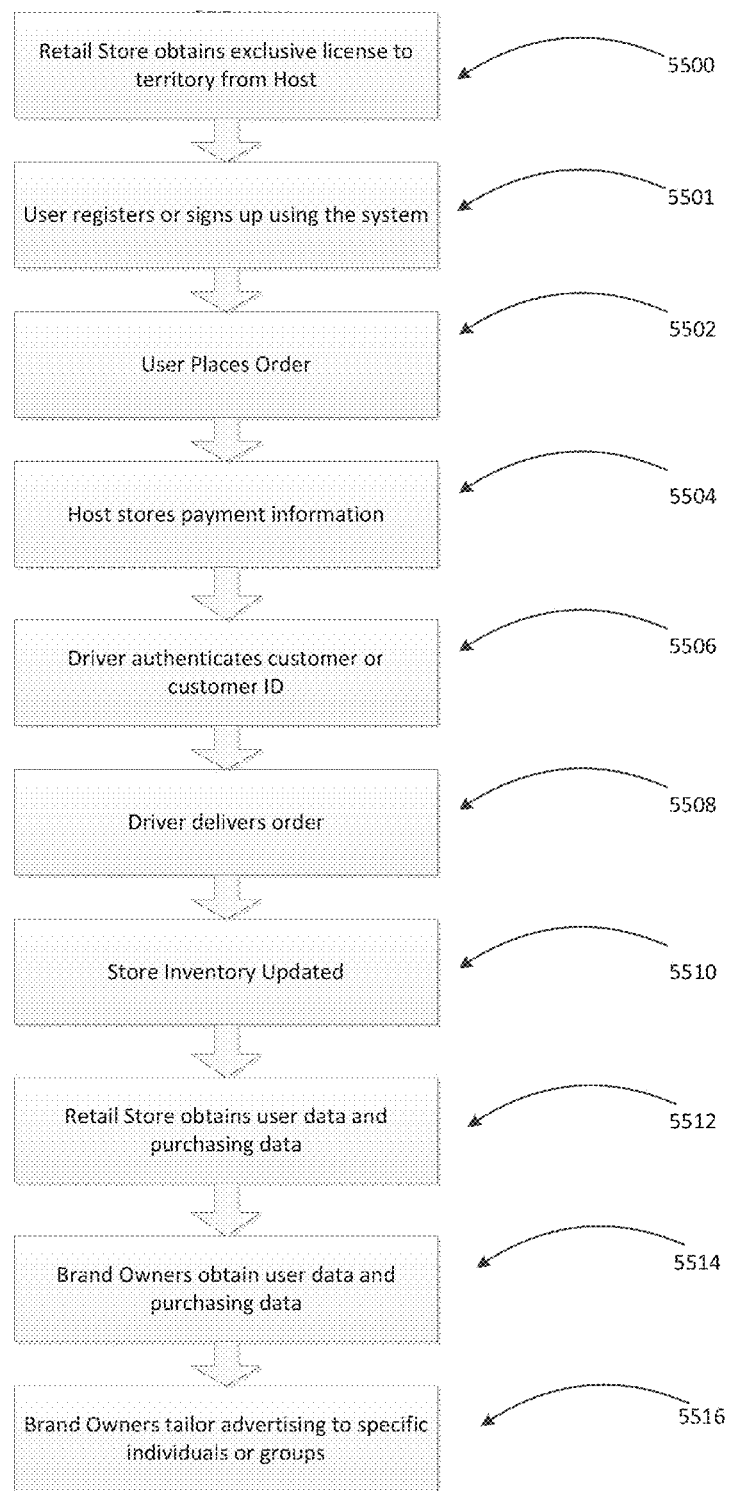

The system can maintain one or more databases of information that are necessary or useful to operation of the system. The databases can be located centrally or distributed. A wide variety of data items that relate to the transactions, the stores, the customers, third parties, payment transactions, brands, data analysis, demographics, user accounts, and other matters can be part of the databases. Among the data items that can be part of the databases are the following:

Customer Database:
  User ID (1 through N of users auto-incremented by the number of users registered)
  Email
  Password
  PG-assigned ID
  Card Status (e.g., expired, pre-authorized, combination of both, type of card, etc.)
  Billing Name, Address, City, State, Zip, Phone
  Delivery Name, Address, City, State, Zip, Phone
  Flag (flags categorize users anonymously without discrimination on a variety of characteristics, such as difficulty of the delivery process, fake ID, loyalty program, and demographic information, all anonymously kept with values known to the host (e.g., 1 for difficulty finding location for delivery, 2 being fake ID presented, etc.)
  Birth Year
  Latitude, Longitude
  Token
  Birthdate
Store:
  Store ID (assigned by the host)
  Name
  Address, City, State, Zip
  Latitude, Longitude
  Tax (%) (e.g., if applicable, for systems across multiple tax zones)
  Merchant ID (PG assigned)
  Delivery Open, Delivery Close
  Days Closed
  Phone
  Email
Store Zone:
  Store Zone ID (e.g., the store's territory)
  Zip Code
  Upper Left Corner Latitude, Upper Left Corner Longitude
  Bottom Right Corner Latitude, Bottom Right Corner Longitude (upper left and lower right locations are enough to define a simple rectangular territory, for example)
  Store ID Some implementations of processes involved in using our system are shown in FIG. 55. In step 5500, a retail store obtains an exclusive license from the host for a certain territory (for example, a particular geographic region). In step 5501, a user registers or signs-up using the system. When registering or signing up, a user may enter many kinds of information, such as the user's name, gender, birthday, delivery address, delivery phone number, billing address, billing phone number, credit card number or other information. When a user accesses the system from or otherwise belongs to that territory, the user will only be able to purchase from the licensed retail store for that territory. In step 5502, a user accesses the system and places an order. In some implementations, once an order is placed, the user's credit card (or any form of payment) is authorized for a non-refundable restocking fee. As shown in step 5504, the host stores any payment information entered by the user. In step 5506, the driver brings the purchased products to the user and authenticates the user and characterizes, verifies, and authenticates the user's identification (ID) card or other form of identification. This step is important for the sale of certain items, such as alcohol, that are restricted. During this step, the driver may scan the user's identification card and transmit or retain the user's information. In step 5508, the driver delivers the order once verification and authentication is complete. In some implementations, the remaining balance (total purchase price minus the non-refundable restocking fee) is then charged to the customer's credit card (or any form of payment). In step 5510, the store inventory management system is updated to reflect the sale to the user. In step 5512, the store receives information about the user (e.g., the information obtained from scanning the user's identification card) and stores the information about the purchase. This allows the store employees, managers and owners to view and track different metrics, such as the demographics (age, gender, location) of users, the types and quantities of consumer products sold, the number of sales per time period, and other information about the user and the transaction, for example. In step 5514, the brand owners also obtain information about the sale and the user. As shown in step 5516, this data will allow brand owners to craft advertising campaigns directed to individual users or groups of users, or that run during specific time periods, or otherwise use the information to craft an advertising strategy. The information can be used to improve a brand's advertising in general, or to inform the brand owner's advertising on the user application.

In some examples of our system, the host generates revenue by, for instance, managing the system through the host application and maintaining the host servers. The revenue model can involve many sources of revenue. For instance, the host can obtain monthly or yearly (or any period of time) subscriptions from retail stores (e.g., from licensed liquor stores) for exclusivity of delivery rights in relevant geographical areas. The host may also be able to obtain a fee per transaction from the retail store. Advertising revenue from brand owners represents another possible source of revenue. Brand owners can pay for both general and targeted advertising.

Additional revenue streams can also be developed through the use of the system. For instance, the host can create other products or services, or partner with other individuals, business entities, or organizations to create related or supporting applications or services. These ancillary partnerships, products or services and combinations of them can generate additional revenue in unlimited ways— for instance, through advertising, yearly subscriptions, and licensing revenues across a broad range of industries. A specific example could be a partnership between a host and an identification verification company to develop an identification characterization, verification or authentication application that can be used by the government (e.g., at security check points), in-store sellers (e.g., for identification checks in gun stores or liquor stores), and bouncers (e.g., at the entrance to night clubs or casinos) and in many other industries and situations.

ID characterization, verification and authentication systems that could be used in the system that we are describing are available from a range of vendors, including Advanced ID Detection, LLC (AIDD), of Medway, Mass. To aid the job of the driver or other person charged with confirming a customer's ID, a mobile ID guidebook can be provided as an alternative to a traditional paper "Bar Book" used by many businesses to authenticate ID cards. The mobile guide can be part of a mobile ID characterization, verification or authentication platform that can be part of the system that we are describing and also available for licensing across other industries. Furthermore, as a result of federal regulations requiring major brands to spend a percentage of their total advertising budget on measures that prevent underage drinking, large brands may sponsor the mobile ID guidebook, which can yield a lucrative advertising revenue stream on top of the yearly (or other time period) subscription fee.

In some examples, the system described here allows users to interact with retail stores based on the respective locations of the users and retail stores. This and other concepts described here (such as the in-store terminal, point-of-sale, and inventory management systems, and the identification applications described below) are scalable and transferable across many different industries. Furthermore, any store having the appropriate hardware may be able to implement these systems for its own uses.

Some implementations, described in more detail below, can use a system of the kind being developed by Drizly, Inc., for the liquor distribution market. In these examples, customers buy alcoholic beverages (and maybe associated products like mixers, bottle-openers and snacks) from local licensed liquor stores, and the products are delivered to the customers. As mentioned earlier, of course, similar and other systems can be used in the liquor market and in a wide range of other markets for similar and other purposes.

One aspect of our system is the exclusive lease of certain geographical areas (or other kinds of territories) to individual stores or groups or chains of stores. For instance, the system will allow a local liquor store the chance to have exclusive rights to an area (or other kind of territory) by leasing the rights to those territories on a per month (or per year or any other time period) basis. This exclusivity may help the participating liquor stores beat competition that might otherwise be serving the same or similar territories, in an otherwise undifferentiated market. In some cases, the host may allow liquor stores to lease the areas (or territories) that they deem most profitable for a price that suits their budget. In some cases, the host may independently set the geographical regions or other territories and prices for them.

In some examples, the license requires payment of a flat monthly fee by the retail stores. In some cases, a liquor store may sign a contract renewable at the beginning of every month (or year or any period of time) that includes a flat fee or a small percentage of total sales or a fee per transaction or a combination of any two or more of those or other arrangements. In some cases, stores will pay for exclusive rights to a leased area (we sometimes use the term "area" or "zone" interchangeably with "territory") in the form of both a flat monthly fee and flat fee per transaction. Because of the laws that may apply to liquor licenses, this may be preferable to the host taking a percentage of total sales. The host may choose not to directly take a percentage of sales, as in some states (like Massachusetts) doing so implies part ownership of a liquor license (thereby subjecting the host to some liquor control laws).

In some cases, the inclusion of a percentage of sales or a fee per transaction demonstrates that the host is committed to increasing the number of transactions per month, not just setting up the infrastructure and walking away. For instance, the combination of a flat monthly and transaction fee shows liquor stores that the host has an interest in increasing the total number of transactions for their stores.

This revenue model also allows the host to set the value of each area on a rolling basis (e.g., monthly when the new contract is signed), and does not lock a particular liquor store into an undervalued contract if the licensed area suddenly becomes very profitable. Monthly (or periodic) leases for exclusive rights to a geographical area or territory may provide a stable flow of revenue, and also allow the host to value and re-value each area on a rolling basis, as well as to approach multiple stores in the same area to compete for the best price. In the case of liquor stores, because wholesale liquor prices are publicly available (in some states, like Massachusetts) and retail prices are provided to the host by the store as part of the process of participating in the system, the host may be able to accurately calculate the gross margin of each area and suggest a starting value to stores for exclusive licenses that maintains room for bottom line profit.

In some examples, when customers first register using the user application, they will be prompted to enter and store a credit card or other payment information. This payment information may be removed, but for the customer to continue using the system other payment information must be added. In some cases, users will be able to add and remove as many credit cards as they would like. The inclusion of a pre-stored credit card (or other payment information, such as bank account information) allows for immediate payment for the delivery of products, and facilitates a faster and smoother process. In some cases, it also means that the driver does not need to be directly involved with obtaining payment.

In some cases, if a customer's age is unverifiable, or if the customer is deemed underage, or unable to receive delivery for any reason, his purchase will be refunded. In some cases, a restocking fee (e.g., a flat fee, or 5%, 10%, 15%, or 20% of the purchase order price) will be assessed. For liquor sales, this restocking fee may dissuade underage customers from using the system, and will cover the costs (e.g., gas, labor, vehicle overhead, opportunity cost) of a failed delivery for the liquor store.

In this system, "restocking fees" can also be paid for services, or for products that are not put back on the shelves. For instance, a restocking fee can be charged to the customer even if an incomplete delivery means that the product is thrown away (for instance, for perishable or made-to-order products). The restocking fee may dissuade customers from placing orders and then changing their minds. The restocking fee may encourage customers to be at the delivery location when the driver arrives.

In some examples, a payment processing system may act as an intermediary and process payments and refunds. Each store may have an account that is tied to the payment processor, and the store will receive funds from the transaction after purchase. This allows the host to link stores' bank accounts directly to sales to their stores, eliminating the host's liability from the transaction. Using one payment processor across all or many of the stores also gives the host the ability to negotiate transaction costs down the line, benefiting all of the stores.

In some examples, a retail store may be able to lease or purchase, from the host or another party, all the necessary hardware, with or without software pre-installed. For example, a liquor store may be able to lease an iPhone with a mobile ID Scanner pre-attached and pre-installed with the driver application, store manager application or store delivery application or a combination of all of them. The mobile ID scanner may help stores to verify the ages of customers, thereby eliminating the threat of underage delivery. This scanner may also record, save or transmit (or a combination of them) key customer data such as date and time of purchase, purchase price, items purchased (both identity and quantity), customer gender, age, state, and location (or a combination of any two or more of them). This data could be linked to specific customers or customer accounts maintained by the store or the host, and allow brand owners (and any other advertisers) to promote products or offer discounts and tailor advertisements to specific target demographics. In some states, it is legal for another party (e.g., a driver or retail store) to store and analyze any information obtained from an ID. In some states, only data voluntarily given can be stored or analyzed (e.g., linked to specific customers or customer accounts). In some states, customer information or ID information is considered voluntarily given even if that information must be shared by the user to use the service, and may be stored and analyzed as long as the user agrees to storage of information (e.g., in the terms and conditions in an end user license agreement (EULA)).

In some examples of our system, users will agree to terms and conditions to be able to use the user application, user mobile app, or user website. These terms can include permission to store and analyze customer information. These terms could include agreements to certain aspects of the delivery process. For instance, the terms could require acknowledgement that all drivers have the final say on the delivery of each order. In that case, the successful or unsuccessful delivery of an order could be at the discretion of each driver. This term could be important when the system is used in the alcohol distribution industry; it can help to protect the liquor store's liquor licenses by ensuring, for instance, that an individual 21 years of age or older is placing each order and that the customer is not obviously providing alcohol to individuals under 21 years of age. Other terms and conditions appropriate to respective industries and situations could be added.

Figure 53:
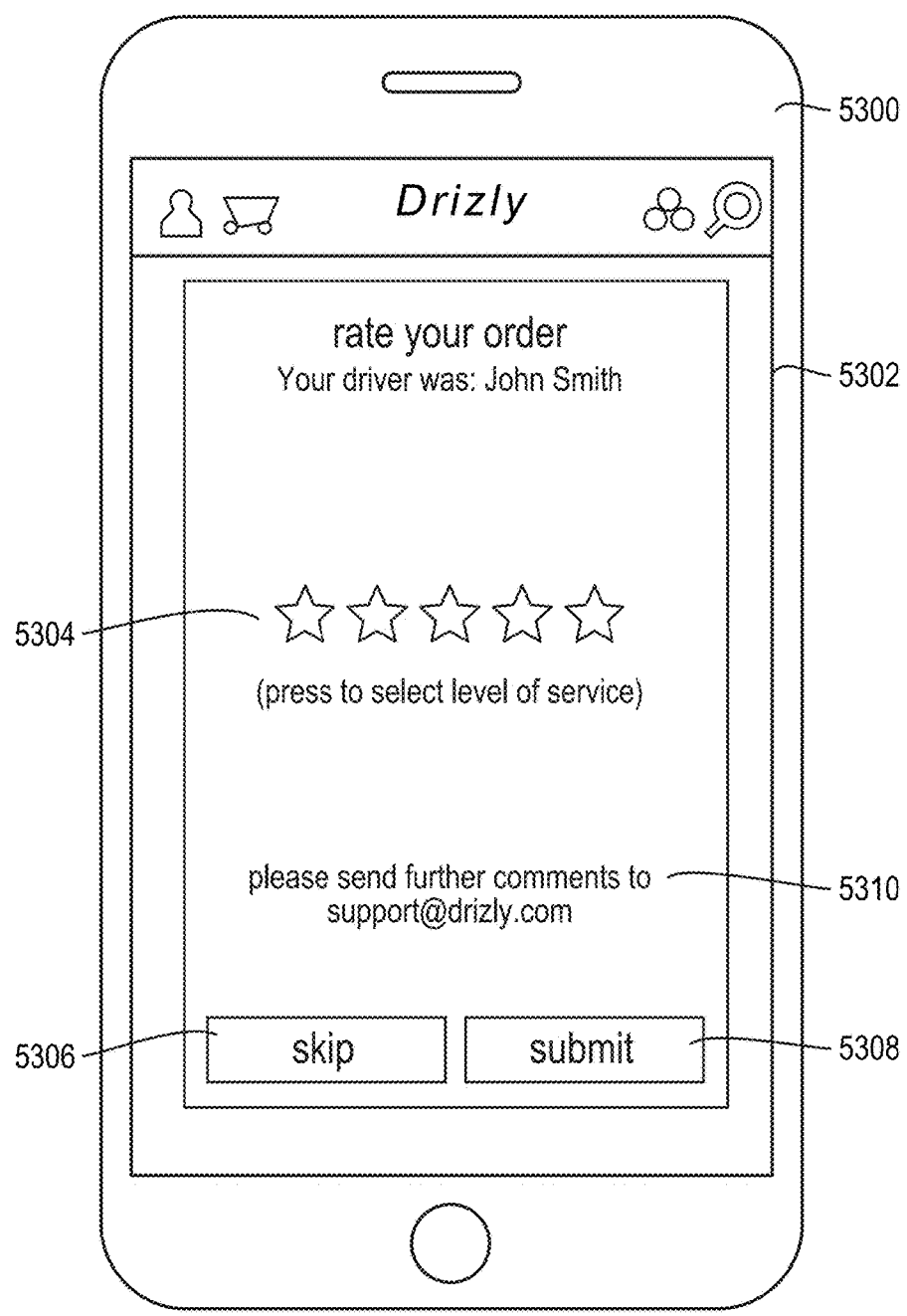

In some examples of our system, there could be a rating system (e.g., as shown in FIG. 53, described below). For instance, after a successful or unsuccessful delivery, the driver could rate the customer or the transaction (e.g., on a scale of 1-5, with 1 star being the worst rating and 5 stars being the best rating), or the customer could rate the driver or the overall purchasing experience using the same or a different rating system or both rating systems and others could be used. When a delivery has been confirmed, both the driver and customer could be taken to a "rating-screen." In some examples of our system, the driver or the customer may be required to rate the transaction, and, in some examples, they will not be able to use their applications again until the rating is completed. In some examples, the rating system ensures, from the customer end, that the stores will work to facilitate the sale and delivery (e.g., by providing good quality products or by selecting polite and competent drivers). The ratings also allow the host to track the overall performance of each store or driver or both. In some examples, because the store rates each customer, they may be able to track or note problem customers (e.g., customers who tried to use false identification in the past).

Other rating systems could be available (e.g., simple "thumbs up" or "thumbs down"). Also, other entities could be involved in rating. For instance, the store may be able to rate the drivers, or the brand owner may be able to rate the stores (for example, to make sure that the stores are maintaining a brand owner's good reputation). Ratings may be used internally within the system (e.g., by the stores, the brand owners and the host), or they could be posted or shared with other parties (e.g., other potential customers).

In some examples of our system, brand owners could advertise generally and broadly to all or most customers. In other examples, brand owners could engage in targeted advertising—e.g., advertising at specific time periods, for specific products, in specific locations or to specific individuals or groups. Advertisers may pay for advertising using many different models, such as pay-per-mile, pay-per-visitor, pay-per-view, or pay-per-click. Although these models may be employed, there may be no guarantee to the brand owner that they will directly lead to increased sales. For instance, although a pay-per-click model could be employed, there is no guarantee that a click on an advertisement will lead to a sale.

An advertising model could allow brands to sponsor deliveries if a user purchases a particular product. In this model, a brand owner would only spend money if a customer buys its product. For the user, the appeal of free delivery will often be enough to consider switching brands or adding an additional item to the cart. This tool could transform the way brands acquire new customers and release new products.

In some implementations, a user interacts with the user application or website in the purchase and delivery of alcohol to individual customers.

Figure 6:
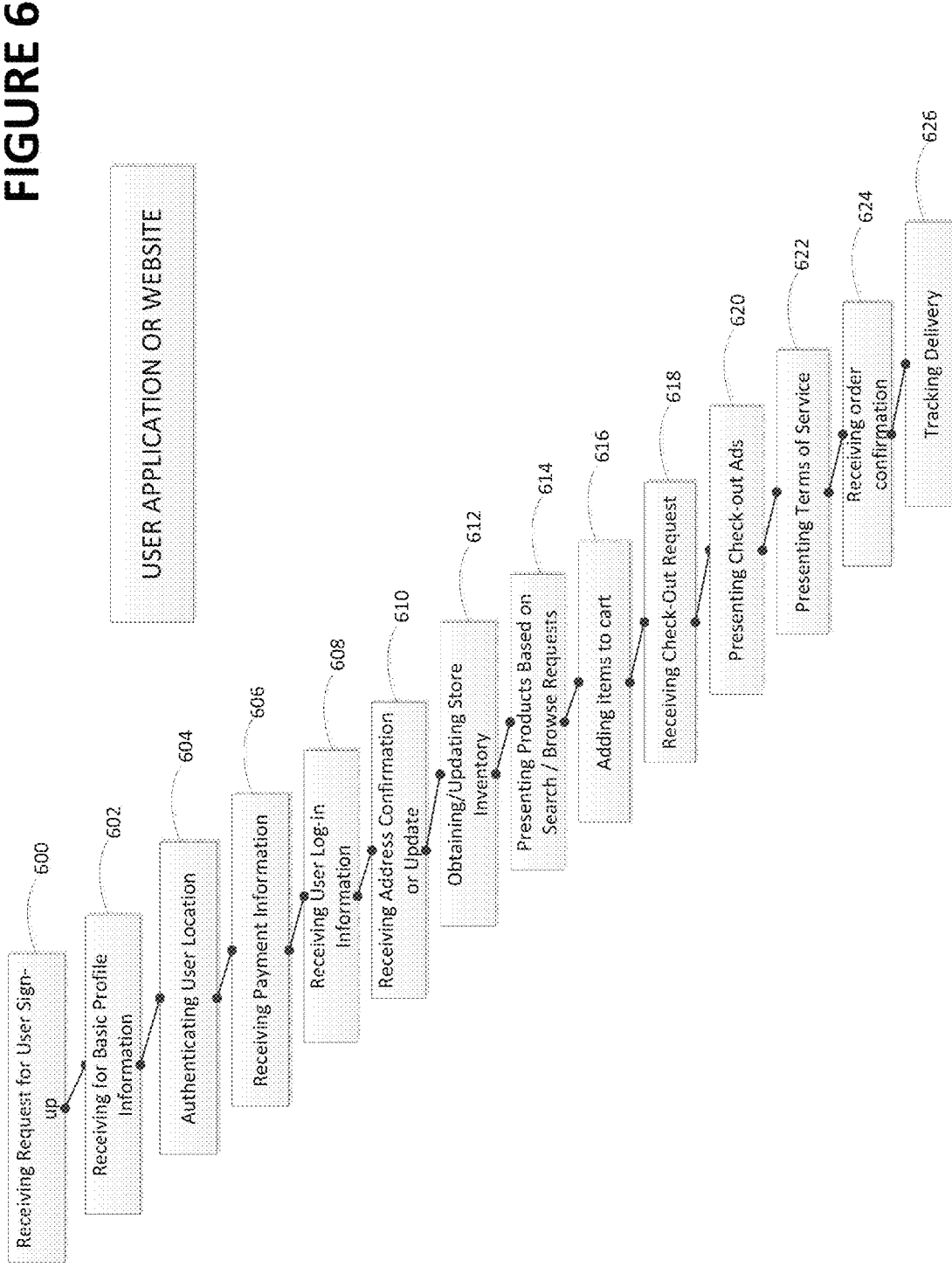

A block diagram overview of the user application functionality in this example is shown in FIG. 6. In step 600, when a new customer would like to use the application (we sometimes use the term application to refer to any part of the system that provides the function discussed, wherever located, and in whatever form, such as on the user's mobile device, at the host server, or at other places), the application receives a request for user sign up (registration). In step 602, the application prompts the user to enter basic profile information and then receives that information. In step 604, the application authenticates the user's location for delivery, for instance by accessing the user's coordinates using a GPS and then requesting user verification. The application may ask the user to input a desired delivery address. If the desired delivery address is not currently covered by (e.g., within the exclusive territory of) a store, the user will be prompted to request the system (or request a particular industry's use of the system) in his location. In step 606, the user is prompted to enter payment information (e.g., credit card information), and the application receives that information. At that point, the user may be prompted to create new log-in information. The user then uses that login information to log in to the application, as shown in step 608. In subsequent interactions with the application, the user may only have to enter his log-in information to begin using the application.

After logging-in, the user is prompted to update or verify address information (e.g., the address for delivery of purchased consumer products). The application receives this information in step 610. In step 612, the application obtains or updates the product offerings for the store with the exclusive license to the territory where the user is located. The application then presents the product offerings to the user (step 614) in the form of a selection screen. The products in the selection screen may be presented by price, brand, size, product release date, or product rating, or according to any other product characteristic, depending on the user requests. The user may also be able to search products by keywords. Products may also be presented based on the user's past purchasing decisions. In step 616, when a user selects a product for purchase, the application adds that product to the user's virtual shopping cart. The user may add and delete items from the user's virtual shopping cart.

When the user indicates that he or she has finished selecting products for purchase (for instance, by pressing a "checkout" button), the application receives a check-out request (step 618). The application may at that point present the user with a check-out ad (step 620). For instance, the ad may offer free delivery in return for buying Bud Light instead of Amstel Light, or in return for adding another six-pack to the order. The application then presents the user with the terms and conditions of service (step 622). The user must acknowledge and accept the terms and conditions to complete the order and receive the products. The application then receives the order confirmation, and sends the order to the store to complete the delivery (step 624). The user may be sent a push notification that confirms store receipt of their order.

Once the order has been filled (e.g., loaded onto the delivery vehicle) and is leaving the store, the user may be sent a second notification allowing him to track his order on a live map. The user application can track the order (step 626) and notify the user of the order status (e.g., when the store has received and confirmed the order, when the driver is enroute, or when the driver is outside the user's house). When the driver has arrived at the specified delivery location, a user may be sent a third push notification, or a text message, alerting the user to the arrival of his order. In some cases, the user must then provide a valid form of ID that matches the name of the account (inputted in the sign-up or registration step) and the credit card used to purchase the products. After the ID is scanned, the customer will receive his purchase, be billed, and may receive an electronic receipt. After the order is complete, a user may be directed to a rating screen, and asked to rate his experience.

Figure 7:
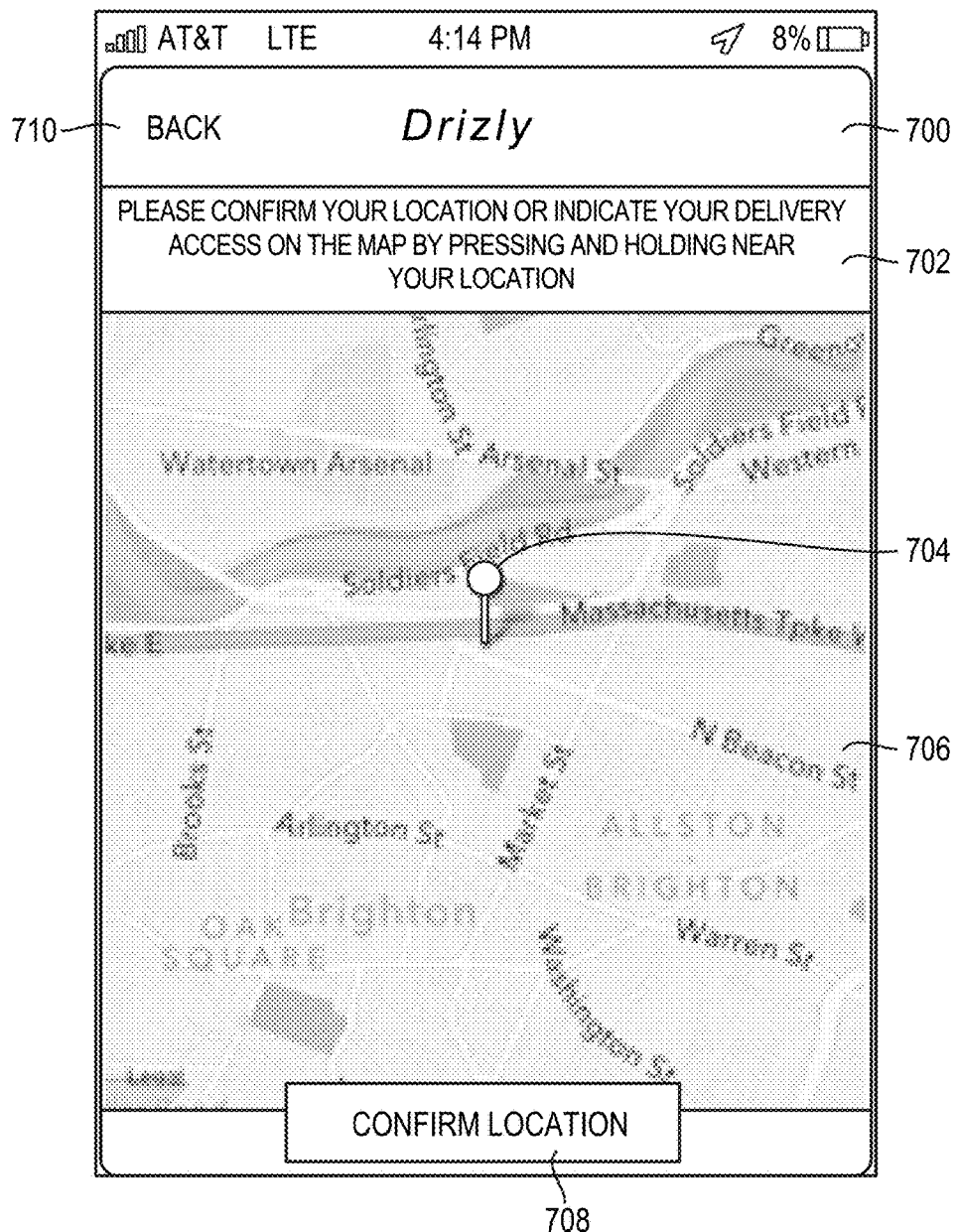

FIG. 7 shows a screenshot 700 of a user application on a mobile device for some implementations of the system. Before reaching this screen, the user may be asked if the application is allowed to use the user's current location. For instance, a mobile app can request access to a user's location the first time a user loads the mobile app after download via a push notification. If a user does not allow it, the user will be prompted to manually turn it on in the mobile device settings. If the user agrees, the user may be taken to a screen like that shown in FIG. 52 as the user's location is determined, for instance using geo-location. As shown in FIG. 7, the user is instructed to "please confirm your location or indicate your delivery address on the map by pressing and holding near your location" (as shown in instructions 702). The pin 704 on the map 706 indicates the address selected or found using geo-location. The pin 704 on the map 706 indicates the address selected. The user can change the location of the pin by, for instance, pressing for a period of time on a different location on the map 706. Once the user is satisfied with the location for delivery, the user can press the "confirm location" button 708 to move to the next screen. The user can press the "back" button 710 to return to the previous screen at any time.

The user's geographic location (latitude and longitude) and zip code (5 or 9 digits) are sent to the host server via a "CheckLocation" call, which authenticates whether a user is in an area serviced by the system. If the user is in a serviced area (e.g., a store has obtained an exclusive license to serve that area), the user is permitted to register. In some implementations, if the user is within a "latitude and longitude zone" claimed by store A and a "zipcode zone" claimed by store B, the "latitude and longitude zone" takes preference. This allows the host to easily divide geographic territories within the same zip code.

In some examples, once the user is determined to be in a certain territory, he will only be shown the products offered by the store(s) with the exclusive license(s) to that territory. This can be the product offerings of multiple stores, if, for instance, one store has the exclusive license to sell wine in a certain geographic region and another store has the exclusive license to see beer in that geographic region.

In all examples, an individual (user, driver, store manager, brand manager or any other individual) can indicate his choice by pressing, clicking, pushing, typing, or selecting a choice in any way. For instance, a user may press a button on a touch pad, click a button with a mouse, activate the button with a voice command, or use any other method for indicating a choice, or a combination of those methods.

Figure 8:
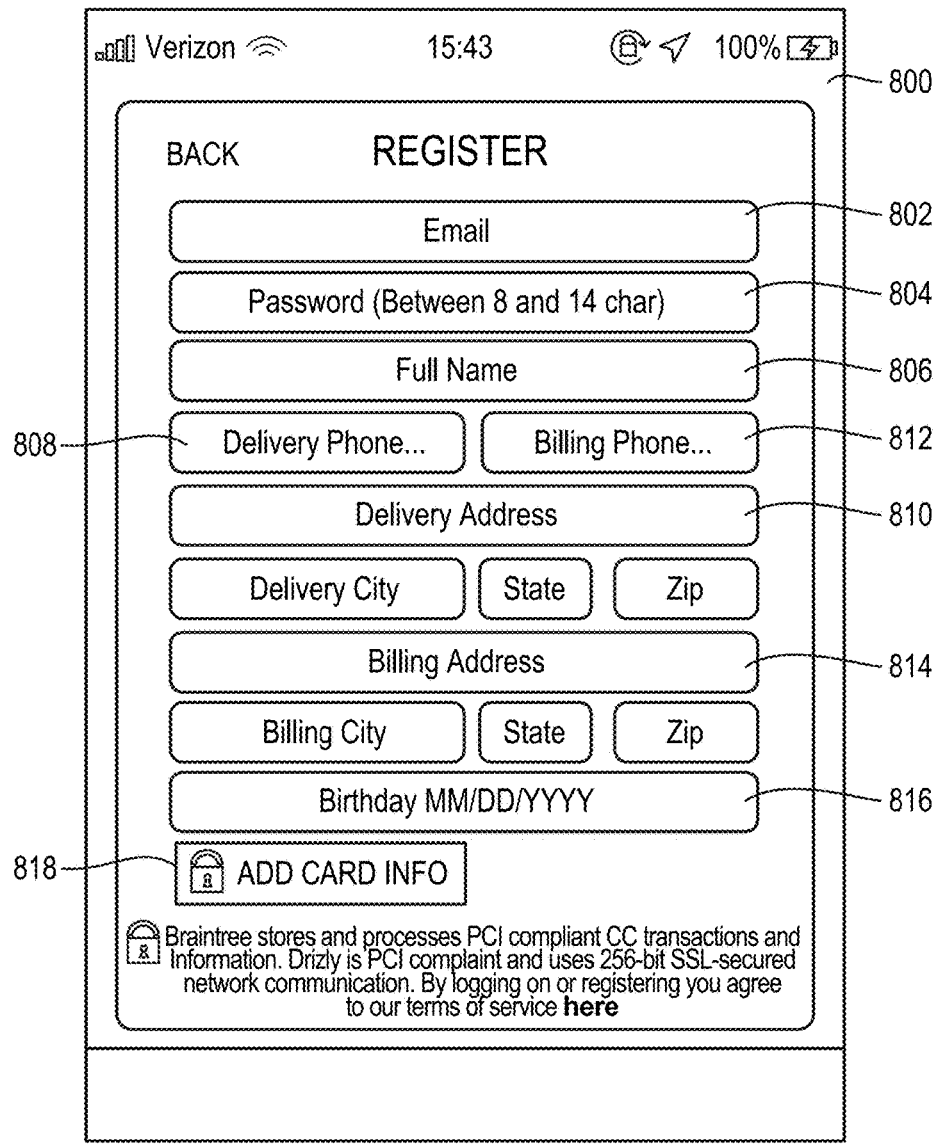
Figure 9:
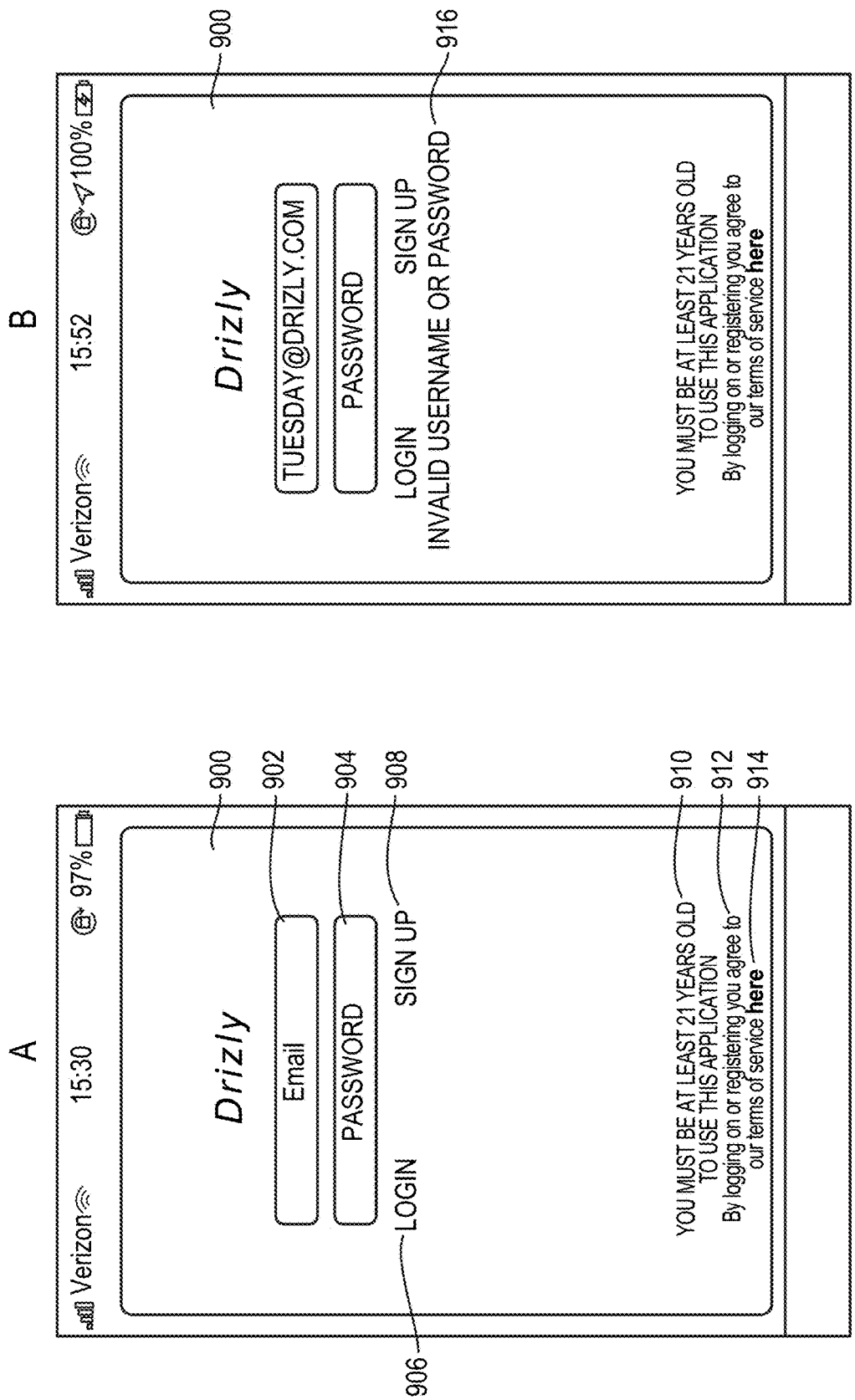

An example of a user registration or sign-up screen is shown in FIG. 8. FIG. 8 shows a screenshot 800 a user application on a mobile device for some implementations of the system. In this example, the user is prompted to enter some basic profile information, some delivery information, some billing information and some log-in information. In this example, the user is prompted to enter his email in the "Email" field 802. This email may be used, for instance, by the application to send order receipts or by the user to log-in on future occasions. The user is prompted to enter a password in the "Password" field 804. The user will use this password to log-in on future occasions. The user can enter his full name in the "Full Name" field 806. In some cases, the driver will only deliver the products ordered if the name entered in the "Full Name" field 806 matches the user's identification card (e.g., government issued identification card) presented to the driver. The user can enter a delivery phone number in the "Delivery Phone" field 808 and a delivery address is the "Delivery Address" field 810. This is the phone number and the location, respectively, where the user would like the products delivered. The user can enter a billing phone number in the "Billing Phone" field 812 and a billing address in the "Billing Address" field 814. In some examples, the billing phone number and billing address must match the phone number and address associated with the user's payment information (e.g., credit card). The user may also be prompted to enter his date of birth in the "Birthday" field 816. The user's date of birth is especially important for the sale of alcohol, where the sale is restricted to users 21 years of age and older. When the user has finished entering the requested information, the user can press the "add card info" button to store the information and move to the next screen.

In some screens or in some examples, the user may be prompted to add more payment information, such as the full name on a credit or debit card, the credit or debit card type (e.g., Visa, MasterCard or Discover), the credit or debit card expiration date, and the credit or debit card security code. In some implementations, the user may be able to enter his credit card using the camera on the user's mobile device (for instance, using card.io), as shown in screenshot 5100 in FIG. 51. To enter credit card information using the camera on a mobile device the user can press the "ok" button 5102. The user can choose to enter the credit card information (or other payment information) manually by pressing the "enter manually" button 5104. Payment information may be encrypted and stored in a secure manner, for instance using the application programming interface (API) of a payment processor.

In some examples of our system, once the user has registered, the user can log-in to the user application and begin making purchases. On future occasions, the user may only need to enter his log-in information (e.g., email and password) to begin using the system, and will not need to re-enter his payment information, date of birth, or other information.

FIG. 9A shows a screenshot 900 of a user application on a mobile device for some implementations of the system in which the user is prompted to enter his log-in information. To log-in, a user is prompted to enter his email in the "Email" field 902, and his password in the "Password" field 904. The user can then press the "Login" button 906 to log-in. If the user enters an incorrect email or password, or incorrect email and password combination, the user may be taken to a screen like that shown in FIG. 9B. If the user has not previously registered or signed-up, the user can press the "Sign Up" button 908. Pressing the "Sign Up" button 908 can, for example, take the user to the screens shown in FIG. 7, FIG. 8, and FIG. 52. In some examples, the user is presented with a warning 910 that reads, for example, "You must be at least 21 years old to use this application." This warning 910 may be used for applications that involve the sale of alcohol. Warnings appropriate for respective industries or locations may be added. In some examples, there is a notification 912 that reads "By logging in or registering your agree to our terms of service here." By pressing the "here" button 914, the user is taken to the application's terms of service.

Figure 10:
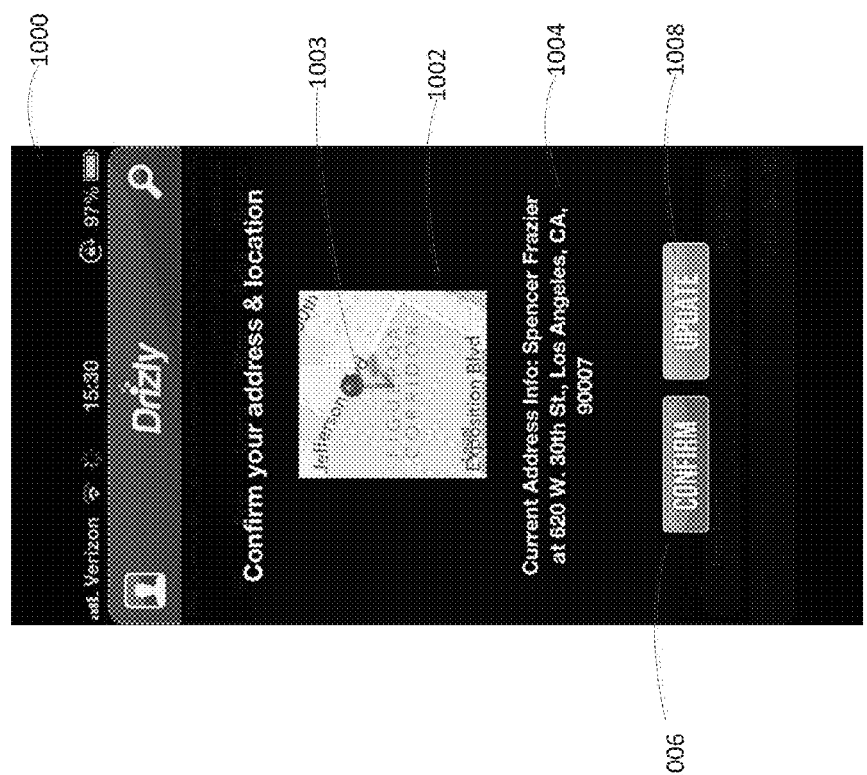

Once the user logs-in, for instance by filling in the fields 902 and 904 shown in FIG. 9A and pressing the "Login" button 906, the user may be asked to update or confirm the requested delivery address. FIG. 10 shows a screenshot 1000 of a user application on a mobile device for some implementations of the system where the user is asked to update or confirm a previously entered delivery address. The user can be shown a map 1002 with a pin 1003 indicating the previously stored address, and a textbox 1004 showing the current address information. The user can confirm the address shown in the map 1002 and textbox 1004 by pressing the "confirm" button 1006, or can change the address by pressing the "update" button 1008. If the user presses the "confirm" button 1006, he will be able to proceed to place an order. If the user presses the "update" button 1008, he may be taken to a screen (e.g., the screen shown in FIG. 14) where he is asked to update his delivery address (and possibly other information).

In some examples, when the user logs-in to the system (for instance by filling in the fields 902 and 904 shown in FIG. 9A and pressing the "Login" button 906) or when the user reopens the application, the user may trigger a "Get-StoreInventory" call to the server, which again validates the user's location. The inventory (available products) and store identification (storeID) which are sent in the response to that call belong to the store (or stores) that currently holds the active rights over that area or territory (e.g., the store who licensed the exclusive rights to sell in that territory). In some examples, all calls are sent via HTTP post to the server which processes the requests and sends back JSON objects with the appropriate data.

In some examples, once the store inventory is updated on the user application, the user may be presented with screens like those shown in FIGS. 11A-11E. FIGS. 11A-11E shows several screenshots 1100 of user applications on a mobile device for some implementations of the system that allow the user to browse and select products for purchase and delivery. A user may be presented with a list of products 1102 for sale. Each product may be listed with the following information: brand, quantity of item (750 ml, 6 pack bottles, etc.), type of alcohol (Beer, Wine, Liquor, Extra, etc.), and count price. In some examples, additional or different information may be available. A user can view all products available at the store for his location by pressing the "all" tab 1104. A user can view subcategories of products for sale at the store (or stores) for his location by pressing, for instance, the "beer" tab 1106 to view all available beer products, the "liquor" tab 1108 to view all available liquor products, the "wine" tab 1110 to view all available wine products, or the "extra" tab 1112 to view all additional products, such as bottle openers, coasters, snacks, mixers, etc. In some examples, the user can also sort products by brand by pressing the "brands" tab 1114. When a tab 1104, 1106, 1108, 1110, or 1112 is selected, it can be highlighted or turn a different color. Additional or different tabs may be available. Sometimes the tabs vary depending on the store, the industry, the user, or the location, among other factors. For instance, a tab may be presented that lists items frequently purchased by a particular user or by all users or by any subset of users, or a tab may be presented that lists the products with the highest ratings.

FIGS. 48A-C show several screenshots 4800 of user applications on a mobile device for some implementations of the system after a user has selected a tab (such as tabs 1104, 1106, 1108, 1110, or 1112 shown in FIG. 11). For instance, FIG. 48A shows a screenshot 4800 for some implementations after a user has selected the beer tab 1106. FIG. 48B shows a screenshot for some implementations after a user has selected the liquor tab 1108, and FIG. 48C shows a screenshot for some implementations after the user has selected the wine tab 1110.

Referring again to FIGS. 11A-E, a user can get more information about a product by pressing the "info" button 1116 or the "info arrow" 1118. Information provided when a user presses the "info" button 116 or the "info arrow" 1118 may include: brand, quantity of the product, type of alcohol, count price, a picture of the product, or a description of the product. Some examples include additional or different product information or combinations of product information, such as user reviews, or user ratings.

A user can select a product to purchase by pressing the "Plus" button 1120 to the right of the item's price 1121. Pressing the "Plus" button 1120 will, for example, add that product to the user's virtual shopping cart. To remove a product that was selected for purchase, the user can press the "Minus" button 1122, or can remove all selections by pressing the "Empty Cart" button 1124. The "Empty Cart" button 1124 is only active when there is at least 1 product in the user's virtual shopping cart. As items are added or removed with the "Plus" button 1120 and "Minus" button 1122, the product number 1123 to the right of the product, indicating the quantity of that item the user wishes to purchase, is adjusted. When a product is added or removed, the user's total 1125 is updated to reflect the total purchase price for the products in the user's virtual shopping cart. To initiate the checkout process with the selected items, the user can press the "Checkout" button 1126. In some cases, the "Checkout" button 1126 will only activate once there is at least one product in the user's virtual shopping cart.

At any time, a user can view or modify his profile (e.g., delivery address and phone number, or payment information) by pressing the "Profile" icon 1128 or the "Profile" button 1130. The user can also track orders that were placed previously by pressing the "track" button 1132. In some examples, store information (e.g., store address, phone number, website, or email) and delivery information 1133 is presented. To search the available products, the user can press the search icon 1134. A search field 1135 as shown in FIGS. 11D and 11E may appear that allows the user to type in search terms 1136 (such as keywords or parts of keywords, product numbers, or brands). In some implementations, the user is able to search for products 1102 listed within a certain tab 1104, 1106, 1108, 1110, or 1112. In some implementations, a touchscreen keyboard 1137 pops up when the user places his cursor on or presses on search field 1135. The user can type in search terms 1136 using touchscreen keyboard 1137, and press the "search" button 1138. A list of products 1102 that correspond to the search terms 1136 will be displayed. The user can cancel the search by pressing the "cancel search" button 1140.

In some examples, individual product offerings are highlighted or emphasized. For instance, a highlighted product 1142 may be a popular product (e.g., most purchased item or highest ranked item), or a brand owner may pay to have a product highlighted. Highlighted products may appear in search results, or in any other list of products (e.g., in the list of products under the "beer" tab 1106).

In some cases, in addition to being listed with other products 1102, products may also be featured a second time in a separate banner 1144. Users may be able to purchase the featured item from the list of products, or from the separate banner 1144. The separate banner 1144 may be populated based on brand campaigns or a user's purchase history. Advertisements could include microtext, such as 140 characters of microtext displayed at the top of certain screens. In some examples, brand owners may buy the rights to the 140 characters of microtext.

In some implementations, a user can get more information about the product featured in the separate banner 1144 by pressing on the separate banner 1144, or by selecting a featured product tab. In some examples, the user may be brought to a featured product page, as shown in the screenshot 4900 in FIG. 49. The featured product page may contain more information about the featured product, including a description 4902 or an image 4904 of the featured product. The user may be able to add the featured product to his virtual shopping cart directly from the featured product page by pressing the "add to cart" button 4906.

FIGS. 12A-12B shows a screenshot 1200 of a user application on a mobile device for some implementations of the system after the user selected the "brand" tab 1114 shown in FIG. 11A. The user is presented with a list of brands 1202. The list is comprised of brands whose products are available at the store that has exclusive rights to the user's territory. By pressing the brand 1202, the user can see a listing of all available products for the selected brand. By pressing the "brand page" button 1204, the user can be directed to the brand page, described below. In some cases, the separate banner 1144 visible in FIG. 11A can also be seen in the brands screen shown in FIG. 12A. In some cases, the brand of the product featured in the separate banner 1144 may be marked or highlighted in the list of brands 1202. For instance, the brand name may be highlighted, underlined, italicized, or in bold or it may be flanked by brand images 1206.

By adding the product featured in separate banner 1144 to the user's virtual shopping cart, the user may be rewarded with priority shipping, as shown in the "thank you" notification 1208 in the screenshot 1200 in FIG. 12B.

Figure 50:
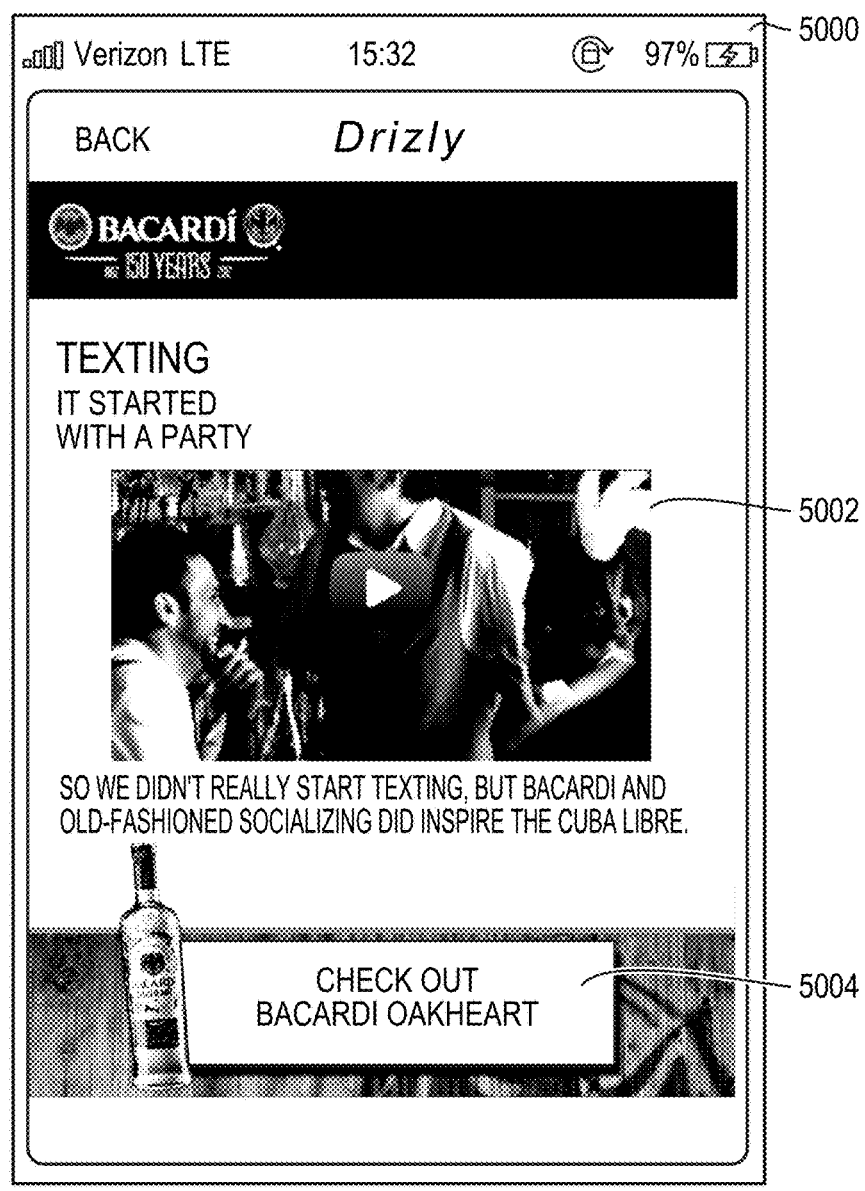
Figure 51:
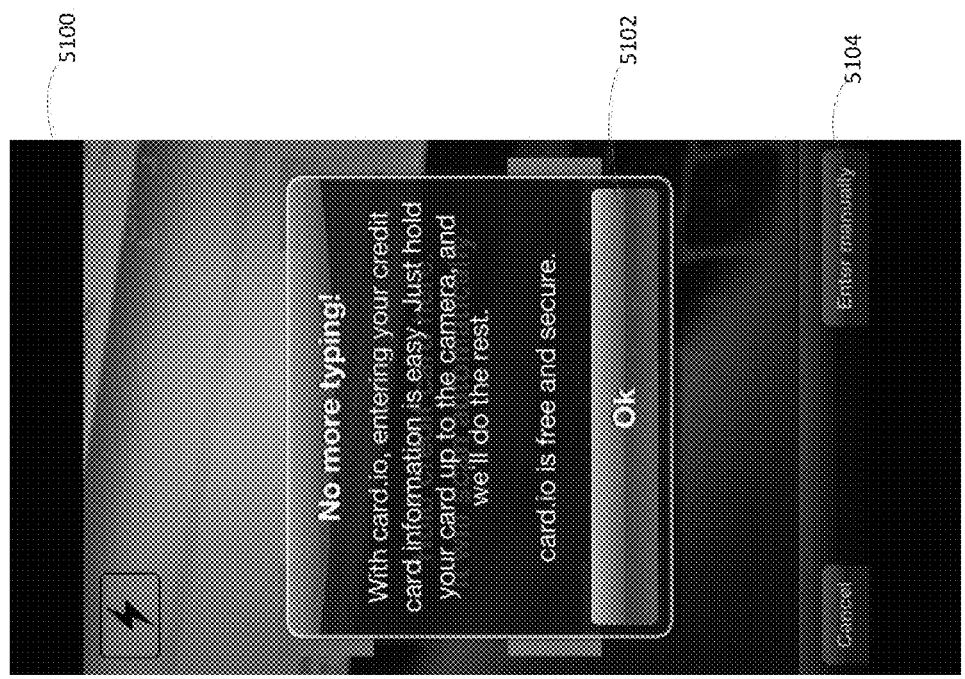
Figure 52:
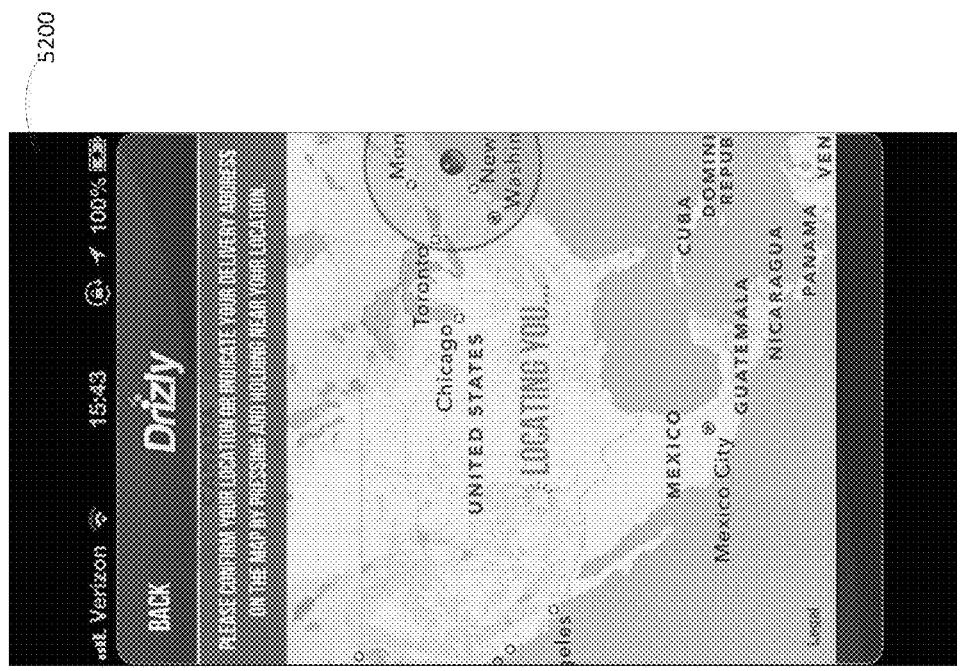

By pressing the "brand page" button 1204 shown in FIG. 12A and FIG. 12B, the user can be directed to a brand page, an example of which is shown in FIG. 50. Brand pages are described in more detail below. Brand pages can provide information about a certain brand owner, highlight certain products offered by a brand owner, or contain advertisements for the brand. Brand pages can be maintained by the host, the brand owner, a public relations firm, or any party, and they can include text, images, video and sound. For example, in the example Bacardi brand page shown in FIG. 50, the user can view a video 5002, or can press the "check out this product" button 5004 to view more information about a Bacardi product and purchase that product.

In some implementations, all (or multiple) tabs show lists of brands, and the user can only see the individual products when the brand is selected. For instance, when the user presses the beer tab 1106 shown in FIGS. 11A and 11B, he may be presented with a list of brands that have associated beer products. To see the individual beer products associated with a certain brand, he may have to select that brand. For instance, the user may be presented with a list that includes "Budweiser," "Miller," and "Coors." If the user wants to purchase "Bud light," he will have to select "Budweiser" from the list to see the individual Budweiser products.

Figure 13:
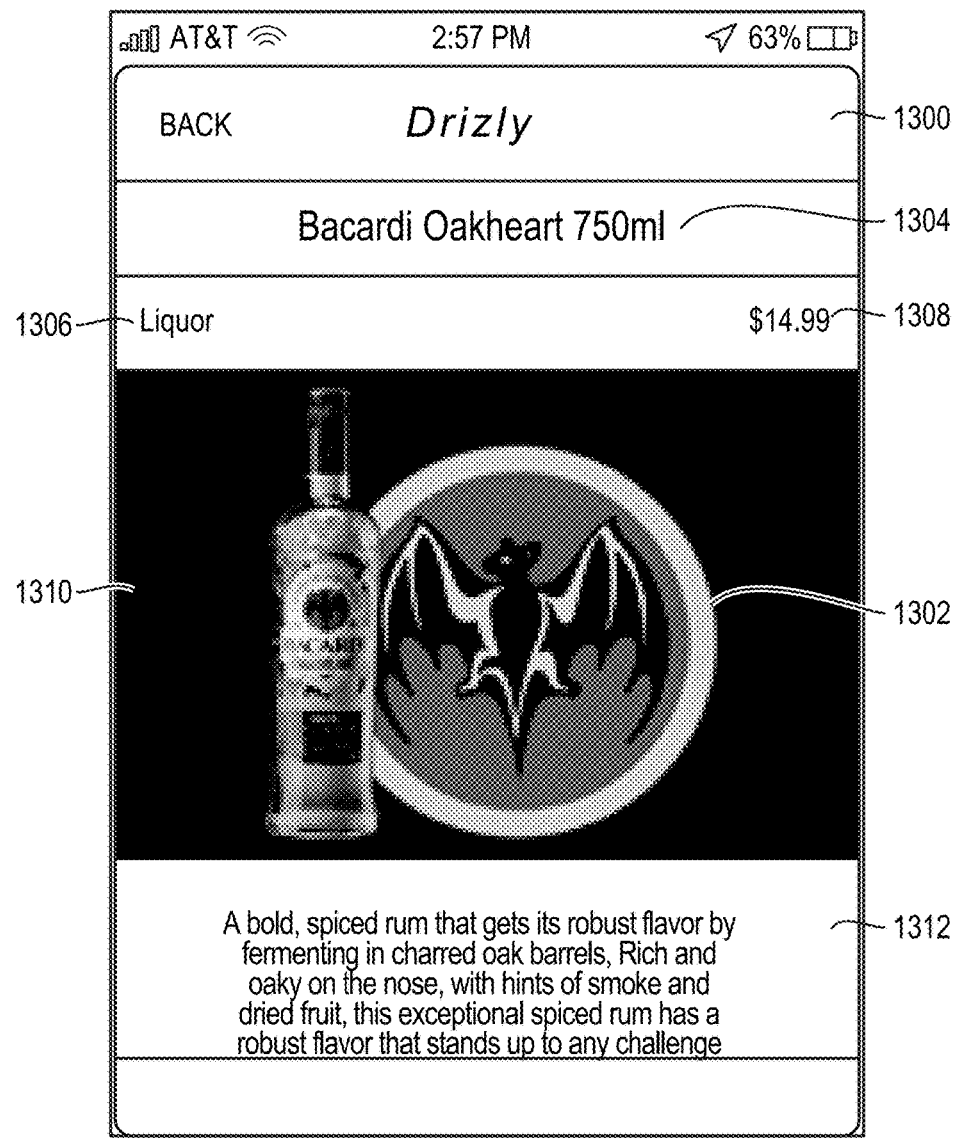

FIG. 13 shows a screenshot 1300 of a user application on a mobile device for some implementations of the system after the user has selected the "info" button 1116 or the "info arrow" 1118 shown in FIGS. 11A and 11B. Information provided can include the brand icon 1302 (e.g., a trademarked brand image), the quantity of the product 1304, the type of alcohol 1306, the count price 1308, a picture of the product 1310, or a description of the product 1312. In some examples, different or additional information may be available about the brand or the product.

Figure 14:
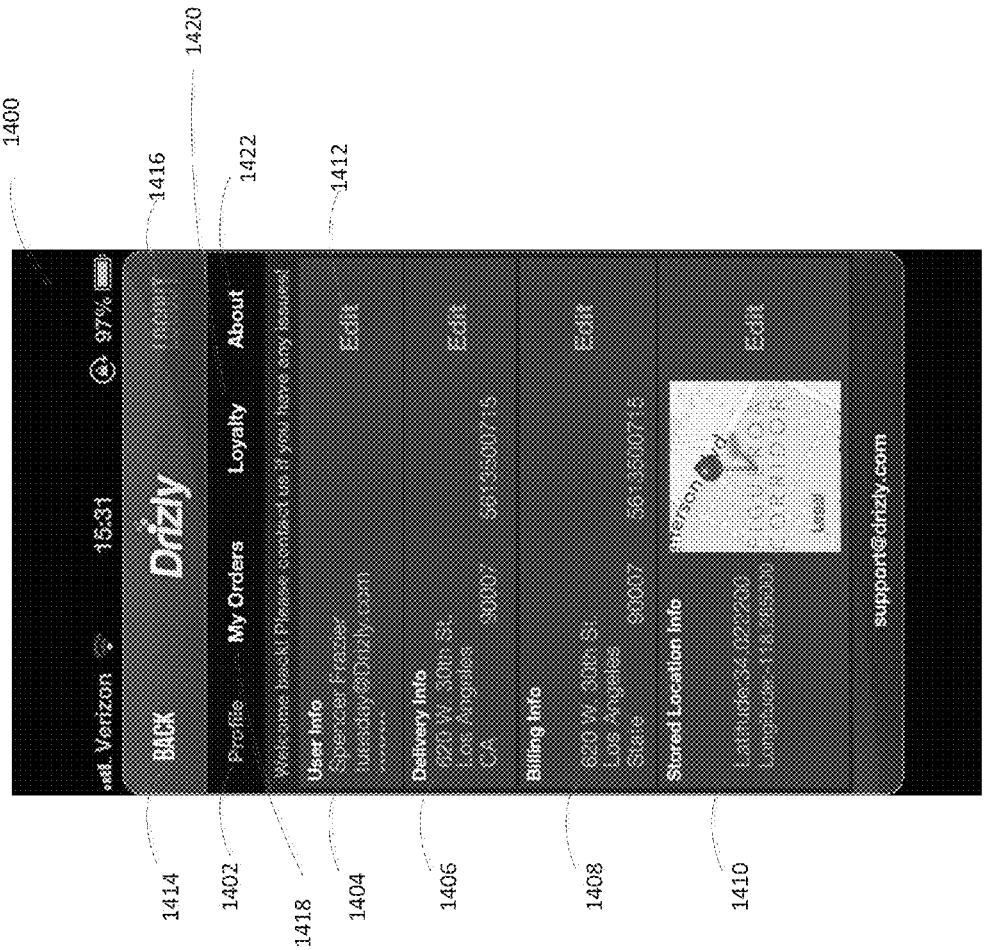

FIG. 14 shows a screenshot 1400 of a user application on a mobile device for some implementations of the system after the user selected the "Profile" icon 1128 or the "Profile" button 1130 shown in FIGS. 11A and 11B. The profile tab 1402 can include user information 1404 (such as the user's full name, email and password), delivery information 1406 (such as delivery address and delivery phone number), billing information 1408 (such as the billing address and billing phone number) and the application's stored location information 1410. The stored location information can include a collection of previously entered delivery locations. For instance, a user may have a location "office," another location "home," and another location "lake house." The user will not have to re-enter delivery addresses. The user may edit each information section 1402, 1406, 1408, and 1410 by pressing the "edit" button 1412 next to the information the user wishes to edit. For instance, the user may be able to edit the addresses for stored locations, or select a new default address.

By pressing the "back" button 1414, the user is returned to the product listing screen, such as those shown in FIGS. 11A-E. The user can also log-out by pressing the "logout" button 1416. From this screen, the user can press the "My orders" tab 1418 (to view the user's order history, perhaps including all previously purchased products), the "loyalty" tab 1420 (to view information about brand loyalty, store loyalty, or host loyalty) or the "About" tab 1422.

In some implementations, there are 3 types of loyalty programs: brand, store, and host. A user may be able to track metrics associated with the different loyalty programs, and may have the ability to earn rewards. For instance, a user may be able to track his store loyalty by tracking the number of orders the user has placed at a given store. In some examples, once the user has made 10 separate completed orders from Store J, the user is offered "X." "X" may be a free delivery, discounted products, or the ability to choose from free merchandise (e.g., products adorned with the store's logo or products from the host). Similar programs may be implemented for brands and the host. The loyalty programs can be based on totals (e.g., total quantity or total purchase amount), and the rewards can be the same or different under the different loyalty programs.

Figure 15:
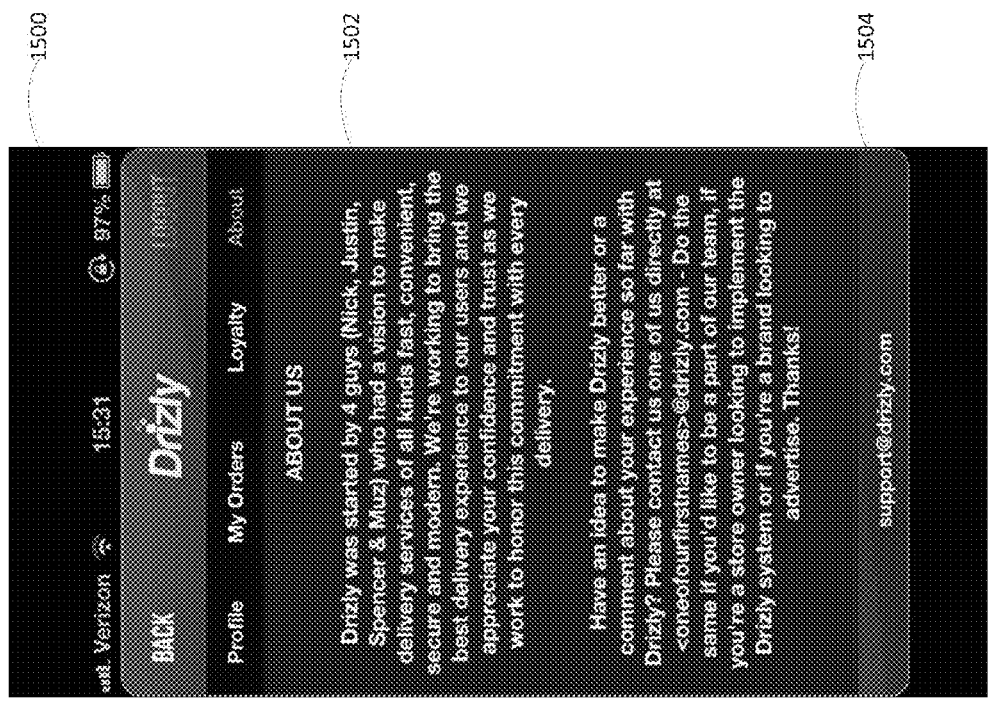
Figure 17:
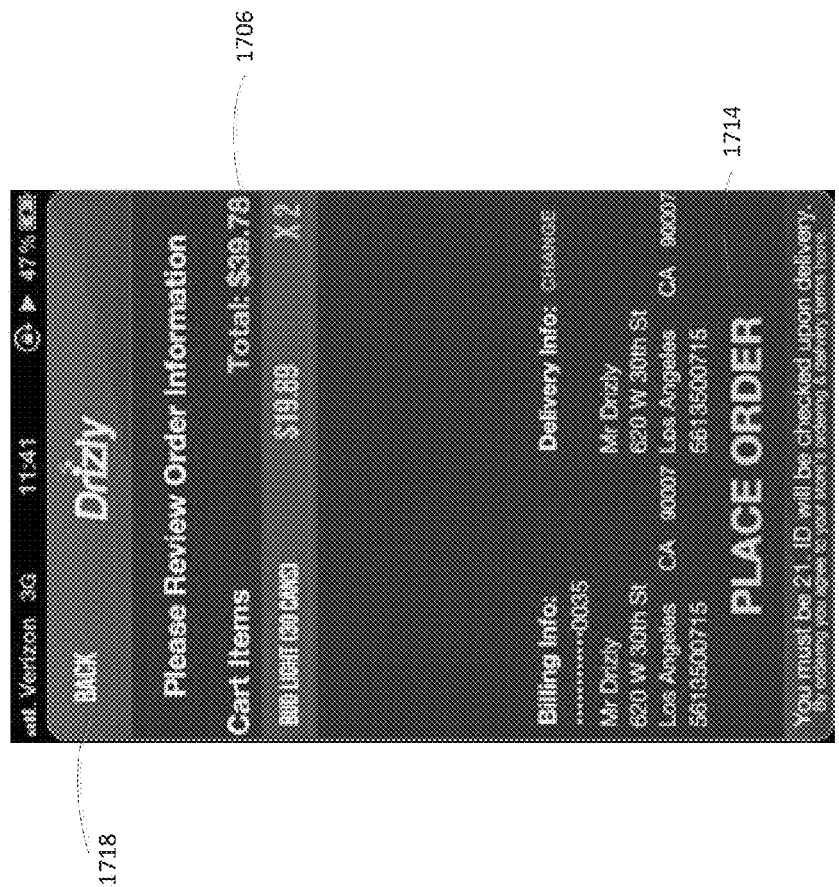

FIG. 15 shows a screenshot 1500 of a user application on a mobile device for some implementations of the system after the user selected the "About" tab 1422 shown in FIG. 14. From this screen, the user can read an "about us" section 1502, for instance describing who, where, why, how and when the host company (or organization) or the retail store or the brand was started. The "about us" section 1502 may also include information for people looking to join the host company, brand or retail store, people who have ideas for how to improve the user application or the services offered via the user application, or for stores, brands or others (e.g., other advertisers) looking to become a part of the system. Users may also be able to view host company, brand or retail store contact information 1504.

Once a user has finished adding items to his virtual shopping cart, he can check out by pressing the "Checkout" button 1126, as shown in FIGS. 11A-D. As shown in the screenshot 1600 in FIG. 16A, in some examples, the user can be presented with a special offer advertisement (here, a "free delivery deal") 1602 offering, for instance, the user free delivery in exchange for the user, e.g., adding another product to his cart. In some cases, the user may be asked to purchase one more of an item already in his virtual shopping cart. In some cases, the user may be asked to purchase a product not already in his virtual shopping cart. In some cases, the user will be offered free delivery in exchange for exchanging an item in his cart for another item (e.g., the same product in a larger quantity (e.g., 1 Liter instead of 500 mL), or a product of a different brand (e.g., a six-pack of Amstel Light instead Bud Light)).

In some cases, the user may be offered free delivery for providing the contact information of other potential customers, or for removing a competitor's product for his virtual shopping cart. In some cases, the user is offered free delivery in exchange for filling out a survey, uploading a picture of the user drinking a certain brand's products, or performing any task. In some examples, the user is offered free delivery in exchange for changing the delivery address (e.g., accepting delivery at a location closer to the retail store or at a location that is easier to get to for the driver). For instance, the user may be offered free delivery if he accepts having his items delivered to the Harvard Square train station, instead of a location within Harvard Yard that would require the driver to park and walk. In some examples, a special offer may offer discounted or reduced delivery fees instead of free delivery, free or discounted delivery for future purchases, or free or discounted delivery for a friend or another user. In some examples, a special offers offered at check-out (or at any time during the user's interaction with the user application, mobile app or website) may (instead of or in addition to being a free delivery deal) offer free products or discounted products in the current order, or in a future purchase. For instance, the user may be offered a free bottle of Coca Cola in exchange for adding another bottle of rum to his virtual shopping cart. The user can accept the free delivery deal (or any special offer) by pressing the "add item" button 1604, or can reject the free delivery deal by pressing the "no thanks" button 1606.

FIG. 16B shows a wireframe 1607 of a special offer offered at any time (or, specifically, a free delivery deal offered at checkout), for some implementations of the system. In some examples, the free delivery deal, or other special offer, pops up once the user clicks the "Checkout" button 1126, as shown in FIGS. 11A-D. The pop-up may contain the title of the ad 1608, and a byline 1610 for more information about the special offer. An image 1612 may be displayed, which can be unique to that special offer (e.g., Bacardi's logo, because Bacardi is paying for the special offer) or common to all special offers or a subset of special offers (e.g., a delivery truck is shown for all free delivery deals). The product 1614 related to the special offer is described or pictured. For instance, product 1614 may be the product the user must add to his virtual shopping cart to receive free delivery. The price 1616 associated with adding the product 1614 (or otherwise accepting the special offer) is also displayed. The advertisement may include dynamic buttons, such as an "add to cart" button 1618 (which allows to the user to accept the special offer and add the product 1614 to his virtual shopping cart) and a "no thanks" button 1620 (which the user can use to decline the special offer). If the user selects the "no thanks" button 1620, he may be taken to a checkout screen, for instance a screen showing the products in the user's virtual shopping cart. In some cases, a "checkout" button 1622, which takes the user directly to a checkout screen, is blocked while the special offer ad is active.

FIGS. 17A-C show several screenshots 1700 of user applications on a mobile device for some implementations of the system after the user selected the "Checkout" button 1126 shown in FIGS. 11A-D, and, if applicable, accepted or declined the free delivery deal (or any deal) shown in FIG. 16. In some examples, the store information 1702 is displayed at the top. The store information 1702 names the store that is completing the user's order. The "cart items" section 1704 lists the products and quantity of products that are in the user's virtual shopping cart and the price for each product. If several of the same products are ordered, the total price for all those products may be listed. The total purchase price 1706 for the entire order is displayed. The delivery fee 1707 may also be displayed. In some cases, the delivery fee is a percentage of the purchase order price. In some cases, the delivery fee is a flat rate (e.g., $1, $5, $10, or any other sum). In some examples, the delivery fee may be waived (e.g., if the user accepts the free delivery deal or if the store, brand, or the host is offering a special promotion with free delivery). In some examples, delivery may be flagged for priority deliver, for instance if the user adds to his virtual shopping cart a product featured in the separate banner 1144

(shown, for instance, in FIG. 11A). Priority delivery can mean that the user's order is moved to the top of the delivery list for a given store. For instance, if there are five previous orders to be delivered, the user's order will be moved to the top of the list. In some cases, the user's billing information 1708 (such as the user's or payer's full name, billing phone number and billing address) and the delivery information 1710 (such as the person accepting delivery's full name, the delivery phone number and the delivery address) are also displayed. The user may have the opportunity to change the billing information or delivery information by pressing the "change" button 1712 next to the information the user wishes to change. In some examples, the payer, the person placing the order using the user application or the person accepting delivery are not the same people. The user can place the order by pressing the "place order" button 1714. In some cases, the user can see the approximate delivery time 1716 (e.g., "Delivery will be made at 5:15 pm," or "Approximate Delivery Time: 1 hour"). The delivery time may be based on the user's distance from the store, the user's distance from the driver's current location, the user's distance from other customers, the number of purchases made by all customers or other factors. The user can go back to a previous screen by pressing the "back" button 1718.

In some examples, the user is presented with a warning 1720 that reads, for instance, "You must be 21. ID will be checked upon delivery." In some examples, there is a notification 1722 that reads, for instance, "By logging in or registering your agree to our terms of service here." By pressing the "here" button 1724, the user is taken to the application's terms of service.

Figure 18:
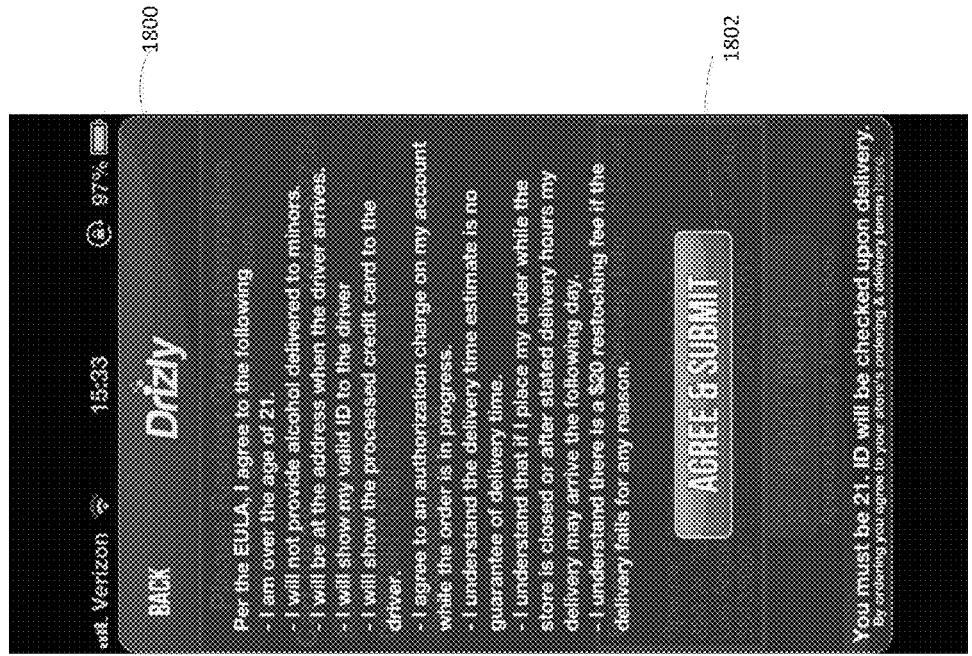

In some examples, once the user presses the "place order" button 1714 (shown in FIG. 17), the user is presented with an end user licensing agreement (EULA), as shown in the screenshot 1800 in FIG. 18. For instance, the user can be required to confirm and agree to the following:
1. I am over the age of 21.
2. I will not provide alcohol delivered to minors.
3. I will be at the address when the driver arrives.
4. I will show my valid ID to the driver.
5. I will show the processed credit card to the driver.
6. I agree to an authorization charge (e.g., a restocking fee) on my account while the order is in progress.
7. I understand the delivery time estimate is no guarantee of delivery time.
8. I understand that if I place my order while the store is closed or after stated delivery hours my delivery may arrive the following day.
9. I understand there is a restocking fee of X amount or Y percentage if the delivery is declined by the driver for any reason.

In some examples of our system, the user will be unable to place his order, and therefore unable to have his items delivered, until he presses the "agree and submit" button 1802, indicating that he confirms and agrees to the terms of the EULA.

Figure 19:
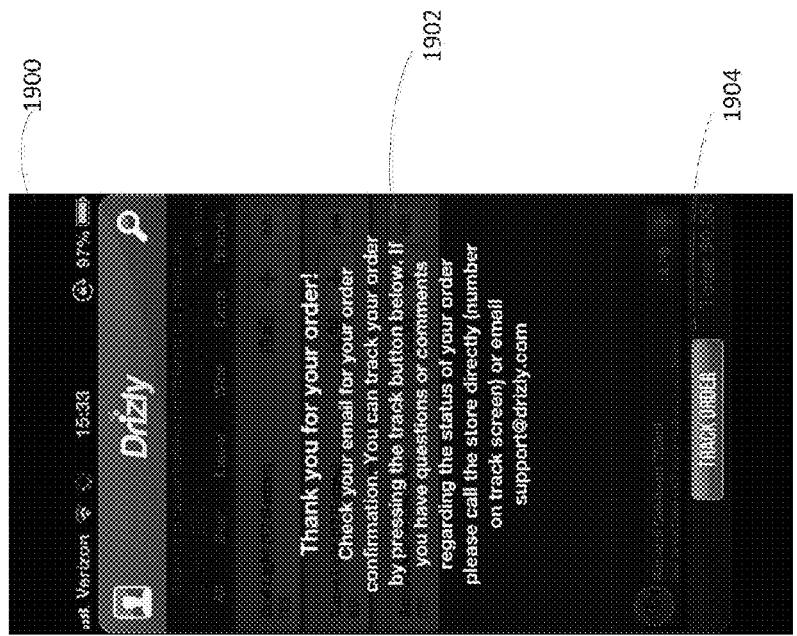

FIG. 19 shows a screenshot 1900 of a user application on a mobile device for some implementations of the system after the user selected the "agree and submit" button 1802 (shown in FIG. 18). The user may be presented with a "thank you" message 1902, that may include, among other things, confirmation that the order has been submitted, notice that the user may expect a receipt or invoice for the order in his email inbox, notice that the user may track his order using the user application, or contact information in case the user has any questions about his order. In some cases, once an order is placed, the user's screen may lock and, within the user application, only allow the user to track his order. The user may press or select the "track order" button 1904 to track his order.

FIGS. 20A-20G show screenshots 2000 of user applications on a mobile device for some implementations of the system. In these tracking screens, the user is able to track the delivery of his order. The user may be presented with a delivery map 2002 with an icon indicating the location of the driver 2004 and an icon indicating the location of the user (or location of delivery) 2006. Status icons 2008 may indicate the status of the order—for example, paid (e.g., payment and order received and order is processing), authorized, loading (the vehicle is being loaded with the products that the user ordered), enroute (the driver is on the way to the delivery address), outside (e.g., the driver is outside delivery address), verifying ID, complete (order has been successfully delivered and paid for), refunded or partially refunded. An "order status" field 2010 may also inform the user of the order status. In some examples, when a driver updates his driver application (e.g., to change the status on the driver application from "loading" to "enroute"), the order status icons 2008 or the "order status" field 2010 may automatically update. In some examples, the icon indicating the driver's location updates only when the driver updates his status on the driver application. In some cases, as in FIG. 20A, the user may be able to see the name of the driver in the "driver name" field 2012. The user may be given the contact information for the store 2014 or the contact information for the host 2016. In some cases, the user is given the contact information for the driver or the brand owner. The user may be able to contact the store or the host if there is a problem or the user has a question. In some cases, like in FIG. 20B, the user may be able to see comments from the driver in the "driver comment" field 2018 (e.g., "be there in 5"). The user may able to able to review his order by pressing the "review order" button 2020 (e.g., to see the products ordered, the purchase price, and the time the order was submitted). In some cases, once an order is complete (e.g., the "order status" field reads "complete"), the screen unlocks and the user can place another order at any time. FIGS. 20C and 20D show examples of tracking screens with order status icons 2008 and the "order status" field 2010 indicating that the order is being loaded (FIG. 20C) and on its way to the user (FIG. 20D). FIGS. 20E and 20F show examples of tracking screens with order status icons 2008 and the "order status" field 2010 indicating that the driver has arrived and is outside the delivery address (FIG. 20E) and the driver is in the process of checking the customer's ID (FIG. 20F). FIG. 20G shows an example of a tracking screen with the order status icons 2008 and the "order status" field 2010 indicating that the order is complete.

In some cases, once the order is complete, the user is taken to a rating screen, as shown in the wireframe 5300 in FIG. 53. The user may be told the driver's name or ID number 5302. The user may be asked to rate the user's experience for this order. For instance, the user may be asked to rate the user's experience by selecting a certain number of stars 5304 (one to five, with one being the worst and five being the best). If the user does not wish to rate the user's experience, he can press the "skip" button 5306. If the user wishes to rate the user's experience, he selects a certain number of stars 5304 and presses the "submit" button 5308. In some implementations, the user will not be given the option to skip the rating step, and will be forced to rate the order before being able to place another order. The user may be presented with host or store contact information, such as host email 5310, to submit further comments about the order experience, the driver, the store, or the products.

The store manager application and store delivery application (collectively sometimes referred to as the "retail store terminal application," which can be one or two or more applications or websites) may be used to manage inventory, set prices, capture customer data, and manager customer refunds. Later we will refer to a point-of-sale system or point-of-sale terminal that may include features of the store manager or store delivery applications or both. When we use the phrase store terminal application we are referring in a broad sense to any such application that may be running on a device in a store whether or not it has the selling capabilities that are often associated with point-of-sale terminals. The retail store terminal application (e.g., a secure website or an application on an iOS or android operating system) can help the host work with individual liquor stores (or stores in any industry) to sell their products on the host's platform. The host can create accounts for liquor stores that have licensed exclusive areas or territories, and can attach their bank accounts for direct deposit directly from a third party payment processor. The host can set the stores' addresses in their system, and set the stores' licensed service ranges (e.g., the size of the licensed territory). Store managers can log-in to the retail store terminal application, add inventory, adjust prices, review orders, track drivers, and interact with their customer metrics. If a delivery is unsuccessful, store managers will be able to refund each customer, less the agreed upon restocking fee, from this application as well.

Figure 21:
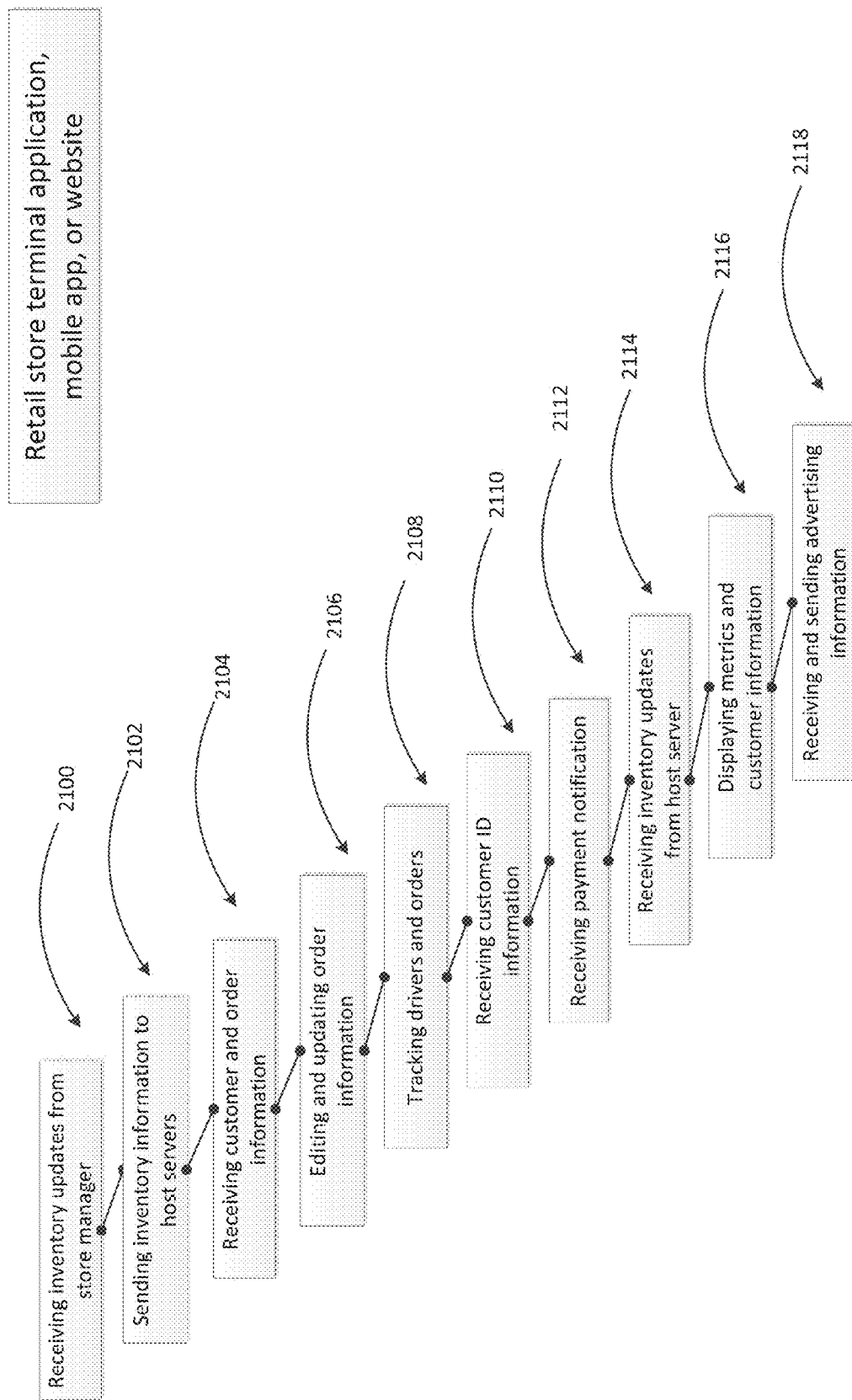

The terms "store managers," "store owners" and "store employees" are used interchangeably. The use of any one term implies the use of all terms, and includes any agents or representatives of a store (or any entity, group of entities or individual selling products or services), store managers, store owners, and store employees, and any managers, owners, employees, agents and representatives of any parent companies or subsidiaries of a store (or any entity, group or entities, or individual selling products or services). FIG. 21 is a functional block diagram of retail store terminal application for some implementations of the system. In step 2100, the store manager updates the store inventory information, including, for instance, the product names, the product prices, and the quantities of products in stock. In step 2102, the inventory information is sent to the host servers. When a user within the store's territory signs up or logs-in to the user application, the user is presented with some or all of the product information entered by the store manager. For instance, the user may see the products and prices in the selection screens in the user application, such as those shown in FIGS. 11A-D.

When a user places an order, the retail store terminal application receives some or all of the order information (e.g., customer name, delivery address, delivery phone number, and products ordered) (step 2104). In step 2106, the store manager, through the retail store terminal application, can manage or update orders. For instance, the store manager can change an order status, for instance to indicate when a product is loading or enroute, or when an order is complete (delivered and paid). The store manager may be able to override any order status entered by the driver in the driver application. In some examples, the store manager can also issue refunds or partial refunds through the retail store terminal application.

The retail store terminal application may receive customer and ID information (e.g., customer name, date of birth, state of residence, state of ID issuance, date of ID issuance, and ID expiration) when the driver scans a customer's ID (step 2110). The retail store terminal application may also receive notice, and notify store managers, when payments are authorized or processed (step 2112). For instance, a third party payment processor may notify the store manager (through the retail store terminal application) when the non-refundable restocking fee has been authorized on the user's credit card, or when a user's purchase has been paid in full and the funds have been transferred to the store's bank account.

In some examples, once a delivery is made through the system, the host servers may automatically update the store's inventory information to reflect the sale (step 2114).

For instance, the store manager may have initially indicated that 5 bottles of Absolut vodka were in stock. If one was delivered, the host server may update the inventory to 4 bottles.

In some examples, the store manager may be able to view, manipulate and share various metrics and customer information (step 2116). The various metrics are described in detail below.

In some examples, the store manager may be able to design and implement advertising through the retail store terminal application (step 2118). For example, by creating advertising campaigns for the user application, store managers may be able to tailor advertising to target certain customers (e.g., certain demographics), certain geographic locations, certain periods of time (e.g., times of day, days of the week, days of the month, or specific seasons), certain products, or certain brands, or combinations of them. In some cases, any of the advertising tools available to the brand managers (described below) may be available to the store managers. Advertising may be viewed by customers, potential customers, retail stores, brand owners, wholesalers and distributors. Advertising may be developed for the user application (so that users see the advertising when the sign-up or log-in to the user application), or the advertising may be developed for other media (e.g., billboards, print advertising, email, or websites).

In some cases, the retail store terminal application does not have an integrated ID guidebook application or ID verification software (as described below for the driver application). In some cases, the retail store terminal application does include an ID guidebook application or ID verification software, or both. In some cases, an ID guidebook application and ID verification software are available to the store manager on a different device from the retail store terminal application.

Different or additional functions, or combinations of functions, may be available in various implementations of the system. For instance, the retail store terminal application may include a message board that allows the store to communicate with the host, brand owners, other stores, or other participants.

FIGS. 22A-E show screenshots 2200 of retail store terminal applications on a mobile device for some implementations of the system. The store owner, manager or employee (sometimes all referred to as "the store manager") can view the store's inventory (e.g., some or all of the consumer products the store has in stock). The products 2202 are presented in a list. FIG. 22A shows many products 2202 listed. FIG. 22B shows four products 2202 listed. FIG. 22C shows two products 2202 listed, and FIG. 22D shows an empty inventory list (no products 2202 listed). The store manager can view all the products in stock by pressing the "all" tab 2204. The store manager can also view subsets of inventory. The store manager can view all beer products in stock by pressing the "beer" tab 2206, all liquor products in stock by pressing the "liquor" tab 2208, all wine products in stock by pressing the "wine" tab 2210 and all other products (e.g., mixers, lemons, napkins, snacks, etc.) by pressing the "extras" tab 2212. In some examples, different or additional tabs or other combinations of tabs are available. The store manager can view and change the unit price for the products by changing the number in the "price" field 2214. The store manager can view and adjust the number of each product remaining in stock (the inventory remaining) by changing the number in the "inventory remaining" field 2216. The store manager can view and edit more information about the product by pressing the "more" arrow 2218. Furthermore, the store manager may see inventory alerts 2220. For instance, the store manager could get an alert that the amount of a certain product in stock is low (inventory remaining is low).

FIG. 22E shows a screenshot 2200 of a retail store terminal application on a mobile device for some implementations of the system. The store manager may see this screen after the store manager has pressed the "more" arrow 2218 shown in FIGS. 22A-C. From this screen, for a given product 2202, a store manager can update and edit the name of the product in the "name" field 2222, and the type of the product in the "type" field 2224 (e.g., liquor, beer or wine). The store manager can also view and edit the "price" field 2214 and the number of the product remaining in stock (the inventory remaining) in the "inventory remaining" field 2216. In some cases, the store manager can only view the "price" field 2214 and "inventory remaining" field 2216 in the screens shown in FIGS. 22A-C, and must enter a screen like that shown in FIG. 22E to enter or edit the numbers in field 2214 or 2216. In other cases, the store manager can enter and edit the numbers in the fields 2214 and 2216 in both screens. The store manager can also view, enter or edit a description of the product in the description field 2226, and view, delete, or upload a photo of the product by pressing the "add a product picture" button 2228. Changes made in this screen can be saved, and immediately viewable on user applications in the store's territory, by pressing the "Press to update" button 2230. In some examples, the store manager may have to take an additional step (e.g., go to another screen and authorize the changes) before any changes are uploaded to the host server or available on the user application.

In some examples, the products 2202, the product prices 2214 and product descriptions entered by the store manager are the products, produce prices and product descriptions shown to users in the store's territory in the user application. In most cases, the users will not be able to see the quantity of products in stock, such as the number in the "inventory remaining" field 2216. However, in some cases, if the number in the "inventory remaining" field 2216 is zero for a certain product, that product will not appear in the user's selection screen in the user application (e.g., the screens shown in FIGS. 11A-D). In other cases, that product may appear in the user application, but may include an "out of stock" notice, or some indication that the product is not currently available in the store's inventory. In some examples, the user may be able to request an out-of-stock item, and may be informed (e.g., via email or SMS text, or via a pop-up notice the next time the user logs-in to the user application) when the product is back in stock (e.g., when the store manager sets the "inventory remaining" field to a number greater than zero). In some examples, products may be presented to the user even if they are not in stock in the store, and the store may be given the authority to fulfill an order for out-of-stock products by delivering other similar products.

In some examples of the system, the host may also want to be able to quickly and efficiently update additions and subtractions from a store's inventory, as well as update that inventory with any orders delivered through our system. One example of such a capability involves the host using a VPN to gain access into a store's computer system. A script could be written that allows for the host's inventory system to automatically enter the inventory files for each store, remove the required file(s), and upload it to the host's servers. Once the file(s) has been pulled to the host, it is updated with all of the orders since the last update, and the host's system is updated with new counts for all existing in-store inventory items. Once complete, the host could push the required file(s) back to the stores' systems so that the stores' files can be updated or replaced. This process can happen at a specified time interval (e.g., every minute, hour, twice daily, once daily), or can occur after a specific number of transactions (e.g., after X number of sales through the user application) have taken place.

FIGS. 23A-D show screenshots 2300 of retail store terminal applications on a mobile device for some implementations of the system. In FIGS. 23A and 23B, the indicators 2302 show the location (and possibly the status, such as payment authorized, driver enroute, or order completed ("done")) of orders on the map 2304. The indicators 2302 may show all orders submitted within a certain time period (e.g., every order within the last 4 hours), or may show a subset of orders (e.g., all wine orders), or a combination (e.g., all wine orders within the last 4 hours). The indicators 2302 may show orders for a group or chain of stores, or for an individual store, or orders assigned to a particular driver. In some examples, the location of each driver may also be indicated. The location of the driver may be tracked using the driver's device and driver application. Depending on how many drivers are working for a particular store, or logged-in to the driver application, there may be more than one driver shown on the map 2304. In some examples, the store manager may be able to zoom in and out of different geographical areas on the map 2304. By pressing the "center" button 2306, the store manager may be able to center the screen on the indicators 2302. The store manager can refresh the screen by pressing the "refresh" button 2308. In some examples, if the refreshed screen does not contain any order status updates, a bar 2310 may appear to indicate that no order statuses were updated.

An order tracking bar 2312 may provide information on orders, such as the number of orders incomplete or active, and the number of orders completed (e.g., within the last 5 hours). The order tracking bar 2312 can contain information about all orders for a particular store or group of stores, or a subset of orders for a particular store or group of stores (e.g., all wine orders, or all orders from a store in a particular location, or all orders assigned to driver X, and may be confined to a particular time period). The store manager may be able to reset his screen to show the indicators 2302 for only the newest orders (e.g., orders placed by users in the last hour, or since the store manager last updated his screen) by pressing the "newest" button 2314.

The store managers can select the "support" tab 2316 to contact the host and get answers to frequently asked questions, select the "settings" tab 2318 to adjust the settings, select the "stats" tab 2320 to see various metrics (described below) (including, for example, average time to delivery, and average time to delivery per driver), select the "orders" tab 2322 to see the details (including, for example, the name of the customer, payment information or the products purchased) of completed and incomplete orders, and select the "inventory" tab 2324 to manage inventory (e.g., through a screen like that shown in FIG. 22).

In some implementations, by selecting the "settings" tab 2318, the store manager can choose what information the store manager is displayed in map 2304. For instance, the store manager can choose to only display information for certain drivers, or for active (but not completed) orders. The store manager may be able to select the type of indicator 2302 (e.g., pin or arrow), the color of the indicator 2302, the appearance of the map (e.g., satellite or map view, or flat or three dimensional), or additional or different options or combinations of them. By selecting the "settings" tab 2318, the store manager may be able to update, reset or clear various counters (e.g., a counter counting the number of orders completed). The store manager can update the store's email addresses for the store manager to receive receipts, update the store manager's username and password, or update other information (e.g., store hours, store address, or store contact phone number). In some implementations, from the "settings" tab 2318, the store manager can update the information that is shown to the user in the user application, such as the store information and delivery information 1133 shown in FIG. 11C.

FIG. 23C shows a screenshot 2300 of an example of a retail store terminal applications on a mobile device for some implementations of the system. FIG. 23C shows a support screen, for instance the screen presented when the store manager selects the "support" tab 2316 shown in FIGS. 23A and 23B. The host's contact information 2326 is displayed, such as the host's email and phone number. The store manager can contact the host for support. In some examples of the system, the store manager can view the answers to frequently asked questions, or chat with the host from within the application. In some examples, the store manager can view a brand owner's contact information, a wholesaler's contact information, or any other participants' information (such as the contact information for a governmental regulatory agency).

In screenshot 2300 shown in FIG. 23D, the store manager may be able to edit and manager orders. Screenshot 2300 in FIG. 23D shows similar functionality to that shown in the screenshots in FIGS. 27A-D (described in detail below). The descriptions of FIGS. 27A-D also apply to FIG. 23D.

In some cases, actions taken by the store manager in the retail store terminal application may override actions taken by the driver in the driver application. For instance, if the driver indicates that an order is enroute, the store manager may be able to change the status of the order to indicate that the order is not enroute. In some cases, the retail store terminal application allows the store manager to issue full or partial refunds. For instance, as shown in FIG. 23D, the store manager may be able to issue a full refund for a purchase by pressing the "refund" button 2328, or may be able to issue a partial refund (e.g., a refund for the full purchase price less the restocking fee) by pressing the "partial" button 2330.

Figure 24:
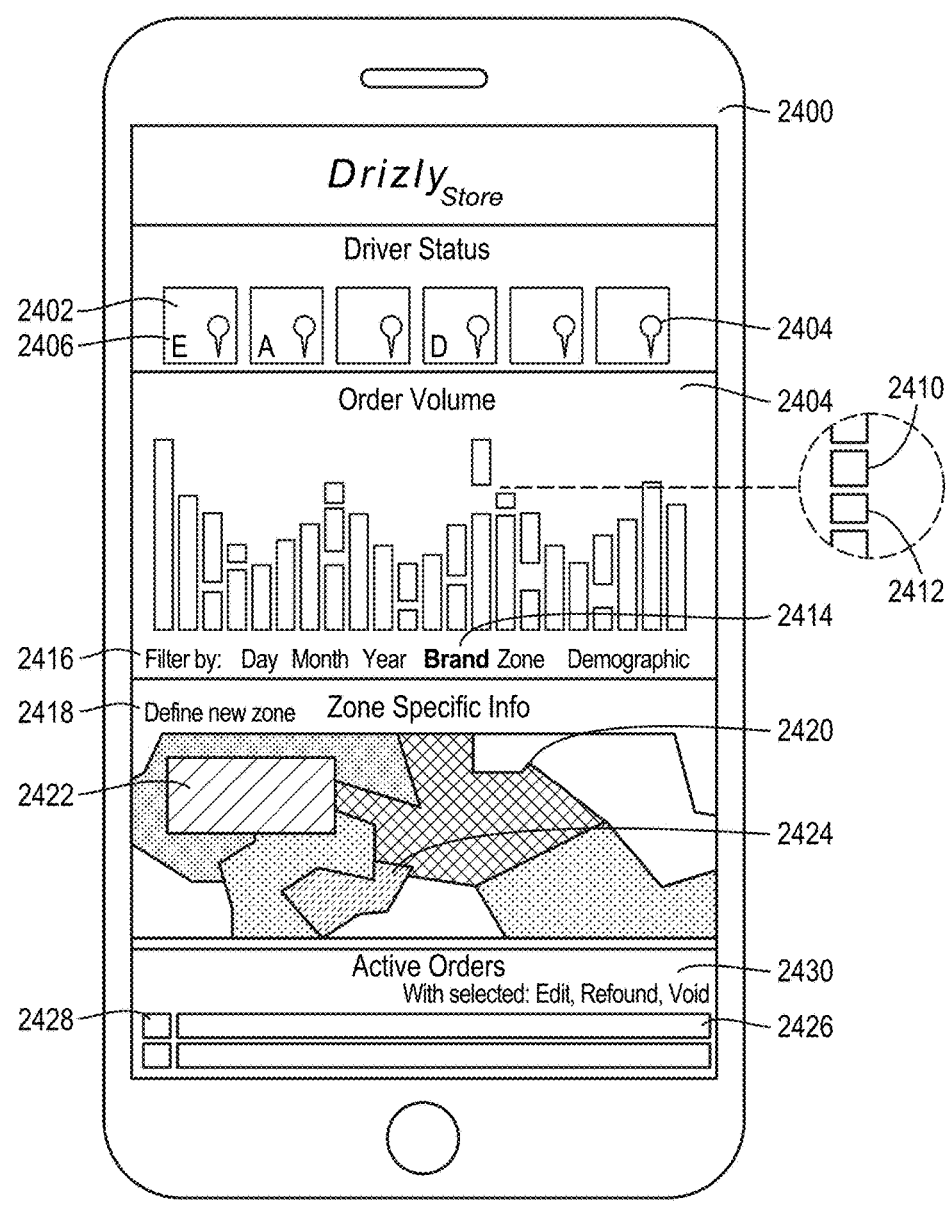

FIG. 24 shows a wireframe 2400 of the retail store terminal application for some implementations of the system. Button 2402 links to a profile page for the store's driver, which can include a picture of the driver. There may be more than one driver or driver page. The store manager can create, edit, and delete these driver pages. Pin 2404 shows the driver's location on a map within the retail store terminal application. Status indicator 2406 shows the driver's status (e.g., loading or en route). Graph 2408 may be a volume metric graph, which displays the volume of orders using stored metrics (discussed below). Subgroups 2410 and 2412 show the volume of orders for specific subgroups (e.g., subgroup 2410 could be the amount of Bud sold, and subgroup 2412 could be the amount of Coors sold). Indicator 2414 shows the selected or activated filter used to generate the display in graph 2408 (e.g., showing the volume of orders per brand, or the volume of orders per day, month, year, zone or demographic, among others). In some implementations, more than one filter may be activated at a time (e.g., the store manager may view the volume of orders per brand per day). Button 2416 is the filter select menu, allowing the store manager to change the filter or filters displayed in graph 2408.

Map 2420 can show various metrics (e.g., in the form of a "heat map"). "Define new zone" button 2418 allows the store manager to define a geographic zone or territory on the map 2420 (e.g., by using a mouse, drawing with his finger on a touchscreen, or by typing in a zip code or the streets defining a zone) to view metrics within that geographic zone or territory. Map 2420 can show metrics by predefined zones or by zip codes (e.g., by zip code area 2424). The defined zone 2422 that was defined by the store manager after pressing the "define new zone" button 2418 may be overlaid on the map 2420.

In some implementations, the store manager may be able to view a list of the active orders. "Order detail" field 2426 may show the details of the active orders (e.g., the name of the customer, the products ordered, or the delivery address). A store manager may be able to select active orders or batches of active orders using the "select" button 2428. "Order control" button 2430 may allow the store manager to edit, refund, or void the selected orders or batches of orders.

In some implementations, a store manager can view and manipulate various metrics based on consumer demographic data or consumer purchasing data. In some examples, it is important to show stores, brands owners, and others (e.g., investors) graphical representations (including maps, charts, animations, pictures, diagrams and other visualization) of all these metrics. This is because, generally, it is easier for the average person to understand the metrics in graphical form. This is especially true for viewing changing metrics over time (e.g., the change in average total transaction amount per day over a monthly time frame).

For instance, the store manager may be able to view various turnover metrics, like transactions per period (e.g., transactions per day, per week, per month, or per day of the week). The store manager may also view transactions per product. Transactions per product metrics could be based on general product types (e.g., beer, liquor, or wine) and more specific product types (e.g., light beer, vodka, or Cabernet Sauvignon). Transactions per product metrics could also be based on brand (e.g., Budweiser, Bacardi, or Twenty Bench) or product price (e.g., number of $40+ transactions, or number of $20-$40 transactions). The store manager can view metrics for the number of transactions per specified time interval (e.g., number of transactions from 3 pm-6 pm) or the number of transactions based a demographic variable (e.g., number of transactions based on gender, age, or place of residence).

In some examples, store managers could also view margin metrics, like the average total transaction price or the average total transaction price for a specific time interval (e.g., comparing the average transaction price between 3-5 pm and 5-7 pm). The latter may be especially helpful for stores that want to make their own daily deals within the user application. By identifying the slow periods, stores can focus on encouraging sales (or larger sales) during those periods. In the alcohol distribution industry, this is even more important because in some locations sellers (e.g., retail stores, bars, and clubs) cannot legally use GroupOn or similar schemes for alcohol. In some states, like Massachusetts, it is illegal to discount alcohol during certain hours. However, loyalty points, or other, non-alcohol-based incentives, can be offered as time-based advertisements. In some implementations of this system, retail stores can legally pin-point slow time periods and offer promotions based on time that are not directly related to the price. For example, the store can offer loyalty points for purchases during certain slow time periods.

The store managers could also view margin metrics like average total transaction price per product type. Again, these metrics can be based on general product types (e.g., beer, liquor, or wine), more specific product types (e.g., light beer, vodka, or cabernet Sauvignon), or brand (Budweiser, Bacardi, or Twenty Bench).

The store manager may also be able to see maximum transactions (e.g., most money spent on a single order, or most products purchased in a single order) and minimum transactions. Maximum and minimum transactions can be determined overall, or per demographic variable, time period, time interval, product type or brand. The store managers could also view the cost per transaction, including delivery cost and margin information where available. In some implementations, these metrics would appear in a screen like that shown in FIG. 24.

Delivery metrics may also be available, including the average delivery time per order, the average delivery time per order in a specified time interval, the average delivery distance, the maximum delivery distance and the minimum delivery distance. In some examples, these metrics are displayed under the "stats" tab 2320 (like that shown in FIG. 23). In some examples, these metrics are displayed in graphical form. In some examples, the metrics can be displayed in lists, in spreadsheets, graphically or using any other method of visualization. In some examples, the metrics can be displayed as they change over time (e.g., average sales from 5 pm-7 pm over a month time frame). In some examples, the store managers will be able to easily share the metrics with other store managers, owners or employees, investors, advertisers, customers, or others.

Figure 25:
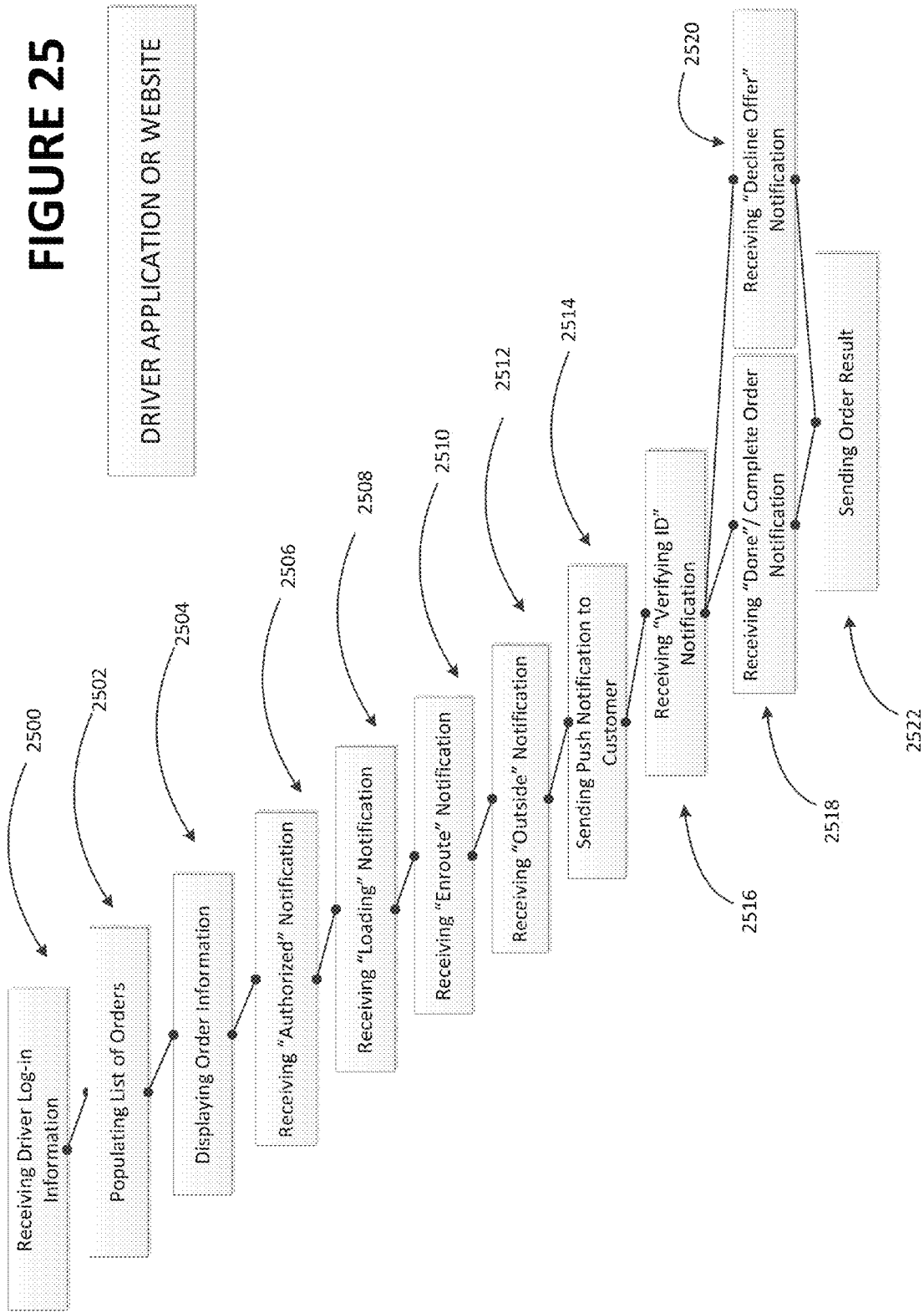

A block diagram overview of the driver application or website functionality for an example of liquor delivery is shown in FIG. 25. The driver application can, in some examples, be loaded on a driver device which, for example, can consist of an iPhone and an attached scanner. In addition to the driver application or integrated into the driver application, there may be an ID guidebook application and ID verification software. In some implementations, the ID guidebook application and ID verification system may contain overlapping or similar information.

When the consumer places an order, the liquor store may be notified immediately through the store delivery application. In some examples, once received, the order, containing the customer's selections with a name, address, and phone number, is filled and delivered by the stores. This is accomplished, in part, by the driver using the driver application.

In step 2500, the driver logs-in to the system, and in step 2502, the application populates the list of outstanding orders. In some cases, orders are retrieved with a "GetStoreOrders" call to the host server (which, in some implementations, is a cloud-based server with connections to a database server described below). In some examples, the orders are already in process or authorized by the third party payment processor, and that status is stored on the host server. A reference to the transaction ID on the third party payment processor gateway may also be kept, but these references may not be visible to the driver application. In some examples, all calls are sent via HTTP post to the server which processes the requests and sends back JSON objects with the appropriate data. The client (driver application) parses this data and displays the orders in a scrolling table-based view.

In some examples, each order is listed with 8 potential statuses—(1) Authorized, (2) Loading, (3) Enroute, (4) Outside, (5) Verifying ID, (6) Complete, (7) Refunded and (8) Partially Refunded. In some cases, the driver application has the ability to freely change the order status between the first six statuses. In some examples, the retail store terminal application can designate the final two statuses of Refunded and Partially Refunded.

In step 2504, the driver is presented the order information. This can include the products that the user ordered, the user's full name, and the delivery address, among other things. In some examples, the driver is given turn-by-turn directions to the delivery address.

In step 2506, the driver application is notified that the credit card has been authorized. In some examples, this is authorization for the amount of the non-refundable restocking fee. The authorization notification may occur earlier in the process, before the driver logs-in. In some cases, the authorization occurs when the user completes the ordering process through the user application.

In step 2508, the driver application is notified that the products ordered are being assembled and loaded onto the driver's vehicle. In some examples, the driver assembles and loads the products. In other examples, another individual or group of individuals assemble and load the products. In some examples, the products are already loaded (e.g., if the delivery vehicle is pre-loaded with a supply of most of the store's product offerings, or the most popular product offerings). In some cases (e.g., for the delivery of services), loading is not necessary. In some implementations, push notifications are sent to the customers when this step is begun, when this step is in process, or when this step is completed.

In step 2510, the driver application is notified that the driver is enroute to the delivery address. In some implementations, push notifications are sent to the customers when this step is begun or in process.

In step 2512, the driver application is notified that the driver is outside the user's delivery address (e.g., outside the house). When the driver is outside, the driver application may send a push notification to the customer (step 2514).

In step 2516, the driver application is notified that the driver is verifying the customer's ID. Characterizing, verifying and authenticating the customer and customer ID can involve the use of other pieces of software, such as an ID guidebook application and ID verification software (described below). The driver may confirm that the name matches the order and, in some examples, verify the customer's age. In some cases, the ID scanner will record information such as the state of license issuance, or the date of issuance or expiration, or the customer's name, address, age, date of birth, or gender information.

Generally, provided it is a valid ID and matches the name of the customer, the customer is provided with his products. However, in some examples, it is within the discretion of the driver to complete the order, or to refuse delivery. If the order is completed, the driver application receives a "done" or "complete order" notification (step 2520). In some examples, once the driver taps "Done" in the driver application, the remaining balance is processed by the payment processor, and the sale is complete. If the driver cannot locate the user, the user is having a raucous party, the user's ID is fake, the name on the ID doesn't match the name of the user's stored credit card, or for any other reason, the driver may tap "decline" in the driver application, and the driver application receives a "decline offer" notification (step 2522). Once the driver selects "decline," the delivery of the order is unsuccessful and voided by the driver. In some cases, the customer will receive a refund for his transaction less a restocking fee. This restocking fee may be important, especially in the alcohol distribution industry, because it discourages underage customers and covers the costs associated with a failed delivery. In some cases, the customer may receive no refund, or may receive a full refund.

In some examples, when the appropriate "UpdateOrder" call is executed, the server processes the necessary transactions with the third party payment processor, sends out push notifications to the driver and user and, upon order completion, alters the transaction's state on the third party payment processor gateway from Authorized to Processed. An "UpdateOrder" call with "Refund" or "PartiallyRefund" as the status will execute the subsequent call on the third party payment processor gateway and return monies to the customer.

The results of the sale (e.g., whether the order was completed or whether the order was incomplete) can be sent to the other participants, such as the host or the store (step 2524).

In some examples, at the end of the process, the driver is then asked to rate the customer. The driver then can proceed to start the process again for the next order.

Figure 26:
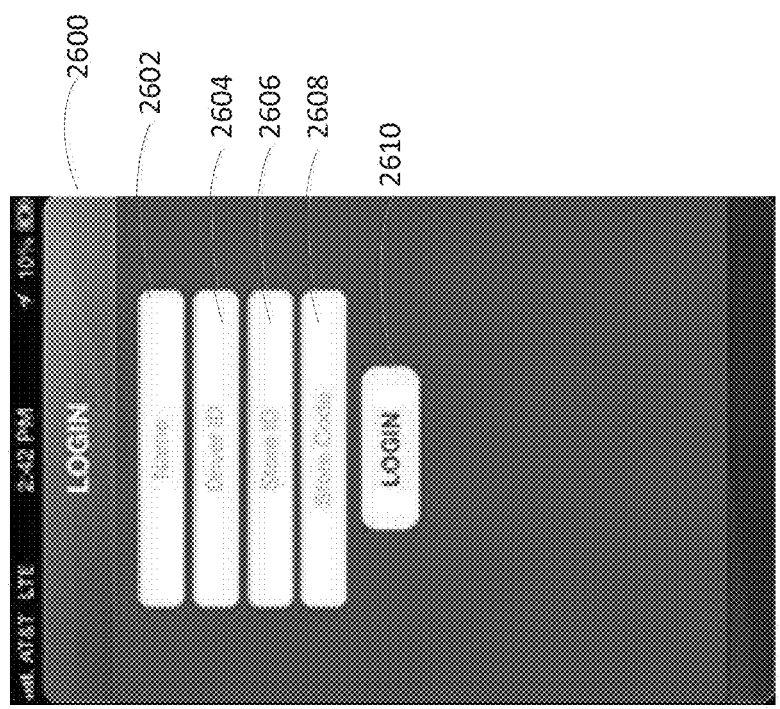

FIG. 26 shows a screenshot 2600 of a driver application for some implementations of the system. Screenshot 2600 shows a log-in screen where the driver is asked to enter his name in the "name" field 2602, his driver ID in the "driver ID" field 2604, the store ID (to identify the store from which the deliveries are made) in the "store ID field" 2606, and the store code or password in the "store code" field 2608. Once the fields 2602, 2604, 2606 and 2608 are completed, the driver can press the "Login" button 2610 to login and begin using the driver application.

FIGS. 27A-D show screenshots 2700 of driver applications for some implementations of the system. FIGS. 27A-C show screenshots of the driver application homepage seen by the driver after logging in. In some examples, the driver application displays each order assigned to a particular store in separate list elements 2702. A single list element is comprised of one order. The list elements may be displayed in chronological order from most recent to oldest. In some examples, the list elements are displayed in other or additional orders, such as closest to further delivery address. In some examples, if an order is still within the agreed upon delivery time, the list element is green. In some examples, if it is getting close to the agreed upon delivery time, the list element is yellow, and if an order is late, or it is past the agreed upon delivery time, the list element is red.

Each order may contain the following information: the delivery address 2704, the user's delivery phone number 2706, the user's virtual shopping cart items (viewable by pressing the "items" button 2708), the time since the order (TSO) 2710, and the six driver steps (or any number of driver steps). Additional or different information may be shown, or combinations of the above information and additional information may be shown.

In some examples, the driver can indicate that he is beginning a given driver step by pressing on one of the "driver step" buttons 2712. In some cases, the buttons 2712 for uncompleted steps are one color (e.g., blue). When a step is in process, the button 2712 for that step turns a second color (e.g., orange). When a step is completed, the button 2712 turns a third color (e.g., green).

In some examples, the driver steps include:
(1) authorized and paid (indicated by the "paid" button 2714), which, in some cases, indicates that the credit card has been authorized by the amount of the non-refundable "Restocking Fee" and that amount was paid;
(2) Loading (indicated by the "loading" button 2716), which indicates that the user's virtual shopping cart items are being assembled and loaded onto the driver's vehicle;
(3) Enroute (indicated by the "enroute" button 2718), which indicates that the driver is on his way to the delivery address. In some examples, when the driver presses the "enroute" button 2718, he is given turn-by-turn directions to the delivery address.
(4) Outside (indicated by the "outside" button 2720). In some examples, when the driver presses the "outside" button 2720, a push notification is sent to the user's phone. In some examples, the driver is also able to call, text or email the customer directly;
(5) ID verification (indicated by the "ID Verif" button 2722); and
(6) Done (indicated by the "done" button 2724), which indicates that the products have been successfully delivered to the customer (or that the delivery was incomplete and unsuccessful). When the driver presses the "done" button 2724, if the delivery was successful, the remainder of the balance is processed. In some cases, the remainder of the balance is the total purchase price (including any delivery fees) minus the restocking fee, which was already processed.

When the driver is ready to scan the user's ID, the driver can press the "scan arrow" 2726 to be taken to a screen like that shown in FIG. 28.

FIG. 27A shows a screenshot in which all the orders have been completed. FIG. 27B and FIG. 27C show screenshots in which the orders have not been completed. For instance, in FIG. 27B, order 2728 has not been started, and order 2730 is partially complete. In some cases, as in FIG. 27B, the current step for the top list element 2702 is indicated in the top left-hand corner of the screen 2732. For instance, in FIG. 27B, the top list element 2702 contains order 2730, which is at the ID verification step.

From the screens shown in screenshots 2700, the driver may also able to see his Driver ID 2734 and the Store ID 2736. The driver may able be presented with an Order Alert bar 2738 that informs the driver of the overall status of the orders. For instance, the Order Alert bar 2738 could read "You have 0 orders nearing their due date and 1 order late" or "No Order Alerts." In some cases, the driver may also be able to refresh the screen and load any updates to the orders by pressing the "refresh" button 2740.

FIG. 27D shows a screenshot 2700 of a driver application for some implementations of the system after the driver has pressed the "items" button 2708 shown in FIG. 27A and FIG. 27B.

Figure 41:
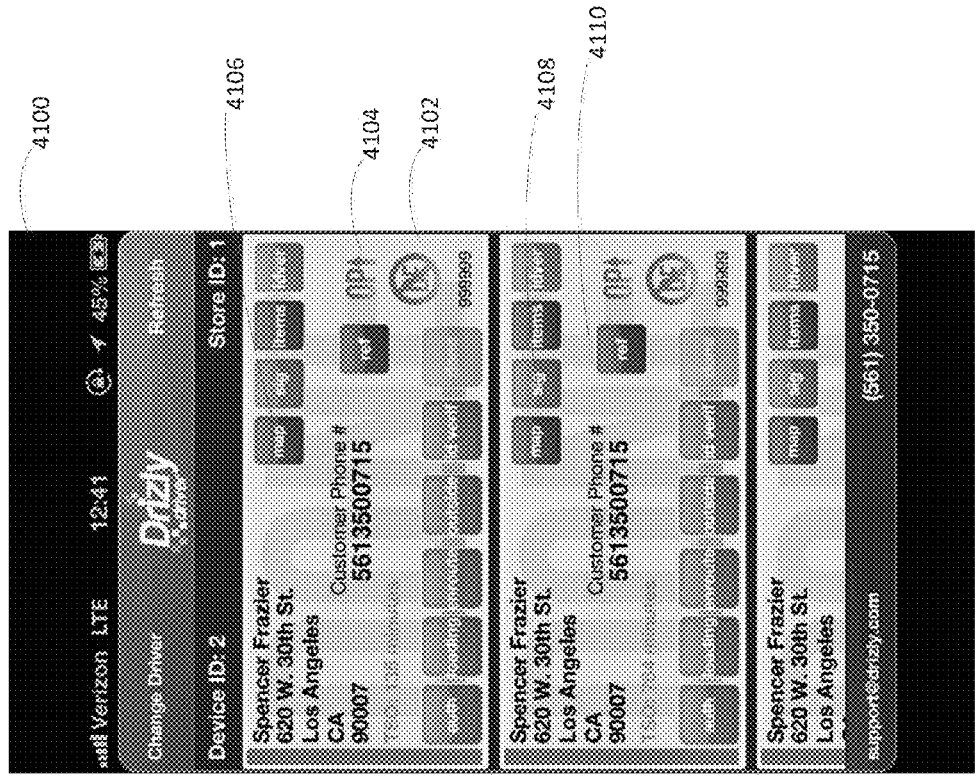

FIG. 41 shows a screenshot 4100 of a driver application for some implementations of the system. The "DF" icon 4102 can become illuminated when an order has no delivery fee, e.g., as a result of users responding to an advertisement (e.g., a "free delivery deal") on the user application. The "OP" icon 4104 can become illuminated when an order is tagged for order priority as a result of users responding to an advertisement on the user application.

In some implementations, drivers are able to hear or view turn by turn directions. In some cases, the driver hears voice directions (e.g., spoken through iOS 6 iPhone 4s or a later version) by pressing the "map" button 4106. This feature can automatically create these turn by turn directions to the delivery address from the driver's current location using geo-location. The software can take the driver's current position and automatically enter that into the "start" field of a map application and then fill in the "destination" or "end" field with the stored delivery address for a particular order. In some cases, turn by turn directions will allow drivers to get to and from the store quickly and conveniently. It will also allow them to get from one delivery address to another when there are multiple deliveries on the same trip.

Figure 44:
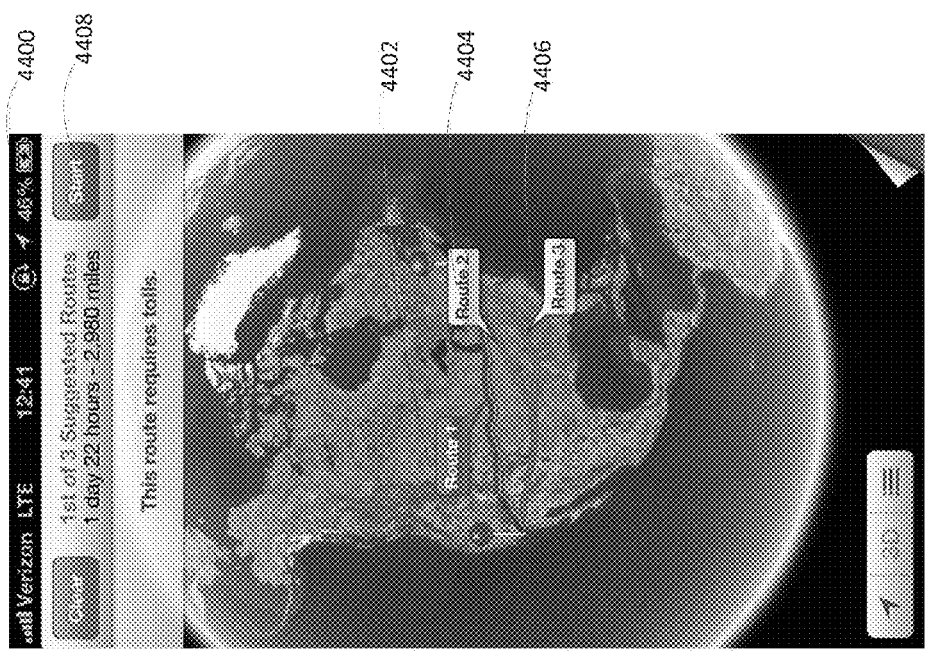

FIG. 44 shows a screenshot 4400 of a map application within (or linked to) a driver application for some implementations, which may be seen after the driver has pressed the "map" button 4106 shown in FIG. 41. The driver may be able to select a route to the delivery address, e.g., by pressing on route 1 4402, route 2 4404 or route 3 4406. Once the driver has selected his desired route, he can get directions by pressing the "start" button 4408.

Figure 45:
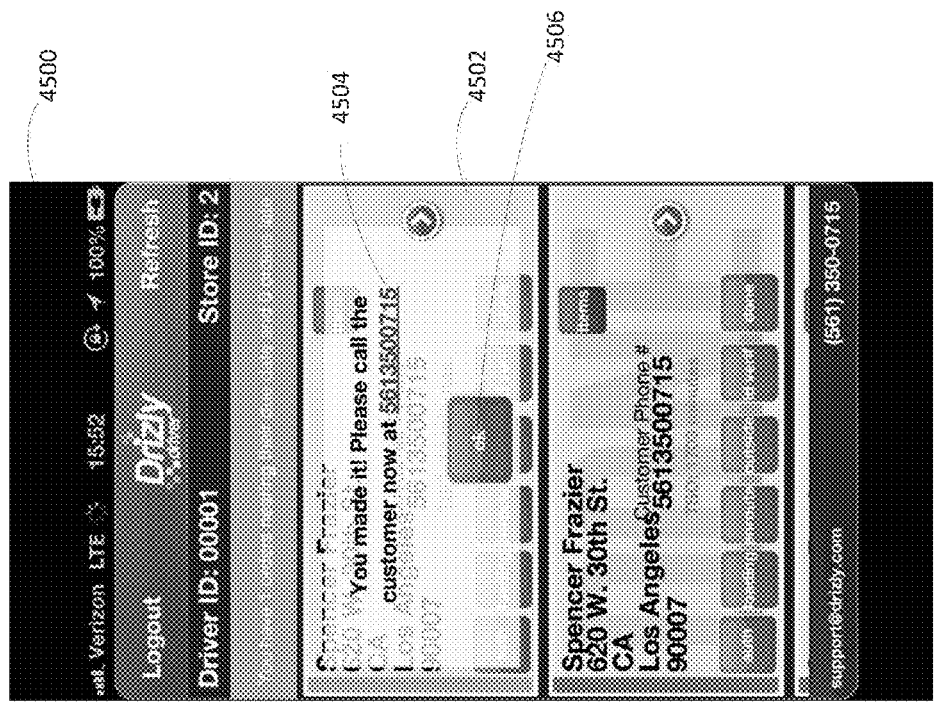
Figure 46:
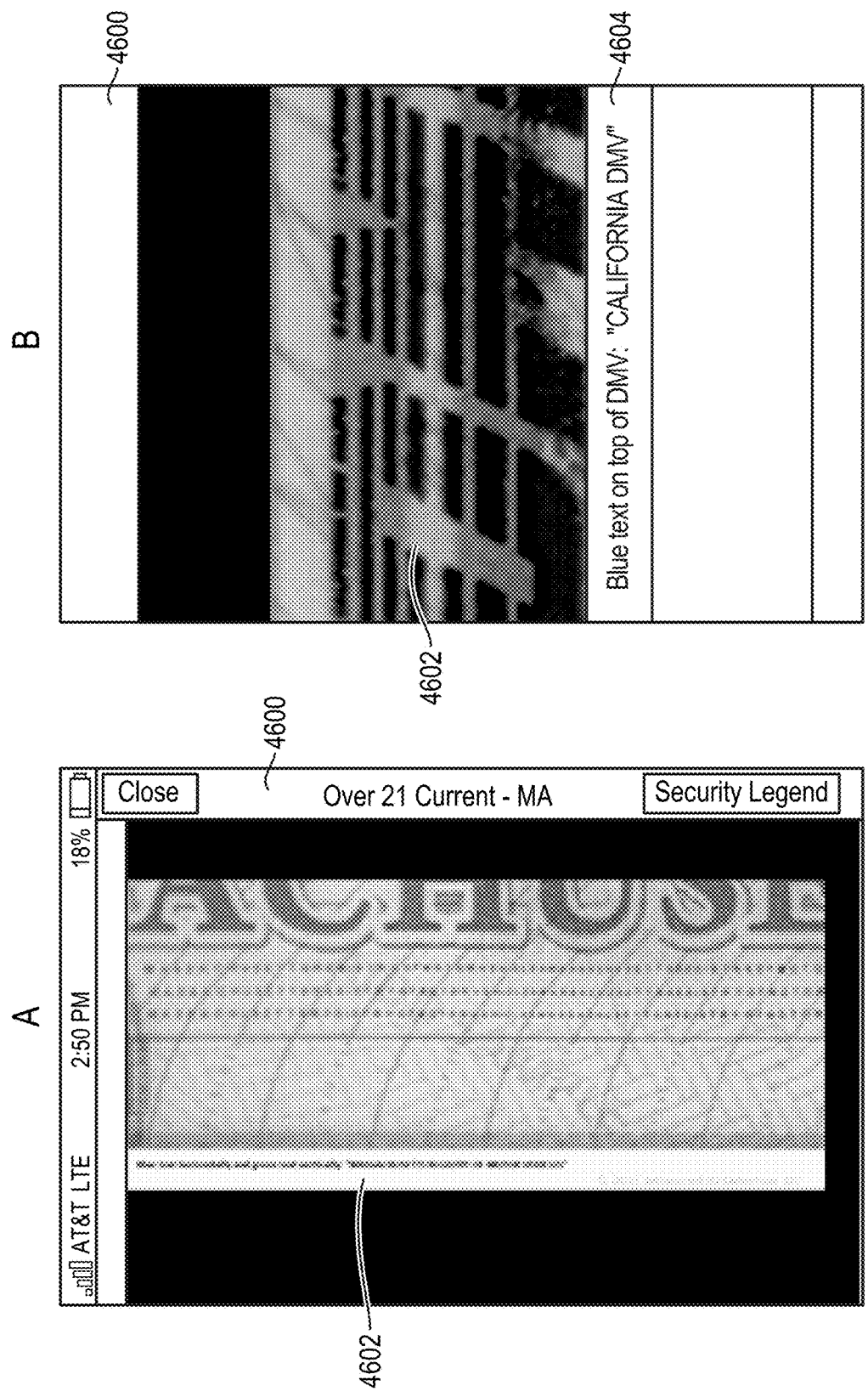
Figure 46:
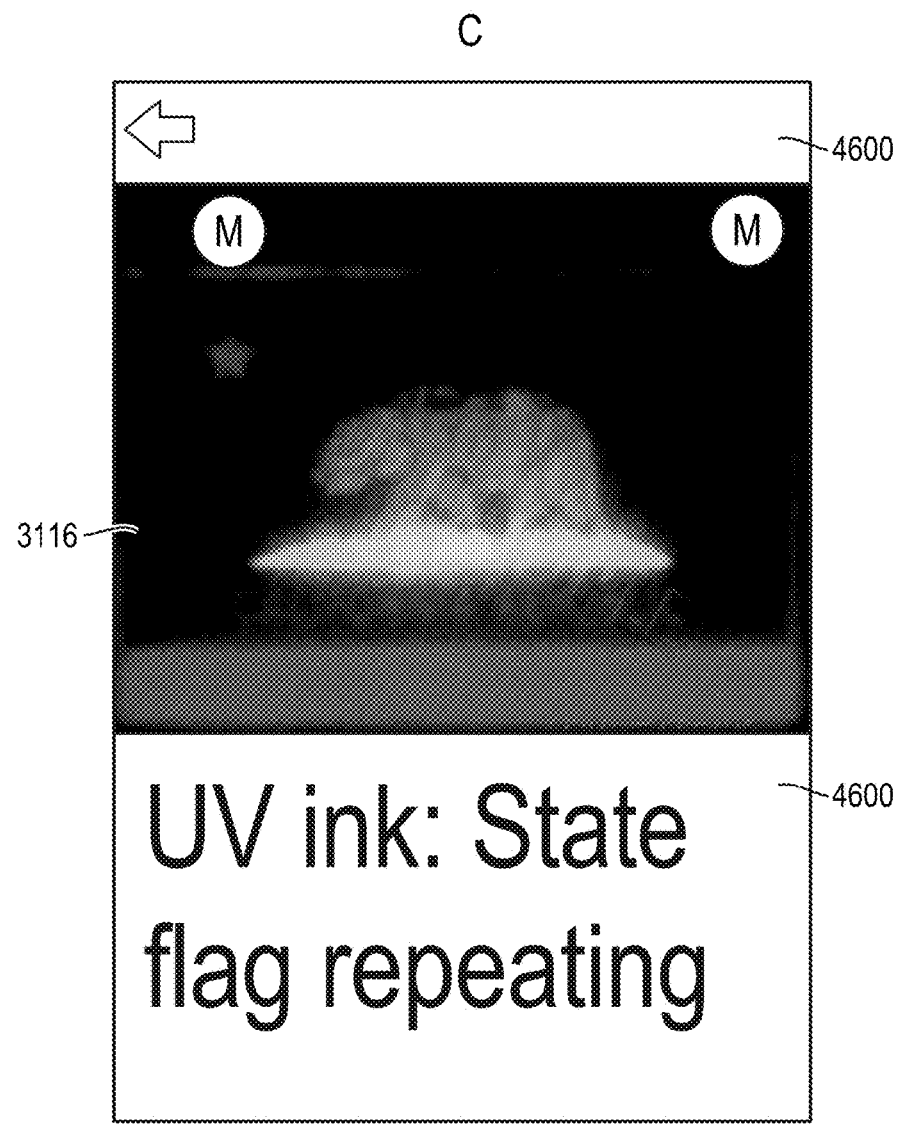

Once the driver has arrived at the delivery address, he may be taken to a screen like that shown in the screenshot 4500 in FIG. 45. A pop-up window 4502 may inform the driver that he has arrived at the delivery address. The driver can call the customer by pressing on the customer's phone number 4504. The driver can close the pop-up window by pressing the "ok" button 4506.

Figure 42:
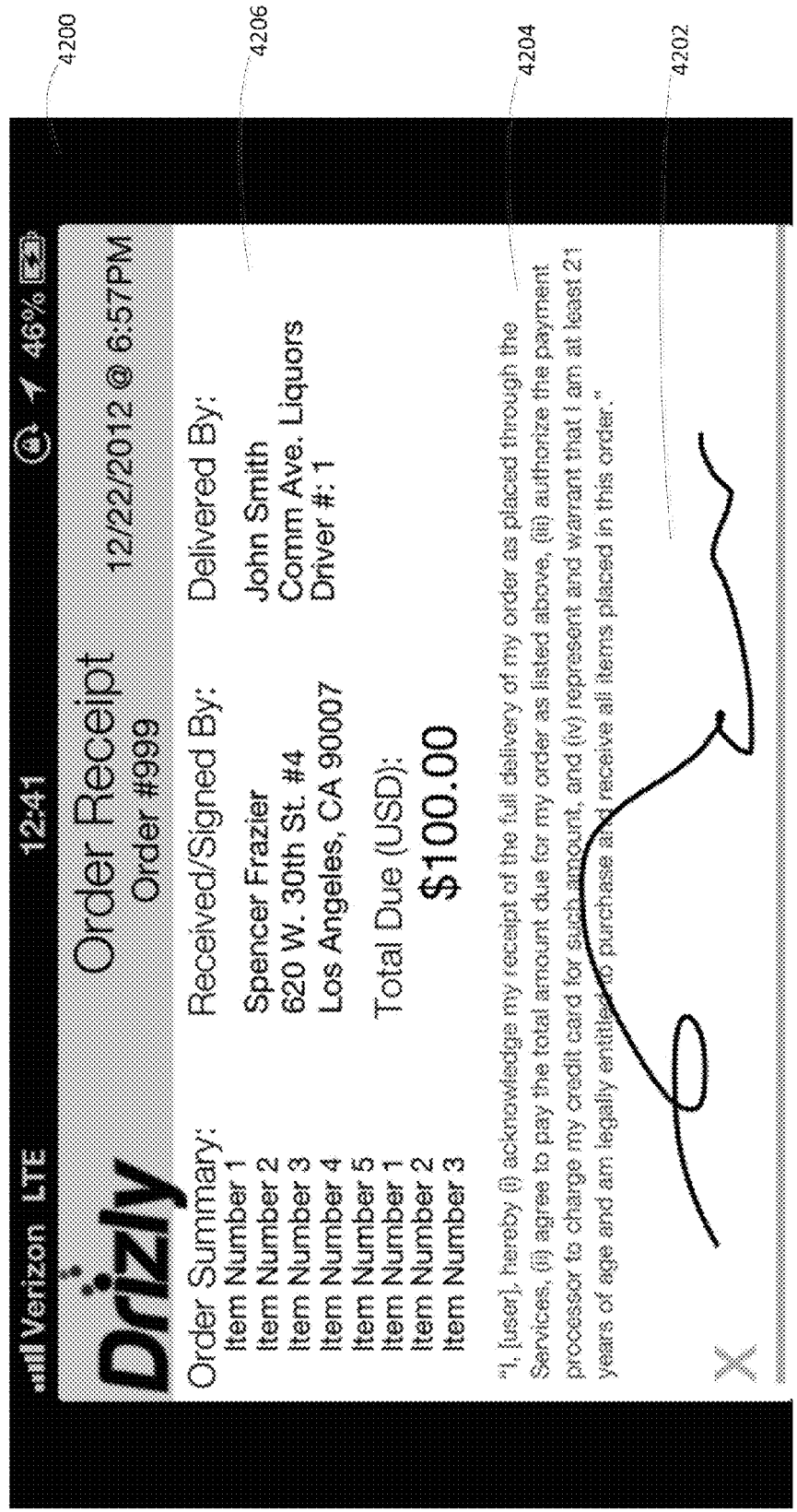

Referring again to FIG. 41, in some implementations, the driver will be taken to a signature screen by pressing the "sig" button 4108. A screenshot 4200 of a signature screen in a driver application for some implementations of the system is shown in FIG. 42. The driver may ask a user to sign the screen (e.g., in signature field 4202) confirming and agreeing to the text 4204 and order summary 4206. In some cases, the signature screen creates a digital receipt with a user's real signature authorizing the host and the store to charge the user's account. By signing, the user states that he agrees to the transaction, and indicates that the user is legally allowed to take possession of the alcohol. The signature screen may be saved on the host servers and sent to both the user and the email address associated with the store manager application for the store associated with that order.

Figure 43:
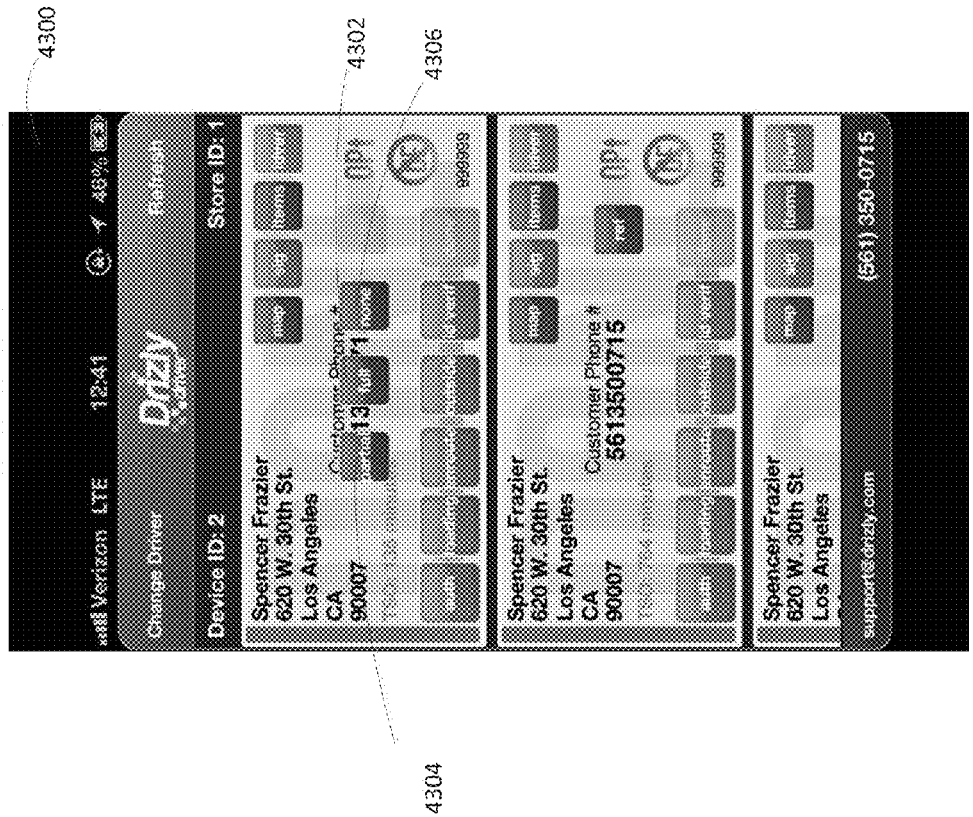

Referring again to FIG. 41, in some implementations the driver may be able to refund or partially refund an order by pressing the "ref" button 4110. In some implementations, the driver may be able to indicate that a refund or partial refund should be processed by pressing the "ref" button 4110, and the store manager may confirm before the refund or partial refund is processed. FIG. 43 shows a screenshot 4300 of the driver application for some implementations of the system after the driver has pressed the "ref" button 4110 shown in FIG. 41. The driver may be able to issue (or indicate) a full refund of the transaction total by pressing the "full" button 4302. The driver may be able to issue (or indicate) a partial refund by pressing the "partial" button 4304. For instance, if a user violates the terms agreed upon before checkout (e.g., the user placed an order for alcohol when he was under 21), the driver may select the "partial" button 4304 and the user will be sent the transaction total less the agreed upon restocking fee (if the user has already been charged the full transaction total amount). Drivers can hide the "full" button 4302 and the "partial" button 4304 by pressing the "none" button 4306.

At the ID verification step, the driver characterizes, verifies, and authenticates (or some combination of them) the customer's ID (or more generally authenticates the customer). A variety of methods and technologies could be used for the ID verification step.

The driver could check that the person at the delivery location is the one who placed the order, and the driver could verify that the customer is 21 years of age or older. The information verified at this step may depend on the type products delivered, and the location of purchase and delivery.

The words "ID," "ID card," "identification card," "identification token" and "identification device" are used interchangeably and broadly. All refer to identification tokens, or anything used to verify the identity of an individual, business entity, organization, or group. "Tokens" is used is the broadest sense, to include, for example, cards, fobs, medallions, other physical objects or characteristics, and tattoos, among others.

In some cases, the driver scans the customer's ID card (or other ID token). For instance, the driver may scan the barcode or swipe the magnetic stripe of the customer's government issued identification. The scanning hardware can be any hardware or device with scanning capabilities, including an Infinite Peripherals Linea Pro 4 device mounted on the back of an iPhone. In some cases, the driver may scan the customer information by taking a picture of the ID, and having the ID verification software or any software extract the customer information (e.g., by extracting the hexcode).

The scanned information can be processed with known information stored on the mobile device. For instance, the hex-code conversion needed to read a bar code could be stored on the mobile device. In some implementations, the scanned information is sent to a server where the scanned information is processed. In some implementations, the scanned information is processed with known information both stored on the mobile device and stored on the server. FIG. 28A shows a screenshot 2800 of a driver application or separate ID verification software for some implementations of the system. In this example, the driver presses the "scan ID" button 2802, and then scans the ID card. The driver may press the "back" button 2804 to return to the previous screen.

In some examples, the ID verification software characterizes an ID and then verifies the ID. In the characterization step, the scanner may take the data acquired by scanning the bar-code or magnetic stripe of a scanned ID, and characterize the ID. In some examples, characterization involves identifying the following characteristics about the ID: (1) the state that issued the ID, (2) whether the ID is a new version of the state's ID or an old version of the state's ID, and (3) whether the ID is for someone over 21 or under 21. In some implementations, different or additional characteristics, or combinations of them, are determined. For instance, the characterization step may determine that a scanned ID is as a "New Over-21 Massachusetts Driver's license" as opposed to an "Old Under-21 Florida Driver's license."

In some implementations, the ID verification software verifies that the ID is scannable and returns the user's ID information, as shown in the screenshot 2800 shown in FIG. 28B. The "check" 2804 indicates that the ID was successfully scanned. The ID information 2806 (such as the name associated with the ID, the state of issuance and the ID number) is displayed.

The scanning device can return and store information about the customer or the ID, as shown in FIG. 28B. For instance, the Infinite Peripherals Linea Pro 4 may process the string of characters returned from the Infinite Peripherals proprietary software and return the following information to the driver: the customer's legal name, the customer's date of birth, the state of ID issuance, and the ID's Expiration Date. Additional or different information, or combinations of information, may be scanned, retained, or stored, depending on the type of ID, the location of delivery, the type of product, or the individual circumstances of the sale.

To authenticate the ID (e.g., to determine that the ID is valid or to identify a fake ID), the driver may manually inspect the ID for forensic security checks, as described below. To perform the manual forensic check, the driver can press on the "forensic check" button 2808 to be taken to the ID guidebook application. To scan another ID, the driver can press the "scan ID" button 2802. In some cases, the driver manually checks some or all the features listed in FIG. 28C. We use the term forensic security checks broadly to include, for example, any check of a portion or all of an item being checked against known or expected or proper versions of a portion or all of the item.

Figure 29:

In some examples, the driver authenticates the customer's ID by using an ID guidebook application or website. FIG. 29 shows a screenshot 2900 of an ID guidebook application for some implementations of the system. In some examples, the ID guidebook application is integrated into the driver application or the ID verification software. In some examples, all three pieces of software (driver application, ID verification software and ID guidebook application) are integrated. In some examples, only two of the three are integrated, or all three are separate.

In some examples, the driver must (or may) select the state of ID issuance manually. For instance, FIGS. 30A-C show screenshots 3000 of ID guidebook applications for some implementations of the system in which the driver (or other person using the application) is presented with a list of states 3002. In some implementations, the driver can choose an individual state by pressing the "arrow" button 3004. In some implementations, the driver could choose an individual state by pressing on the state 3002. A driver could create a favorites list of states for easier searching and viewing. Pressing on the black star 3010 will turn the black star 3010 into a yellow star 3008. All the states with yellows stars 3008 can be seen in a list by pressing the favorites list star 3012. A date bar 3006 may inform the driver of the latest date on which a customer could be born and be over 18 years of age or the latest date on which a customer could be born and be over 21 years of age. In some examples, important information, depending on the particular use of the application, may appear in the date bar 3006. For instance, the age to purchase tobacco products may be 19 years of age in some states, and, where the driver is delivering tobacco products, the date bar can inform the driver of the latest date on which a customer could be born and be over 19 years of age. In some cases, the date bar may include recent changes in federal, state or local laws, such as the maximum amount of a certain product that can be purchased.

In some examples, the driver does not need to (or cannot) manually select the state of ID issuance. In some examples, when the driver scans the customer's ID, the ID guidebook application automatically populates the list of IDs of the scanned state, as shown in FIGS. 31A-31C. In some examples, the ID guidebook application automatically shows the features of a license corresponding to the user's license, as shown in FIGS. 32A-32C.

FIGS. 31A-C show screenshots 3100 of ID guidebook applications for some implementations of the system after the driver manually selects a state (e.g., by pressing the "arrow" button 3004 shown in FIGS. 30A-C) or after the driver scans the customer's ID card (or other ID token) and the ID guidebook application automatically populates the list of IDs for the scanned state. In FIGS. 31A-B, the driver is presented with pictures 3102 and a description 3104 of each type of identification card for the chosen or scanned state. In FIG. 31C, the driver is presented with pictures 3102 without the description 3104. The descriptions could be, for instance, "over 21 current" (indicating the current ID card given to individuals 21 years of age and older in that state), "under 21 current" (indicating the current ID card given to individuals under 21 years of age in that state), or "Over 21 previous" (indicating the ID card previously given to individuals 21 years of age or older in that state). The pictures 3102 or descriptions 3104 may vary depending on the state. In some examples, as in FIG. 31B, the list is further broken down into pictures 3102 and descriptions 3104 for the front and back of each type of card. For instance, the list includes "new vertical front" 3106 (indicating the front side of the vertically oriented card currently given to individuals in that state) and "new vertical back" 3108 (indicating the back side of the vertically oriented card currently given to individuals in that state).

The driver chooses the type of identification that matches the customer's identification, and possibly the side of the card (front or back) that the driver wishes to view. The driver can make his selection, as shown in FIGS. 31A and 31C, by tapping on the picture 3102 or the description 3104, or, as shown in FIG. 31B, by pressing the "arrow" 3110 next to the card and side that the driver wishes to view. The driver may go back to the list of states (as shown in FIGS. 30A-C) by pressing the "States" button 3112 or by pressing the "back" button 3114.

The IDs for a given state may be presented in any way, for instance in a list, a grid or individually on different pages. The IDs may be further grouped, for instance requiring the driver to select "IDs for individuals under 21" or "IDs for individuals over 21" before being presented with the list or grid of individual IDs. The IDs may be listed with short descriptions, longer description, or pictures, and may be arranged by orientation (e.g., vertical or horizontal), by date of use by a state (e.g., ID issued from 1990-2000) or in any other manner. IDs may also be listed or organized by type (e.g., driving licenses and other state IDs).

In some examples, like in FIG. 31A, a date bar 3116 may inform the driver of the latest date on which a customer could be born and be over 18 years of age or the latest date on which a customer could be born and be over 21 years of age.

In some examples of our system, the driver may perform at least one manual forensic check. The information used to perform this forensic check could be in the ID guidebook application.

For instance, FIGS. 32A-32C show screenshots 3200 of ID guidebook applications for some implementations of the system after the driver selects a particular ID (or side of an ID) from the screens shown in FIGS. 31A-31C. An example identification card 3202 (of the type of ID card and side of the ID card) is displayed, along with a security key 3204 that lists several features unique to that ID card. The different features listed in the security key 3204 could include, for example:

1. Microprint (Small text, which may require a magnifying glass to read)
2. Kinegram (Metallic foil that varies when viewed from different angles, or a diffractive security device embossed in a substrate, such as gold).
3. Ultraviolet image (which may require a UV light to view)

4. Laser perforation (Small holes that form a shape when held up to the light)
5. Tactile pattern (e.g., raised print detectable by touch)

Additional or different features, of combinations of features, may also be described. Feature icons 3206 can be listed next to the name and description of each feature in the security key 3204. The same icon may appear on the example identification card 3202 to show where the corresponding feature may be found. For instance, the ultra violet icon 3208 shown in the security key 3204 may appear on the top right side of the example identification card 3202. This indicates that the driver should look at the top right side of the customer's identification card for an ultraviolet image.

A detail box 3210 may appear around a feature icon on the example identification card 3202. In some examples, the driver may be able to press or otherwise select the detail box 3210 to view an enlarged image of that section of the example identification card 3202, for example as shown in FIG. 46A-46C. This may enable the driver to examine a particular security feature in more detail. The driver may press the "back" button 3212 or the back arrow 3214 to return to the previous screen.

As shown in FIG. 32B, the driver may also be able to zoom-in to the example identification card 3202 by pressing the "zoom" button 3216. The driver can change the orientation of the example identification card by pressing the "flip" button 3218.

FIGS. 46A-46C show screenshots 4600 an ID guidebook application for some implementations of the system after the driver has selected to see the details of a particular forensic check on example identification card 3202, for example by selecting the detail box 3210 seen in FIGS. 32A and 32B. In this screen, the driver can see a "detail" section 4602 of an example identification card 3202 (for example, an enlarged image of an area of the example identification card 3202 with a particular feature), enabling the driver to examine a particular security feature on the example identification card 3202 in more detail. In some implementations, a description 4604 explains the feature visible in the "detail" section 4602 (for example, "state flag repeating" or "blue text on top of DMV"). In some implementations, for example in FIG. 46C, the "detail" section 4602 shows the feature after it is exposed to UV light.

In some implementations, the driver is able to see a full screen image 4702 of the entire example identification card 3202, as shown in the screenshot 4700 in FIG. 47A, or the back of example identification card 3202, as shown in the screenshot 4700 in FIG. 47B.

Figure 47:
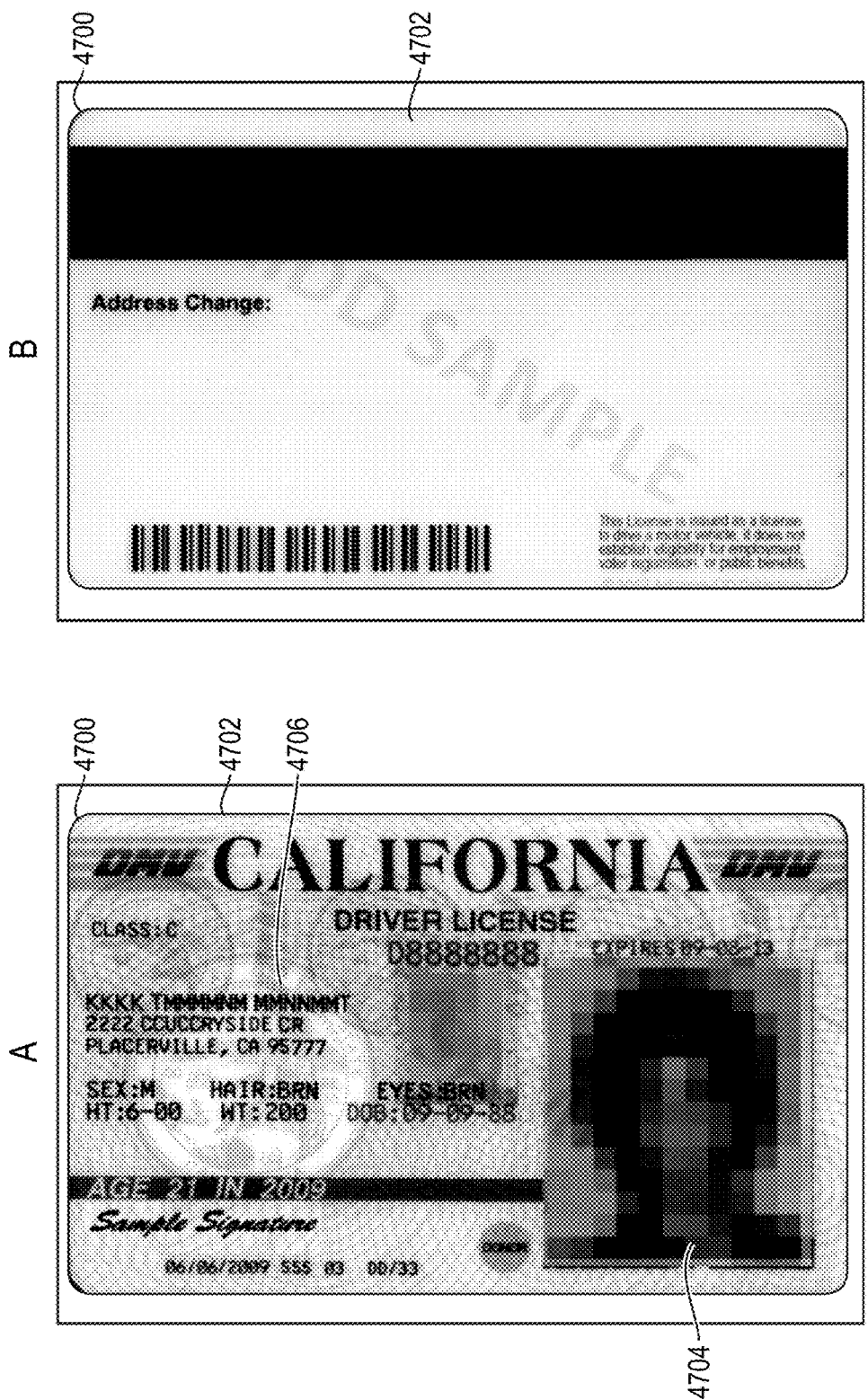
Figure 48:
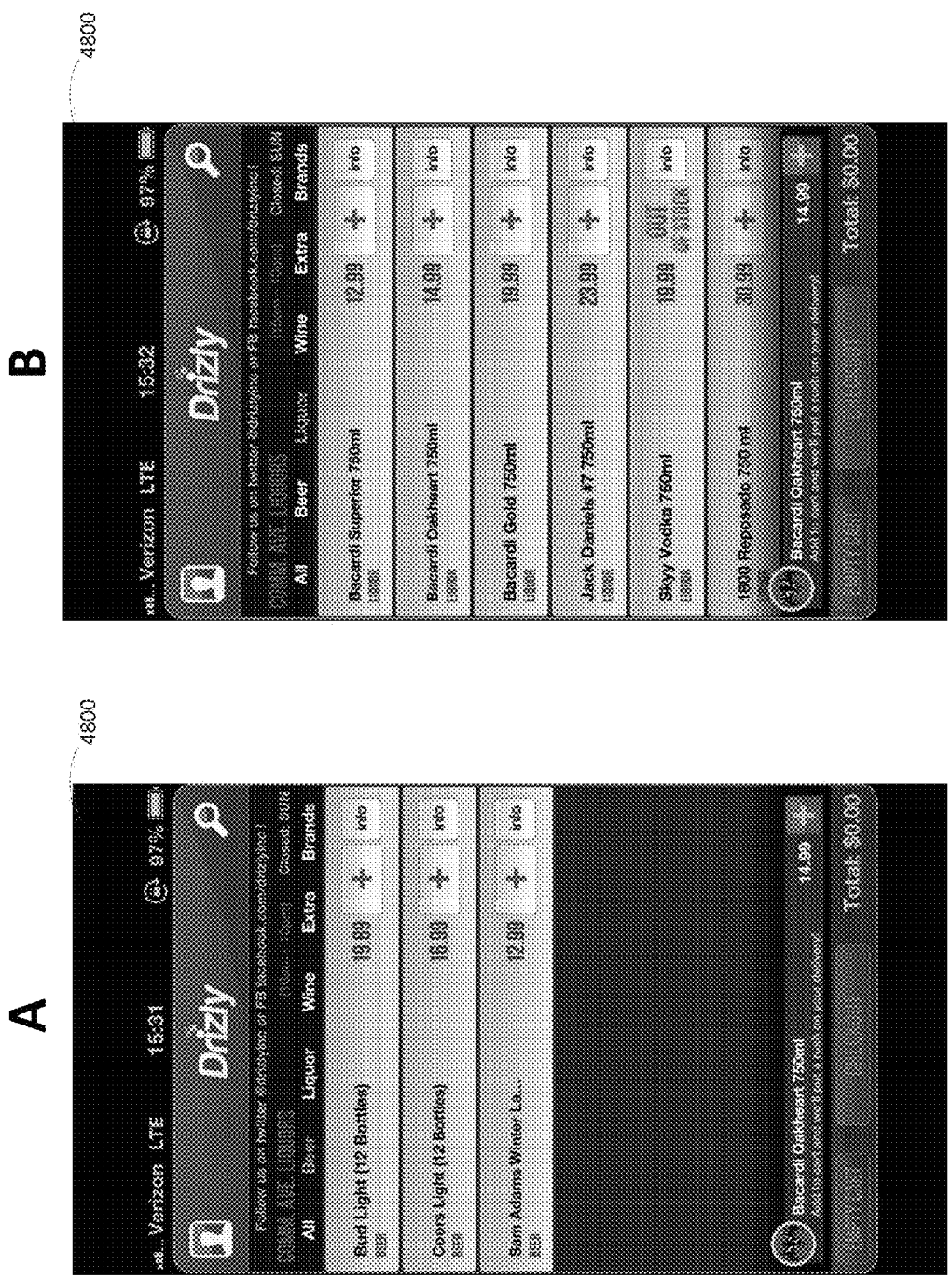
Figure 48:
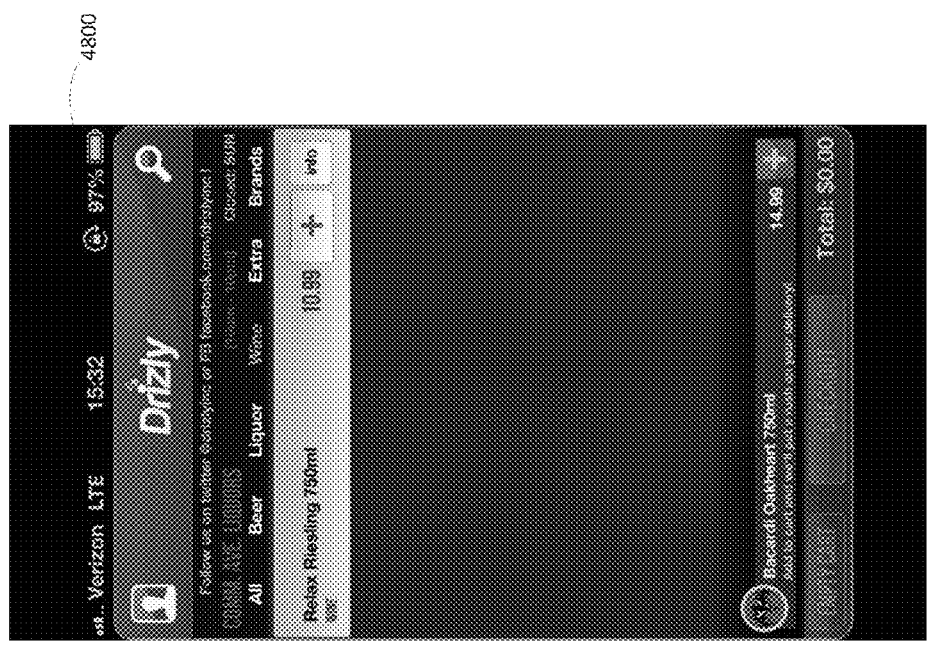
Figure 49:

In some examples, the ID guidebook application may have different or additional functionality or appearance (or a subset of those described above, or combinations of those described above and others). For instance, the ID guidebook application may not allow the driver to zoom-in (e.g., "zoom" button 3216) or bring up a "detail" section 4602 to examine a particular security feature, but may instead (or additionally) provide the driver with a sketch, diagram, or written description of the security feature. In some examples, a state or group of states may employ the same security features across all of its IDs or across a subset of its IDs, and the ID guidebook application may describe or provide diagrams or pictures of those security features applicable to all or the subset of relevant IDs without listing each ID individually. Although personal information in the example identification card 3202 may be redacted (e.g., blurred image 4704 or the repeated letters 4706 (instead of a name), as seen in FIG. 47), the fonts and colors for every state may be accurate for referencing. The ID guidebook application may provide information on typical or common features of fake IDs (e.g., "things to look out for"), such as smudging of certain letters or dull images.

In some implementations, new or updated images of example identifications cards 3202 and security features may be transmitted from the host servers (or any servers) to the ID guidebook application on the driver's device when updates are available.

In some implementations, features are available in some versions of the ID guidebook application that are not available in other versions. For instance, there may be a version of the ID guidebook application only available to law enforcement personnel that includes enhanced images of the security features, which are not available in other versions of the ID guidebook application.

Note that the ID verification software or ID guidebook application, together or individually, may be used independently of any other aspect of our system. For example, they may be used by liquor store or gun store employees to verify the age or identification of an individual looking to purchase alcohol or a gun. The ID verification software or ID guidebook application may also be used independently of the purchase of products. For example, they may be used by bouncers outside of bars to determine which individuals are over 21 years of age and eligible to enter the bar. Or, they may be used by Transportation Security Administration agents to authenticate ticket holders in airports. Many applications are possible.

The ID verification software and ID guidebook application may be used to verify any type of ID. For instance, they can be used for driver's licenses, liquor IDs, bar cards, or all state issued IDs.

Furthermore, the ID verification software and the ID guidebook application may be adapted for IDs issued by other ID issuing authorities. For instance, instead of (or in addition to) verifying identification issued by U.S. states, the ID verification software and the ID guidebook application could be used to verify identification cards issued by the United States federal government (e.g., passports, social security cards, or military cards), various organizations, business entities, or foreign countries, among others.

In some examples, brand owners communicate with the host in person or via phone, email or other method of communication to set up campaigns and exchange information. In some examples, brand owners can also (or exclusively) interact with the system through a brand manager application. In some examples, brand owners can purchase and run campaigns through a web-portal or website or application (e.g., an iPhone application). In some examples, this may allow brand owners to monitor campaign effectiveness and return on investment (ROI) in real time.

In some examples of our system, brand owners may be able to analyze metrics (perhaps all or some of the metrics available in the retail store terminal application), run promotions or campaigns, and interact with loyal customers. In some examples, the brand owners can interact with their direct customer base. Brand owners may be able to view the ages and locations of individual customers who buy the brand owner's products (or who buy the products of other brand owners through some implementations of the system). In some implementations, brand owners can view the names and emails of individual customers. In some implementations, the names and emails of individual customers are not visible, e.g., for privacy or security reasons. Additionally, brand owners may be able to run customizable promotions targeting individuals, including loyal customers or potential customers or customers that they would like to be loyal.

Large brands may offer the largest potential revenue stream for the host. Brand owners may be able to pay for rights to advertise and promote their brands on the user application, both with freestanding or general ads and those tailored to specific customers. In some examples, brand owners may be able to pay to have their products appear at the top of search and browsing lists (e.g., to have their wine appear at the top of the list of products shown when the user selects the "wine" tab 1110 shown in FIGS. 11A-D). Like retail stores that license exclusive territories, brand owners may be able to buy or license exclusive rights to promote on a monthly (or any time period) basis, or exclusive rights to promote to a certain customer age group, customer gender, or geographic area or territory, or exclusive rights to promote certain types of products (e.g., wine or liquor or beer). The host may also sell a limited number of non-exclusive promotion licenses for different categories. For instance, the brand owner may be able to purchase one of two non-exclusive licenses to promote its beer during the month of January.

Although any advertising model may be used, the most preferable one may be a pay-per-sale or pay-per-performance model. For instance, the advertiser may only pay for an advertisement if it results in a sale or if it causes a customer to sign up for the brand owner's loyalty rewards program. In some examples, a pay-per-click or a pay-per-impression or any advertising model may be used. In some implementations, the price rates for advertising may be adjusted depending on the demographic targeted, the advertising type (e.g., banner or microtext), the time of day, the geographic location or the product or products advertised (e.g., quantity, type (beer, wine, or liquor), or the price of the product).

In some examples, brand owners can input the amount of money they want to spend on a particular campaign (a budget), and then design the specific ad campaign within that budget. In some examples, the brand owners may be able to help determine the rates for specific types of advertising (e.g., either pay per click or pay per impression). For example, in some implementations, the rate for each category (e.g., pay-per-click or pay-per-impression) may increase or decrease while the campaign is active. For instance, the price may vary depending on the effectiveness of the ad. If an ad is effective, brand owners may be charged more. If an ad is not effective, brand owners may be charged less. In some implementations, brand owners can enter a maximum or minimum amount for each category (e.g., brand owners can elect to pay no more than $0.005 for each pay-per-click ad and no more than $0.008 for each pay-per-impression ad).

Brand owners may be able to run campaigns limited by scope, time or budget. Campaigns can include the display of various images, text, sound, and video, and the award to users of various benefits like free, discounted, or faster delivery or free or discounted products. Campaigns can target certain customers (e.g., by gender, age, marital status, profession, or purchasing history), products, time periods (including days of the week, times of the day or months or seasons), or geographic areas (or any factors). Campaigns can target individuals who have never purchased the brand owner's products, or individuals who have previously purchased the brand owner's products. For instance, a campaign can aim to promote a brand owner's beer to all males aged 21-23 in Colorado during the month of January. A campaign can also specifically target customers in that group who have only once purchased the brand owner's products. Campaigns may be designed based on data available through the system (e.g., the metrics described above in the retail store terminal application, including turnover metrics, margin metrics, and delivery metrics) or other sources of data Campaigns can include a single ad or promotion, or multiple ads or promotions. Campaigns may involve concerted efforts to, for example, increase sales, increase the customer base, increase brand awareness, maximize ROI, consolidate existing customers, test new products, increase sales of older products, increase sales of less successful products, target customers of competing brands, or sponsor specific activities at certain times, days of the year, holidays or for certain events. For example, "Coors: The Official Drizly New Year's Eve Beer."

In some implementations, a campaign involves a set amount of time or a set amount of money (or both) that a brand owner spends to provide a certain type of advertising experience within the user application. As time passes, the amount of money contributed to the campaign is drawn down. In some examples, views or impressions would take negligible amounts from the campaign's initial funds, whereas purchases or interactions would draw more money from the overall amount. That is, the cost-per-view or the cost-per-impression would be low, and would not cost the brand owner a lot of money. The cost-per-purchase or the cost-per-interaction may be more expensive for the brand owner. Once the time period is over or money is exhausted, the campaign's advertisements will no longer show up in the user application. In some implementations, a brand owner can elect to renew a campaign that has expired (e.g., the time has expired or the amount of money has been exhausted) or create a new campaign.

In some examples, a campaign involves an unlimited amount of time or money. That is, the brand owner does not set, at the beginning of the campaign, the length of the campaign or the amount of money to be spent on the campaign. In some examples, the campaign may continue until the brand owner or the host indicates that he would like it to stop. In some examples, the brand owner may have to give the host notice (e.g., one week, or 30 days' notice) to stop a campaign.

In some examples of our system, brand owners may be able to view purchase history. This can include raw data (e.g., lists of every purchase made by every customer, and all accompanying information) or may involve any of the metrics discussed in the section describing the retail store terminal application, including turnover metrics, margin metrics, and delivery metrics. In some examples, through the brand manager application, the brand owners can view data and visualizations (including maps, charts, graphs, animations, pictures, and diagrams) for purchase history locally, regionally, nationally or internationally. The brand owners may also be able to view store-specific or zone-specific data and visualizations. In some cases, brand owners may be able to calculate purchase profiles and target campaigns accordingly.

A purchase profile can be a report based on certain assigned variables. The report could enable the brand owner to examine the effectiveness (or potential effectiveness) of advertising on a particular demographic group. For instance, a brand owner may be able to create a report to examine the potential effectiveness of advertising on 23-25 year-old (demographic 1) females (demographic 2) living in zip 02135 (demographic 3) who have purchased (demographic 4, as opposed to viewed) Bacardi (demographic 5) in the past 3 months (demographic 6). In some examples, the report contains the purchase history for the particular demographic group. In some examples, the report predicts the impact (or reports the impact) of advertising on that particular demographic group. With this information, the brand owner may be able to target a campaign to that particular demographic group.

In some examples of our system, brand owners may be able to establish or expand loyalty tracking and rewards programs. For instance, based on purchase history, brands can define rewards for users. For instance, users can receive a coupon or any reward after they make a certain number of purchases of the brand owner's products, product line, seasonal items, or specific products. To receive a reward, a customer may need to make a certain number of purchases of the brand owner's products within a certain period of time, or spend a certain amount on the brand owner's products within a certain period of time. Many variations are possible, and the brand owners could use any known reward system.

In some examples of our system, advertising in the user application can have "cart awareness." For instance, when a user adds a product to his virtual shopping cart, displayed advertising can be dynamically re-targeted. The advertising can change based on the product added to the user's virtual shopping cart (e.g., based on brand, type of product, volume of purchase) or based on the time of purchase. Furthermore, the advertising may be influenced by the user's purchasing patterns, changes to the user's virtual shopping cart (e.g., which items he added or deleted), or other information. In some examples, brand owners can be involved in selecting when and how their advertising will be displayed in this process.

In some examples of our system, brand owners may be able to arrange for add-to-cart advertisements. For instance, add-to-cart advertisements can present users with a direct method for adding the product displayed into their virtual shopping cart without additional views or limitations. This can be, for instance, a banner advertisement, a pop-up advertisement or any type of advertisement. A brand owner may choose to use one type of add-to-cart advertisement, or multiple types. For example, the brand owner can have all 21-25 year olds presented with a pop-up add-to-cart advertisement, or have all 21-25 year olds presented with both a pop-up and a banner add-to-card advertisement. An add-to-cart advertisement may only be shown to a user under certain circumstances, for instance if the user is browsing products during certain time periods, or in a certain geographic location, or if the user is looking at certain types of products (e.g., beer), or if the user's age or gender meet certain predefined criteria.

In some examples of our system, users can be rewarded for engaging with the brand owner's advertising. For instance, a user can be rewarded for "clicking through" advertisements (e.g., adding an item to their cart with an add-to-cart advertisement). The reward can be, for example, eliminating the user's delivery fee, flagging an order for priority delivery, or receiving a free gift (e.g., a free bottle of soda). These types of advertisements do not present a high increase in net cost (e.g., the brand owner may not have to pay a lot to cover the user's delivery fee, but do account for significant increases in click-through rates and subsequent ROI.

Brand owners may also be able to purchase many types of advertising, such as micro-banners, highlighted or featured products, and banner advertisements, among others. In some cases, these advertisements can be updated or managed remotely.

Micro-banners can be located at the top of a page, and can display small messages and links to users. Micro-banners are relatively unobtrusive, but provide a method for communicating with users.

Highlighted or featured products can appear directly in the product browsing section of the user application (e.g., highlighted product 1142 in FIG. 11D).

Banner advertisements can include imagery, text, animations, and user rewards. Banner advertisements (e.g., separate banner 1144 in FIG. 11D) can be anywhere on the user's screen, including across the bottom.

In some examples of our system, the user application may have brand pages. For instance, the user may be able to sort products based on brand (e.g., FIG. 12). In some examples, a user may also be to able interact with a brand-specific page which can, for example, display background information about a brand, brand contact information, relevant seasonal or product-specific images, and text, images, sound, and video. In some examples, the brand-specific page will be entirely customized remotely. This can, for instance, combine the speed advantage of a native application with the flexibility of a web application.

Furthermore, brand owners can purchase space on a "featured item" page (or, this service can be provided free-of-charge to some or all of the brand owners). The featured item page may be different for different customers, or it may be the same for all customers. The featured item page can have an add-to-cart feature, and can display, for example, seasonal products or newly launched products. Interactive features, rich media objects, social-graph hooks, and even games can be delivered on demand to the featured item page (or another page) upon user request, allowing for a canvas to create a robust brand-specific experience and connect directly to consumers. The featured item page (and other pages) may also make use of data available through the system (e.g., user information, virtual shopping cart data (including what is currently in the user's cart, and what has been added and removed), general purchasing data, and a user's individual purchasing history) to more effectively define the user's experience.

Figure 33:
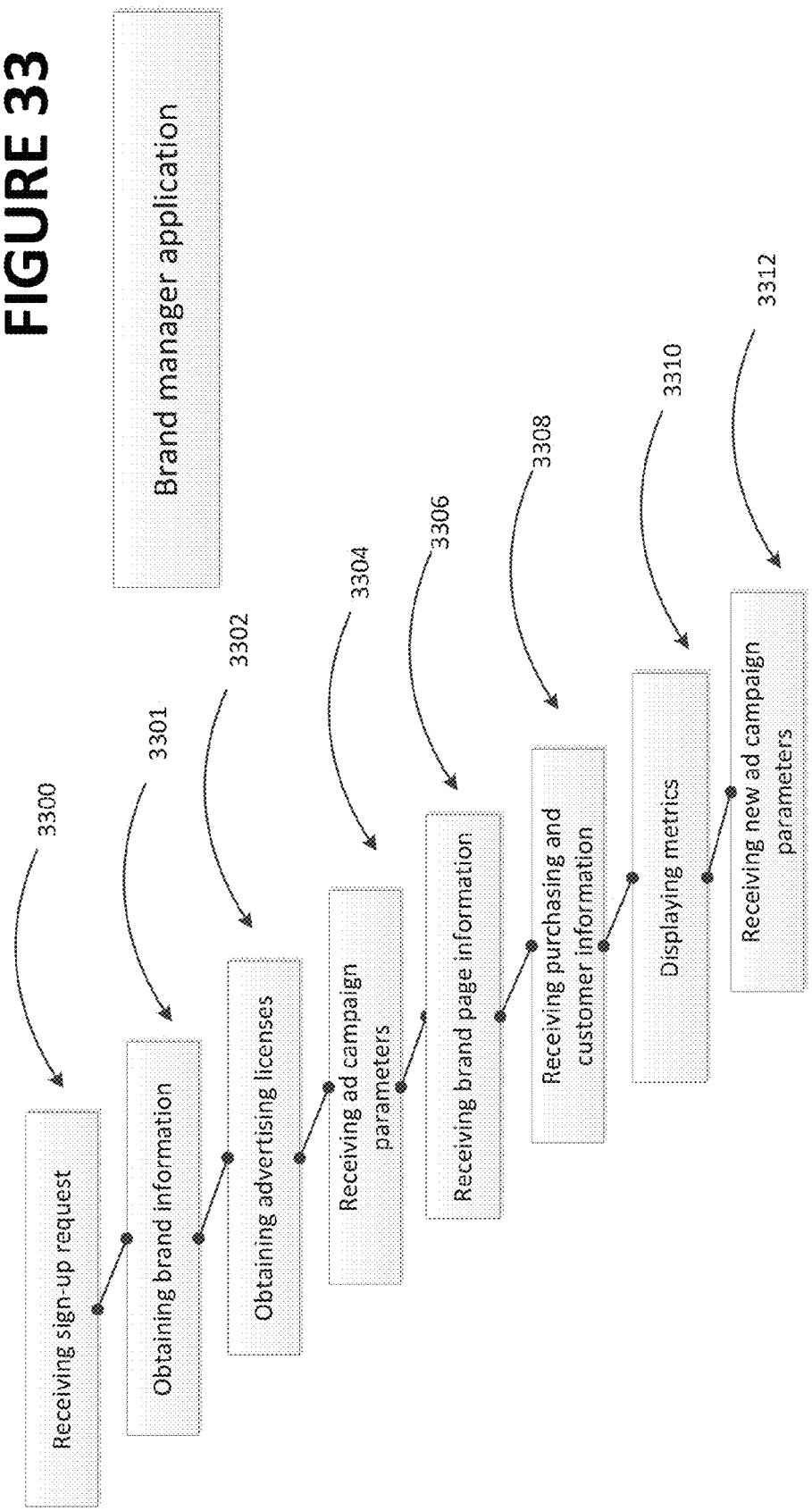

FIG. 33 shows functional block diagram of a brand manager application for some implementations of the system. In some implementations, a brand owner signs up or registers using the brand manager application (step 3300). A brand owner creates log-in information (e.g., username and password), and can enter the brand owner's account on the brand manager application using the log-in information. In some examples, the brand owner must agree to the host's terms and conditions to be able to use the brand manager application to advertise or track metrics. A brand owner may be required to prove that he is a representative of his respective brand. The brand manager application receives information from the brand owner, for instance, the products offered by the brand owner, the brand owner's contact information, and the brand owner's payment information (e.g., credit card or bank account) to be charged for advertisements (step 3301). The brand owner may obtain a license from the host to exclusively or non-exclusively market to certain demographics, during certain times, in certain areas and for certain products (step 3302). In step 3304, the brand manager inputs the parameters for an advertising campaign, including, for instance, the duration of the campaign, the types of products or product lines promoted, the types of advertisements run, and the demographics targeted. In step 3306, the brand manager creates, uploads, or edits a brand page that is viewed by the users in the user application.

In step 3308, the brand manager application receives customer information and information about customers' purchases and any activities tracked by the system (e.g., which items were added or removed from the users' virtual shopping carts, or which advertisements clicked-on or viewed and how many times). The brand owner can then view various metrics (step 3310), as described above and below. With this information, the brand owner can modify the parameters of advertising campaigns or create new advertising campaigns to advertise more effectively.

Figure 34:
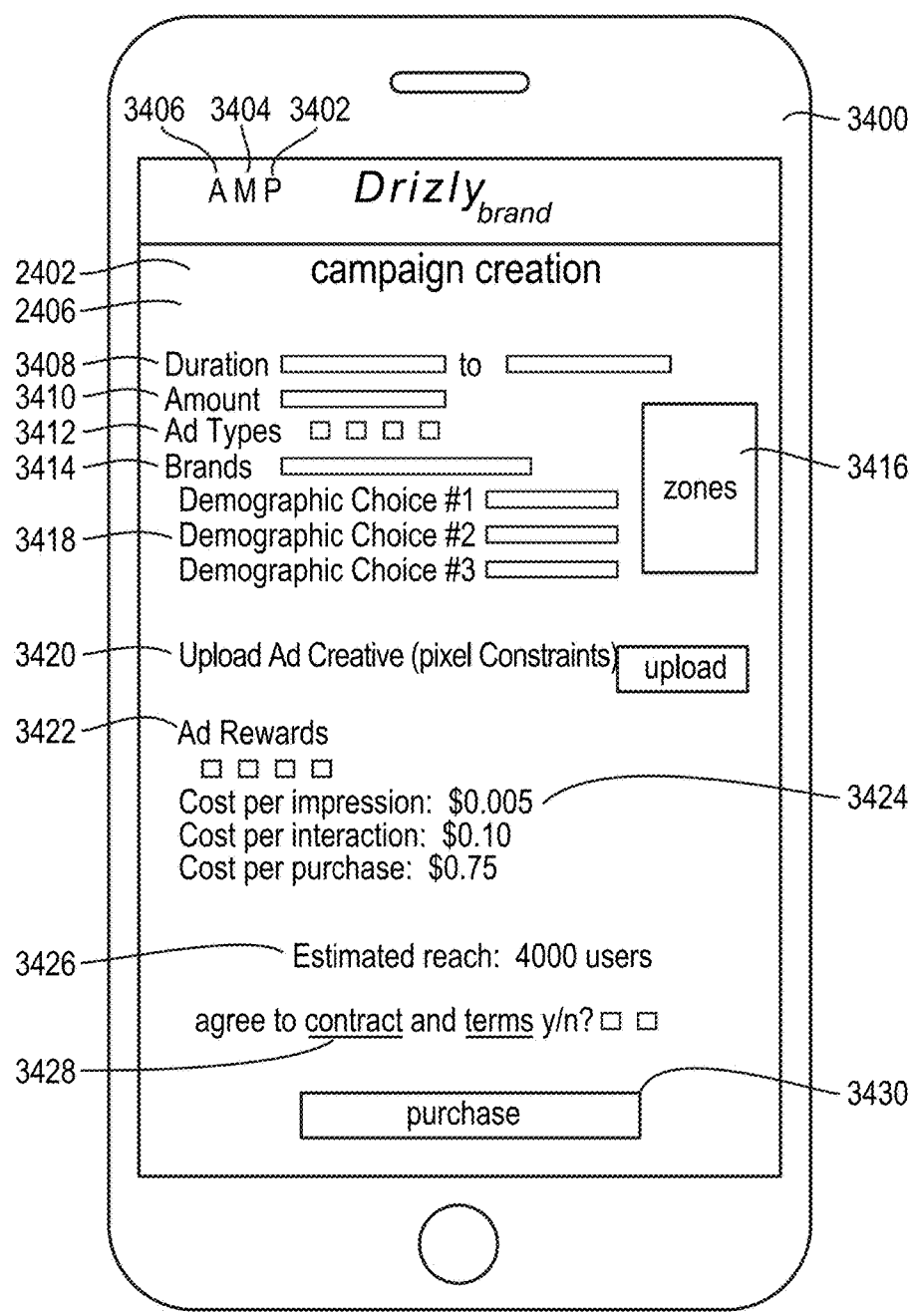

FIG. 34 shows a wireframe 3400 of a brand manager application for some implementations of the system. In this example, the brand owner clicks on the "P" button 3402 to view the advertising campaign creation section (or promotion page) of the brand manager application. By clicking on the "P" button 3402, the brand owner is brought to the promotion page like that shown in wireframe 3400. From this page, the brand owner can create and purchase a campaign. The brand owner can view a metrics page by clicking on the "M" button 3404, or the advertise page by clicking on the "A" button 3406. The metrics page and the advertise page are described below.

By inputting dates or times in the "duration" field 3408, the brand owner can define the duration of the ad campaign, from start to finish. In some examples, when the brand owner places, selects, presses on, or puts a cursor over the duration field 3408, a calendar on the screen pops-up that allows the brand owner to select dates within the calendar image. In some examples, the brand owner inputs the dates or times manually, or through any method. The brand owner can input the budget for this advertising campaign by inputting the total (or maximum) dollar amount to be spent in the "amount" field 3410. The "ad type" boxes 3412 allow the brand owner to choose the ad types he wants run in this campaign. For instance, the brand owner can check off the types of advertising he wants to run, such as banner advertisements, check out screen popups, micro-text banners, highlighted or featured products, placement within the inventory list (like shelf space in a supermarket), or any type of advertisement or combination of advertisements. In some examples, the brand owner may be a conglomerate with multiple brands, or brands with multiple product lines. In that case, the brand owner can select which brands or product lines to advertise in this campaign by inputting those brands or product lines in the "brands" field 3414. In some examples, the brand owner can choose to place advertisements in different zones on the page (or different areas of the screen on the user's device). The brand owner can select the zones by clicking the "zones" button 3416. In some examples, the brand owner may be charged different amounts of money or rates to advertise in different zones. For instance, if a banner ad is placed at the top of the user's screen as opposed to the bottom of the user's screen, there may be different advertising rates, and this could affect the "cost" fields 3424, described below. In some examples, the brand owner can choose to advertise to different demographics by inputting or selecting demographic groups in the "demographic choice" fields 3418. For example, the demographic groups or choices could include, among others:

Gender
Age
Location
Time of Day
Purchase History
Average Purchase Amount
Purchase Frequency
Average Time Spent in App.
Profession In some examples, the brand owner types in the demographic choices. In some examples, the brand owner may choose from a drop-down menu of demographic groups.

By pressing the "upload" button 3420, the brand owner can upload content (text, images, audio, or video) from their phone, computer, Dropbox, S3, or any other site. "Ad rewards" boxes 3422 allow the brand owner to select rewards that can be offered. For instance, in a special offer like that shown in the wireframe in FIG. 16B, the brand owner can select what the advertisement will offer in return for purchase of the promoted product (or any other action desired by the brand owner). Those rewards can be, but are not limited to:

Free or discounted delivery
Priority or faster delivery (e.g., delivery in under 20 minutes)
BOGO (buy one get one)
Loyalty points (to be used towards future purchases)
Free with purchase (X item is free with purchase of item)
Discounted Prices Depending on the industry, the type of product, and the local, state and federal rules, not all rewards will always be available. For instance, some state laws may not allow "buy one get one free" rewards for the sale of alcoholic beverages.

The "cost" fields 3424 display the associated cost per impression, interaction, and purchase for the previously input parameters (e.g., the chosen duration, ad types, brands, demographic groups, zones, and ad rewards). In some examples, these are the prices that brand owners will be charged for their advertising campaign. Impressions are solely when a user is presented with an ad, either as a pop up, or displayed on a page. Interactions are when a user clicks on, or otherwise interacts with an ad. Purchases are when users interact with an ad, leading to the customer purchasing the product. In some examples, brand owner are only charged for one or two of the types of advertising results (impressions, interactions and purchases). For instance, in some examples, brand owners may only be charged if the customer actually purchased the brand owner's product through the advertising.

In some examples, the brand owners will be presented with an estimate of the total number of customers that will be reached with the ad campaign if they proceed with the parameters currently inputted. This estimate is displayed in the "Estimated Reach" field 3426. In some examples, if the brand owner would like to reach a fewer number or a greater number of customers or potential customers, he can adjust the parameters (e.g., extend or shorten the duration of the ad campaign, change the types of ads, choose different demographic targets (or no demographic targets), or offer different types of ad rewards).

The "contracts" link 3428 links to the contract agreed to by the brands as well as the terms and conditions for use. In some examples, the brand owner must agree and give consent to the terms and conditions for use, and the contract, to purchase the campaign. By pressing the "purchase" button 3430, the brand owner purchases the campaign.

Figure 35:
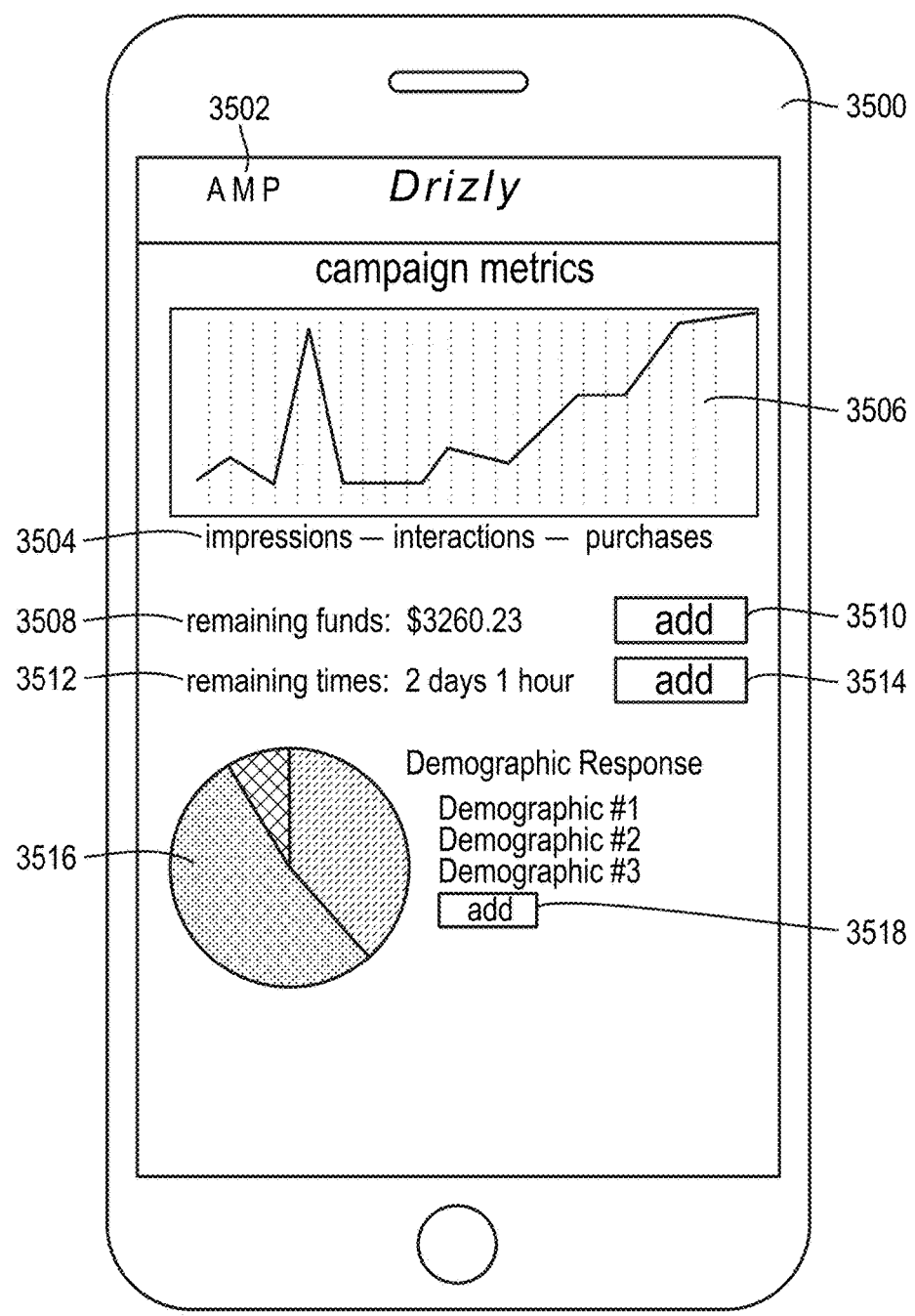

FIG. 35 shows a wireframe 3500 of a brand manager application for some implementations of the system. The wireframe 3500 shows the metrics page, for example, the screen that a brand owner would see after pressing the "M" button 3404 shown in FIG. 34. The metrics page allows brand owners to track various metrics about their campaign, and to determine the reach and effectiveness of their advertising. The "advertising costs" buttons 3504 allow brand owners to toggle between different types of advertising costs—for instance, cost-per-impression, cost-per-interactions, and cost-per-purchase. This may allow the brand owner to see how many of each type of cost been incurred. Graph 3506 is a graphical representation of the data, for instance, the numbers of each impression, interaction, or purchase over time. The "remaining funds" field 3508 displays the remaining amount of funds budgeted for the campaign, and the brand owner can add funds by pressing the "add funds" button 3510. The "remaining time" field 3512 shows the amount of time remaining for the campaign, and the brand owner can extend the campaign by pressing the "add time" button 3514. Graph 3516 shows a graphical representation, for instance, of the demographic breakdown of those customers who have responded to the ads. By pressing the "add" button 3518, the brand owner can add or remove a demographic from the chart.

In some examples, the metrics page shows the various metrics for a single campaign run by the brand owner. In some examples, the metrics page simultaneously shows metrics for multiple campaigns run by the brand owner. In some examples, the brand manager application allows the brand owner to compare his metrics to the metrics of the average campaign run by all brand owners, or a subset of brand owners (e.g., brand owners who sell wine products) or a subset of campaigns (e.g., campaigns of a similar scope and budget). In some examples, the brand owner can view the raw data for the results of his campaign, and can manipulate that data in various ways (e.g., generate different or additional graphs for certain specified time periods, times of day, products, or demographics). In some examples, the brand owner can see graphs of numbers of impressions, interactions or purchases by driver, store, or any variable.

Figure 36:
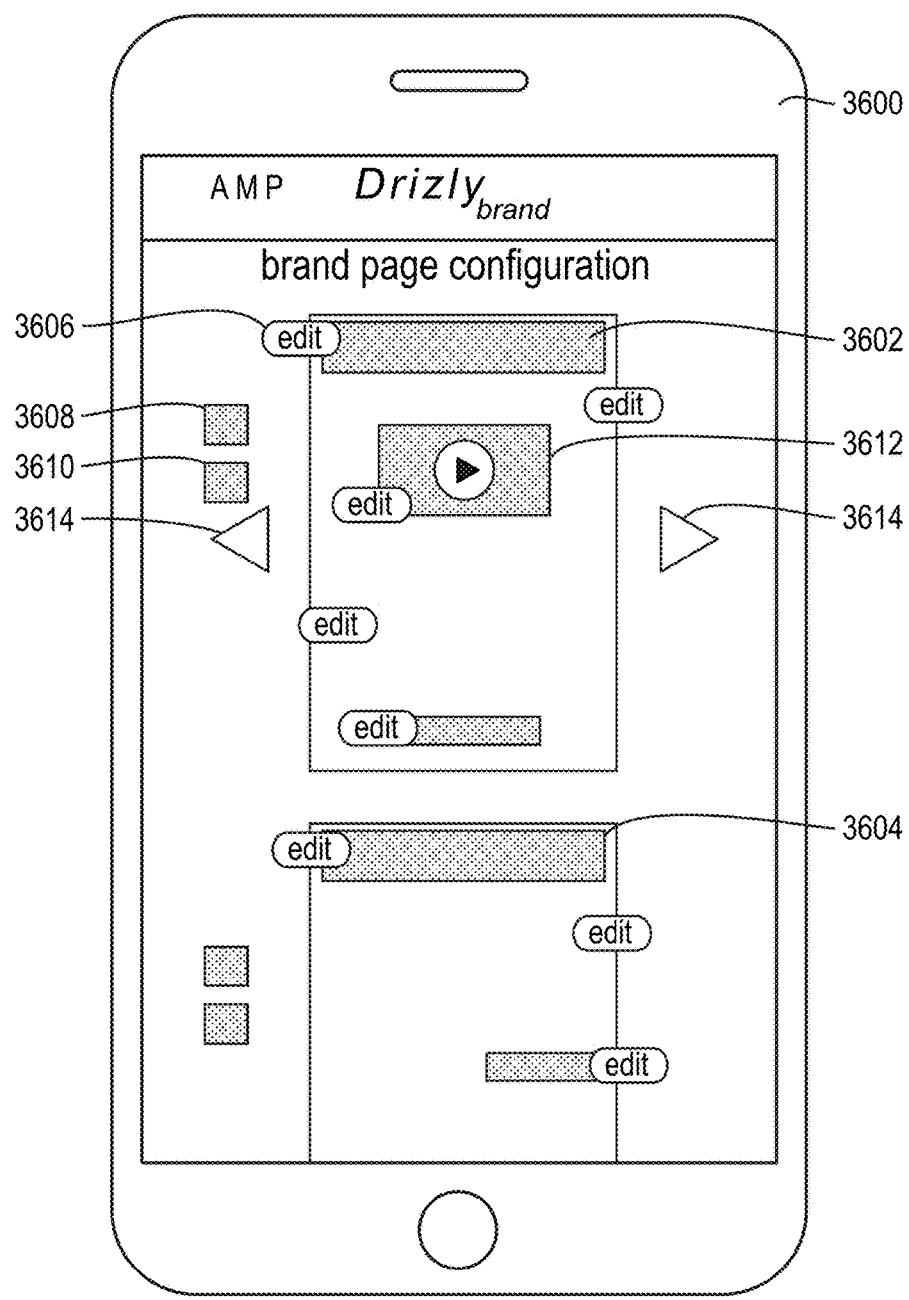

FIG. 36 shows a wireframe 3600 of a brand manager application for some implementations of the system. The wireframe 3600 shows the advertise page, for example, the screen that a brand owner would see after pressing the "A" button 3406 shown in FIG. 34. The advertise page allows brand owners to design their brand page inside the user application. The home brand page 3602 can allow users to link to additional brand pages 3604. This allows for more than one static brand page. The "edit" buttons 3606 allow the brand owner to customize or select different aspects of the brand page. For instance, the brand owner may customize or edit, the header logo, background color or image, video, and footer link. In some examples, an "on" toggle 3608 and an "off" toggle 3610 allow the brand owner to toggle on and off certain features, like the ability to add pages 3604, videos, header or any item that is editable. Each item that is editable may have a corresponding on/off toggle. Field 3612 allows brand owners to view, delete or upload video, in some cases with the capability to link to YouTube or other sites. By pressing the arrows 3614, the brand owner can toggle between various templates. In some examples, a brand owner will be presented with a preset number of templates, perhaps each with a different pricing structure. In some examples, the brand owner can upload a brand page designed with any available software.

Some examples of our system involve an inventory management and point-of-sale (POS) system (a "POS system"). This can be a full scale inventory management system for a store. In some cases, purchases made through the system (e.g., liquor ordered through the user application) can be tied to a store's inventory and purchase system, so that inventory in the user application and on the host servers remain up to date with both purchases and restocking.

The POS system could have all the capabilities of a current POS system, while allowing for the possibility for customers to order through the user application and pick up in-store or have products delivered. The POS system allows a store to easily incorporate an all-in-one system for purchasing, and can be paired with delivery infrastructure. Furthermore, the POS system may allow stores to engage in cashless transactions and customer loyalty programs.

Figure 37:
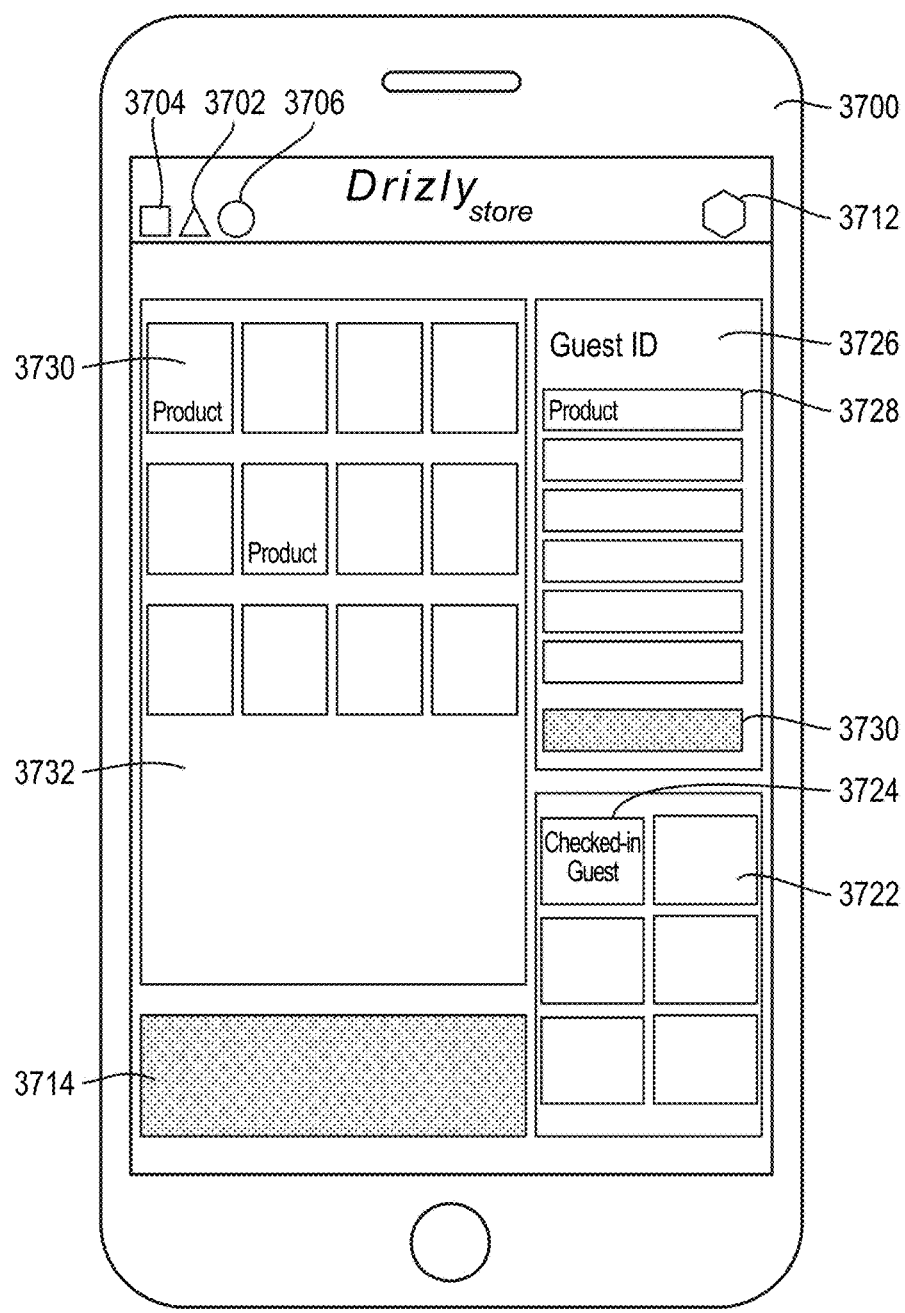
Figure 38:
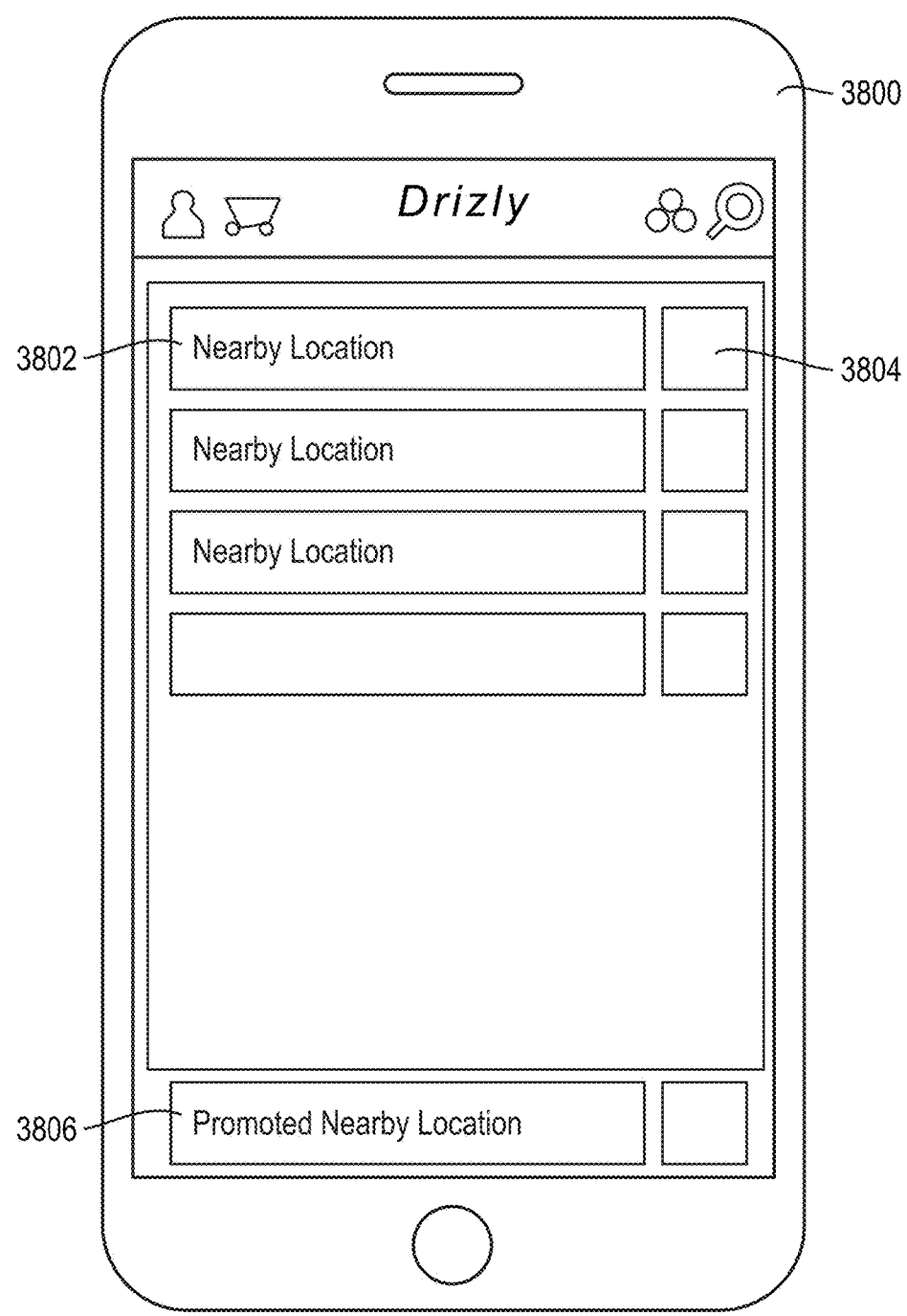
Figure 39:
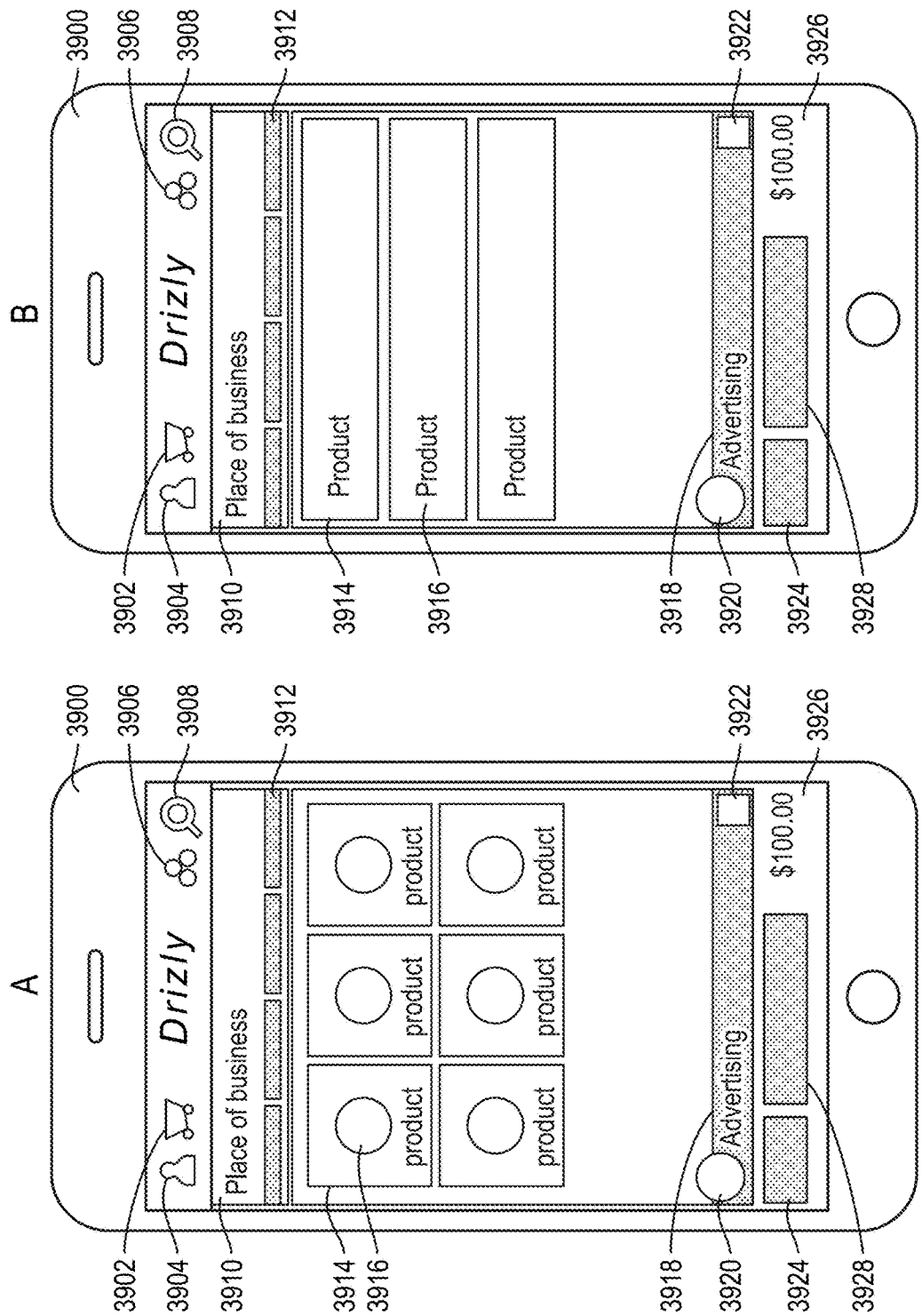

FIG. 37 shows a wireframe 3700 of a POS system for some implementations of the system. When a store manager opens the POS system, he will be able to see the store's account by clicking the "store account" button 3702. The store's account is an account (including profile information) on the system that has elevated permissions. The account information may be stored in a user table or a store user table in the system databases. The store manager can also see settings associated with the system or the host by clicking "host" button 3704. These settings could include how often the store wishes to receive updates about orders, or how the store wishes to customize or modify the appearance, layout or ordering of buttons (e.g., 3704, 3712) or any aspect of the POS system. These settings could also allow store managers to manage automated services like tallying of orders (e.g., allows the store manager to re-set the tally) or restocking. For example, a store could incorporate software to automatically place a purchase order with the store's supplier, by an automated email, or to enable the store manager to make a note of any item that drops below a certain quantity or is sold out. The flow of inventory can be automated beginning with the decision to purchase more based on preset factors (order interval, quantity, etc.).

By clicking the "loyalty" button 3706, the store manager can track and manage the store's loyalty programs. For instance, a store may offer users a reward based on the frequency of purchases, the type of purchases or the time of purchases. By clicking "loyalty" button 3706, the store manager can, for instance, set the number of purchases required to receive a reward, and the store manager can select the nature of the reward (e.g., a 10% off coupon).

By selecting the "support" button 3712, the store manager can navigate to a support page, for instance listing the contact information for technical support.

The standard POS menu 3714 contains standard POS buttons for individual transactions, such as exit transaction, delete transaction, start transaction, manual input, "cash, credit, check or other form of payment" (for those transactions that are not through the user application), and finalize transaction, among others. In some cases, the standard POS buttons allow store managers to close out the totals for the day's purchases.

"Quick pick" field 3722 shows the "checked-in guest" accounts 3724, which are the accounts for users that have been checked-in to the store using the user application (as described below). When a user that is checked-in to the store is ready to checkout, the user brings his products to the store's checkout counter, and the store manager (or cashier) can select the user's account (his "checked-in guest" account 3724) from "quick pick" field 3722. In some examples, the user's "checked-in guest" account 3724 is selected by scanning the user's ID, or by entered a number associated with the user. In some examples, the user's "checked-in guest" account 3724 is selected manually by the store manager (or cashier) from the list of "checked-in guest" accounts in "quick pick" field 3722.

Once the user's "checked-in guest" account 3724 is selected, the user's information appears in guest ID window 3726. In some examples, guest ID window 3726 helps to reconcile users that have checked into the store with their phone or mobile device, a process described below. For in-store purchases, it is important that the store employee who is checking customers out matches the accounts correctly, so the store employee does not check out the wrong person by mistake. The guest ID window displays the customer information if the store wanted to ask the customer for an ID to make sure they did not, for example, steal someone's phone. The "product" field 3728 shows products in the user's shopping cart (i.e., the products that the user listed in guest ID window 3726 has added to his virtual shopping cart). Field 3730 shows the dollar total and subtotal for the products in the user's shopping cart.

In some implementations, the user adds items to his virtual shopping cart (e.g., by browsing and selecting products, or by scanning a product's bar code), and they appear in "product" field 3728. If the user has added products to his physical shopping cart as he added products to his virtual shopping cart, the cashier may check to ensure that the products in the user's physical shopping cart match the products in his virtual shopping cart (as displayed in "product" field 3728).

In some implementations, the user adds products to his physical shopping cart and the store manager (or cashier) adds products to the user's virtual shopping cart. For instance, the store manager (or cashier) may manually select or scan the items in the user's physical shopping cart, and the products will be added to the user's virtual shopping cart (and the "product" field 3728).

The store's products 3730 are listed for manual selection (e.g., when a customer is checking out) in a product quick select window 3732. The store manager (or cashier) can select a product to add to the user's virtual shopping cart (or can confirm that the product is in the user's virtual or physical shopping cart) by selecting a product 3730. Items added to the user's virtual shopping cart are shown in "product" field 3728. In some examples, once all the items are added to the user's virtual shopping cart (or confirmed by the store manager or cashier), the user can complete the checkout process by, for instance, pressing a "checkout" button within the user application on the user's device. In some examples, the user completes the checkout process using a store's device. For instance, a user may be able to checkout by pressing his thumb onto a pad that scans his fingerprints at the checkout counter.

A store manager may be able to customize the products 3730 listed in the product quick select window 3732. For instance, the store manager can have the most frequently purchased products 3730 displayed, or the store manager can have the user's most frequently purchased products 3730 displayed. In some examples, the products 3730 can represent multiple sub-categories of products, and the store manager (or cashier) can search for products by expanding sub-categories until the product he wishes to add is displayed. In some examples, any product that is scanned with a barcode scanner is automatically added to the product quick select window 3732.

In some examples, products 3730 that a customer wishes to purchase can also be scanned by scanning a product's barcode or using any method or combinations of methods.

In some implementations of the system, users can choose to purchase items from within a physical store. In some examples, users select products while walking the physical aisles in a store, and either adding the selected products to the user's virtual shopping cart or physical shopping cart (or both). In some examples, products selected in the physical store are delivered by a driver to the delivery address. In some examples, the users take the items with them. In some examples, users select items using the user application and pick up the products in the physical store, or any location. In some cases, a user can select items in the store and add them to her account by scanning the bar codes or using NFC technology to add items.

Using the POS system, store owners and others (e.g., brand owners) may be able to enjoy the same metric tracking and advertising benefits that they enjoy when users use the user application and have products delivered. As mentioned earlier, the point-of-sale system can include and provide the features of the retail store manager application.

In some examples, once a user allows his phone or device to find his location (e.g., using a GPS), or once a user inputs his location manually (e.g., by entering a city and state or a zip code), the user is able to see which stores (or other locations selling products or services) offer in-store purchases in his territory (e.g., in his geographic location). By checking into a store through the process described below, a user can be connected to the POS system of the store. In some examples, a user can purchase items from his mobile phone (or other portable devices with the user application) from within the store. In some examples, a user can purchase products using a device outside the store (e.g., a home computer) and pick-up his purchases in the store. The same software, processes, and user-interfaces can be applied to purchases within a bar or a night club, or in any location that sells products or services.

FIG. 38A shows a wireframe 3800 of a user application for some implementations of the system. FIG. 38A shows what users may see when they open the in-store purchase section of the user application. The store list 3802 shows the nearby stores from which users can make purchases. By tapping on the "select store" button 3804, users can select a particular store from the store list 3802. In some examples, one store may be highlighted or promoted. For instance, the store may pay a fee to have its name highlighted or promoted, or a store with a high rating may be highlighted or promoted. In FIG. 38A, the promoted store 3806 can be selected by pressing the "select store" button 3804.

In some implementations, once the user presses the "select store" button 3804, the user's "checked-in guest" account 3724 appears in the "quick pick" field 3722 in the store's POS system, as shown in FIG. 37.

In some implementations of the system, the user first inputs the products or types of products he wants to purchase, and then the user application presents the closest stores that allow in-store purchases of those products or types of products. In some examples, the user is presented with a list of all stores in the user's territory that allow in-store purchases. In some examples, the user can sort the list of nearby stores by store type, store rating, store size, store hours of operation, store location, or any factor or combinations of factors.

As described above with the product delivery system, a store may purchase an exclusive license for in-store purchases from the host. In some examples, a store may purchase a non-exclusive license or one of a small number of licenses. For instance, the host can authorize only 2 stores in a certain geographic area for in-store purchases. The host may allow any number of stores or all stores to enable in-store purchases. The host may license certain stores for certain hours, certain customer demographics, certain products or certain periods of time, or a combination thereof. For instance, store Z may only be licensed to sell to 21-25 year olds on Sundays. Therefore, if a 23 year old user searches for stores on a Saturday, store Z may not appear on the user's list of stores for in-store purchases. In some examples, the store may appear, but will have a note saying that in-store purchases are only available on Sundays. In some examples, the host may allow all interested stores to sell all products during all times using the in-store system.

In some examples, the store may pay the host a fee to use the in-store system. This can be a flat fee (e.g., X dollars per month or per year) or it can be a percentage of sale or fee per transaction, or a combination of fees. In some examples, the in-store purchasing system is free to stores that have purchased a license for the delivery system. Any fee arrangement can be used.

Once a user has selected the store from which he would like to make a purchase, he may be directed to a product selection screen, like that shown in the wireframes 3900 in FIGS. 39A and 39B. "Cart" button 3902 allows a user to toggle between his virtual shopping cart and the product selection screen. By pressing the "profile" button 3904, the user is directed to the user's profile screen, where the user may be able to add and delete payment information (e.g., credit card information), and update any user information. By pressing the "check-in" button 3906, the user checks-in to a store (e.g., a bar, club or liquor store). In some examples, the user is automatically checked-in once he selects a store from a screen like that shown in FIG. 38. By pressing the "search" button 3908, the user can search for products to purchase. The "place of business" bar 3910 indicates the store (or other place of business) whose products the user is browsing. For instance, if the user is browsing the products available in the Acme store, the "place of business" bar may read "Acme Store." Product tabs 3912 allow the user to sort products by type (e.g., a wine tab, a beer tab or a liquor tab), by rating, by price range, by brand, or by any other factor or combination of factors. The product box 3914 lists the available products 3916. Products 3916 can be presented in a grid, like in FIG. 39A, or in a list, like in FIG. 39B. In some examples, a user can toggle between different views (e.g., lists or grids). In some examples, the products 3916 are listed with a picture, with a short description, or with a product number or model number, or with a combination of identifiers.

In some examples, advertisers (e.g., brand owners) can advertise in the in-store purchase section of the user application. For instance, a banner ad 3918 may appear with advertising text and an advertising image 3920. In some examples, users can add an advertised product directly to their cart by pressing the "add" button 3922 within the ad. In some examples, any type of ad can be displayed to the user, including special offers (like those described for the delivery system).

The user may be able to empty his cart by pressing the "empty cart" button 3924. "Total cost" field 3926 may display the total cost (either with or without tax) for the items in the user's virtual shopping cart. The user can proceed to a checkout page by pressing the "checkout" button 3928.

In some examples, the user can add items to his virtual shopping cart by scanning or taking a photograph of physical products in the store. For instance, the user may pick up a bottle of vodka that he would like to purchase, and use his mobile phone to snap a picture of the barcode. The user application software may then process that image and add the product to the user's virtual shopping cart. The user can add the physical item to his physical shopping cart.

In some examples, the products available in the in-store purchase section of the user application are the same as the products available in the delivery section of the user application. In some examples, stores may have different or additional product offerings in the in-store purchase section and delivery section of the user application. In some examples, a store may only offer its products for in-store pick-up, but not for delivery, or vice versa.

In some examples, the in-store purchase section and the delivery section of the user application are integrated, and the user is simply given an option at check-out to choose delivery or in-store pick-up.

Figure 40:
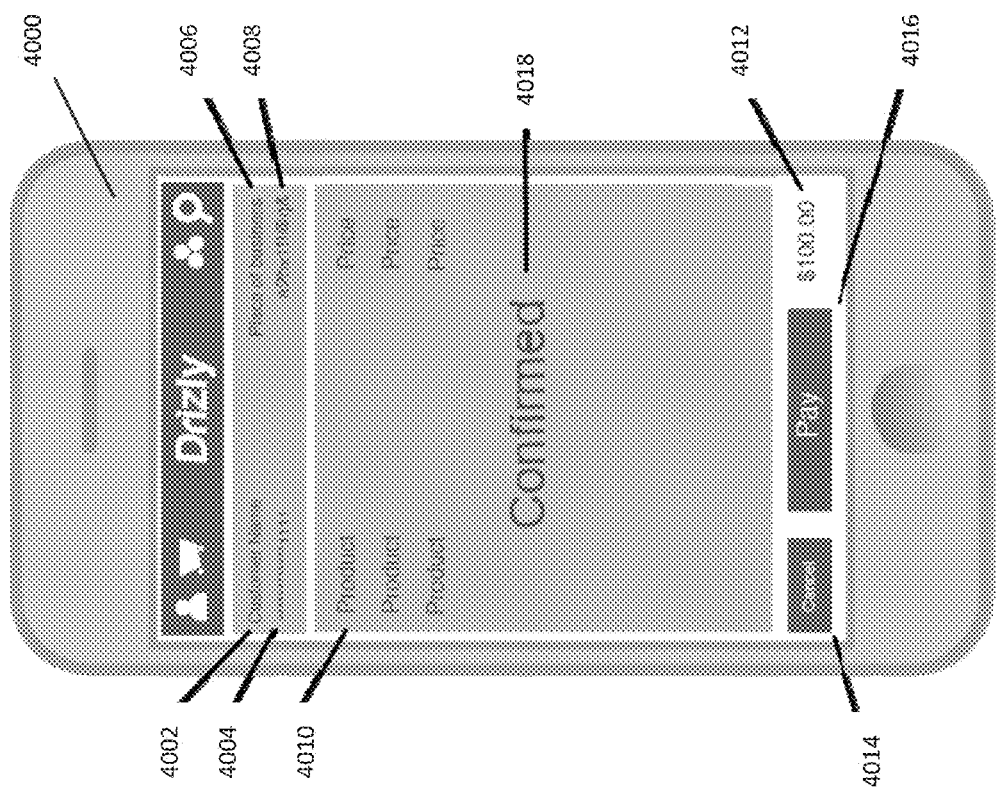

Once a user has selected what he wants to purchase, he then checks-out. FIG. 40 shows a wireframe 4000 of an in-store purchase section of a user application for some implementations of the system. The user may reach a "check out" screen like wireframe 4000, for instance, by pressing the "checkout" button 3928 shown in FIGS. 39A and 39B. The "customer name" field 4002 displays the user's name and the "payment information" field 4004 shows the credit card or other payment method that will charged for this purchase. The "place of business" field 4006 displays the name of the store from which the user is making a purchase. In some cases, a security feature 4008 is displayed. In some cases, once the user has selected a store, the store's POS system registers the user in a customer queue. In some cases, the security feature is a random set of letters and number that the user presents to the store to verify to the store that the correct user is picking up the order. In some cases, the set of letters and numbers will be specific to a given user, and will rotate every 60-600 seconds. The products 4010 in the user's virtual shopping cart are listed. The total purchase price (with tax, without tax or both) for the items in the user's virtual shopping cart is shown in the "total" field 4012. The user can cancel the order by pressing the "cancel" button 4014, or can pay for the order by pressing the "pay" button 4016. Once payment has been processed, a confirmation message 4018 may appear on the user's screen or on the POS system (or both). For instance, confirmation message 4018 may notify the store manager (or the cashier) or the user (or both) that the user's credit card has been successfully charged. Confirmation message 4018 that the may be a push notification or embedded within the page.

In some examples, a user can verify to the store that the correct customer is picking up the order with a matching thumbprint, retina scan, secret password, or any method used to uniquely identify a customer. In some cases, the user can verify to the store that the correct customer is picking up the order by presenting the credit card used to purchase the products, or by presenting a government issued ID with a name matching the customer name.

Note that the POS system may be used independently of any other aspect of our system. It can be used by any store, individual, organization, or any entity or individual that maintains inventory or sells products or services.

The host, through the host server, host application and other applications, can maintain and manage a database.

In some examples, customer information is stored in the database. For example, the database can include a "users table" to store user information such as users' emails, names, hashed passwords, delivery addresses and delivery phone numbers, or additional customer information or combinations of customer information. In some examples, this customer information (or some subset of the information), along with sensitive information such as a credit card number, is encrypted and stored within servers maintained by a third party payment processor. In some examples, storing credit card information in third party payment processor servers allows the host to be compliant with Payment Card Industry (PCI) Data Security Standards. In some examples, storing credit card information with third party payment processors expedites the checkout process by only requiring a user to input payment information upon registration. In some examples, when a user wants to update his customer information, the client sends an UpdateProfile web service that mirrors changes made to both the host database customer information and the customer information stored at the third party payment processor. The two values (information in the "users table" and at the third party payment processor) can be connected by a stored payment processor ID, which can be stored in the "users table."

The fields of information stored by PG and mirrored to the database table for customers stored by the system host and used for payment processing were listed earlier.

The database stored on the host servers can include sales data from every transaction throughout the system, and can allow the data to be easily collected and analyzed. Among the many types of information that can be stored in the database are what products are being sold, which type of customer is buying, and when and where said customers are buying.

Access to this data is especially important in the alcohol distribution business. Generally, in almost all states in the United States, the alcohol industry is currently broken into a three-tier distribution system: producers are only able to sell to wholesale distributors, who in turn can only sell to retailers. Because of the three-tier system, alcohol distribution in the United States generally only allows retailers to sell alcohol directly to consumers. This puts the host in a unique and beneficial market position: the host can offer brands the ability to promote and advertise specifically to the consumers they are targeting. For instance, the host can offer Coors the chance to advertise to any customer that has purchased a Miller product in the past 3 weeks. The data in the host's database can be used in many ways, including increasing the accuracy of product discounts and tailoring exactly which customers in a certain area see a specific advertisement at a specific time.

The host can view many different metrics with the data in the database. For instance, the host may be able to view all the metrics visible to the store managers and brand owners and others within the system. For instance, the host may be able to view various turnover metrics, like transactions per period (e.g., transactions per day, per week, per month, and per day of the week). The host may also be able to view transactions per product. Transactions per product metrics could be based on general product types (e.g., beer, liquor, or wine) or more specific product types (e.g., light beer, vodka, or Cabernet Sauvignon). Transactions per product metrics could also be based on brand (e.g., Budweiser, Bacardi, or Twenty Bench) or product price (e.g., number of $40+ transactions, or number of $20-$40 transactions). The host can view metrics for the number of transactions per specified time interval (e.g., number of transactions from 3 pm-6 pm) or the number of transactions based a demographic variable (e.g., number of transactions based on gender, age, or place of residence).

In some examples, hosts could also view margin metrics, like the average total transaction price or the average total transaction price for a specific time interval (e.g., comparing the average transaction price between 3-5 pm and 5-7 pm). The host could also view margin metrics like average total transaction price per product type. Again, these metrics can be based on general product types (e.g., beer, liquor, or wine), more specific product types (e.g., light beer, vodka, or Cabernet Sauvignon), or brand (Budweiser, Bacardi, or Twenty Bench). The host may also be able to view metrics such as maximum transactions (e.g., most money spent on a single order, or most products purchased in a single order) and minimum transactions. Maximum and minimum transactions could be determined overall, or per demographic variable, time period, time interval, product type, or brand. The host could also view the cost per transaction, including delivery cost and margin information where available.

Delivery metrics may also be available, including the average delivery time per order, the average delivery time per order in a specified time interval, the average delivery distance, the maximum delivery distance, and the minimum delivery distance.

In some examples, the host may be able to view and generate visualizations based on the data in the database. This can include graphical representations (including maps, charts, animations, pictures, diagrams and other visualization) of all the metrics. The host may also be able to generate visualizations of how different metrics change over time (e.g., the change in average total transaction amount per day over a monthly time frame).

In some examples, these metrics are displayed in graphical form. In some examples, the metrics can be displayed in lists, in spreadsheets, graphically or using any other method of visualization. In some examples, the metrics can be displayed as they change over time (e.g., average sales from 5 pm-7 pm over a month time frame). In some examples, the host may be able to easily share the metrics with other others, such as advertisers, investors, customers or potential customers.

Some examples of our system operate in highly regulated industries (e.g., the alcohol distribution industry). It is important to note several legal considerations. The system can operate within the legal system completely, and adhere to all rules and regulations.

For example, the system can operate legally within the alcohol distribution industry. First, the host does not need to own part of, or an entire, liquor license. This is possible because the host does not need to be directly involved with the alcohol products. The host does not need to hold, transport, or profit directly from the sale. In some examples, at no point in time does the host or a host employee need to come in contact with the physical product. In some examples of our system, it is only the liquor stores that sell the product, interact with customers, record the sale, and risk their license. This system can provide a new medium to reach customers. Second, it is possible for the host to have insurance and legal representation specific to the alcohol distribution industry. The insurance can protect the host against the risk of possible suit. Third, the host can require that all sales involve the use of the ID verification software and ID guidebook application. In some cases, the host can provide (free of charge or for a fee) a device, with a scanner, preloaded with all the necessary software. The host can require that every ID for every delivery from every store be verified and recorded before the alcohol is successfully delivered. The host can also empower the stores and the driver with the right to refuse delivery to anyone underage.

Figure 54:
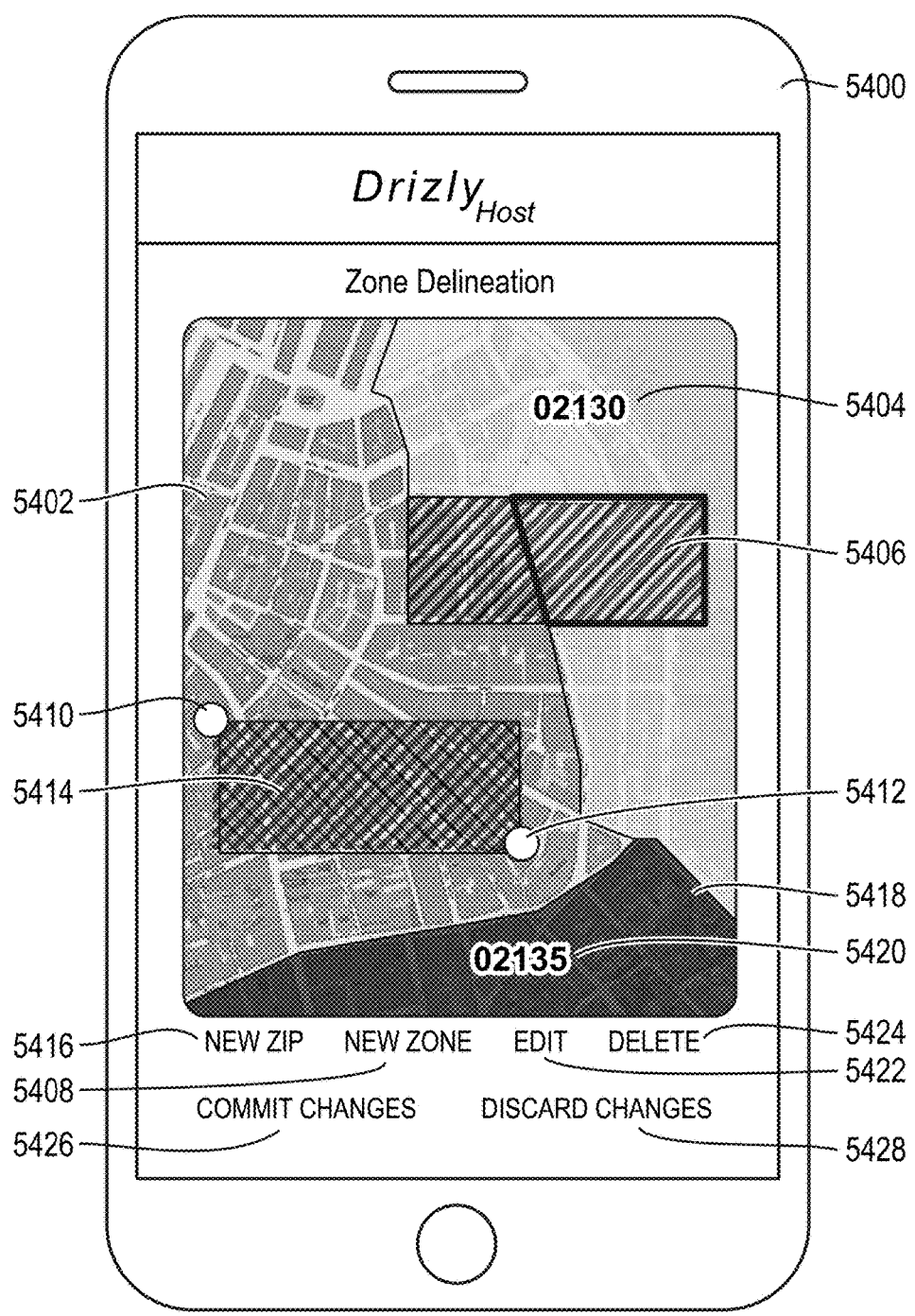

FIG. 54 shows a wireframe 5400 of a host application on a mobile device for some implementations. From this screen, a host may be able to create, edit or delete geographic zones or territories for licensing. For instance, map 5402 contains an outlined zip code area 5404, which shows the area of the map covered by zip code "02130." A selected geographic zone 5406 may be overlaid on the outlined zip code area 5404. In some implementations, selected zones take preference over zip codes areas. This may mean that one store manager or brand owner may exclusively license the zip code "02130" defined in outlined zip code area 5404, except the area defined by selected geographic zone 5406

(which is overlapping). A host may be able to create a new selected geographic zone by pressing the "new zone" button 5408. The store manager can then select the selected geographic zone by dragging or moving the upper left select 5410 and the bottom right select 5412 to the desired locations on map 5402. The new selected geographic zone 5414 will then appear on map 5402. A host may create a second outlined zip code area by pressing the "new zip" button 5416. Second outlined zip code area 5418 corresponds to a second zip code 5420 (here, "02135"). Each selected geographic zone 5406, 5414 and each zip code area 5404, 5418 may be licensed to the same or different entities (e.g., brand owners or retail stores). The selected geographic zones 5406, 5414 and zip code areas 5404, 5418 may be broken down into various exclusive or non-exclusive licenses. For instance, retail store A may have the exclusive license to sell beer in selected geographic zone 5406, and retail store B may have the exclusive license to sell wine in selected geographic zone 5406. Selected geographic zones and outlined zip code areas may be edited using the "edit" button 5422 or deleted using the "delete" button 5424. The "commit changes" button 5426 will save the changes made since the last save, and the "discard changes" button 5428 will discard the changes since last save.

Figure 5:
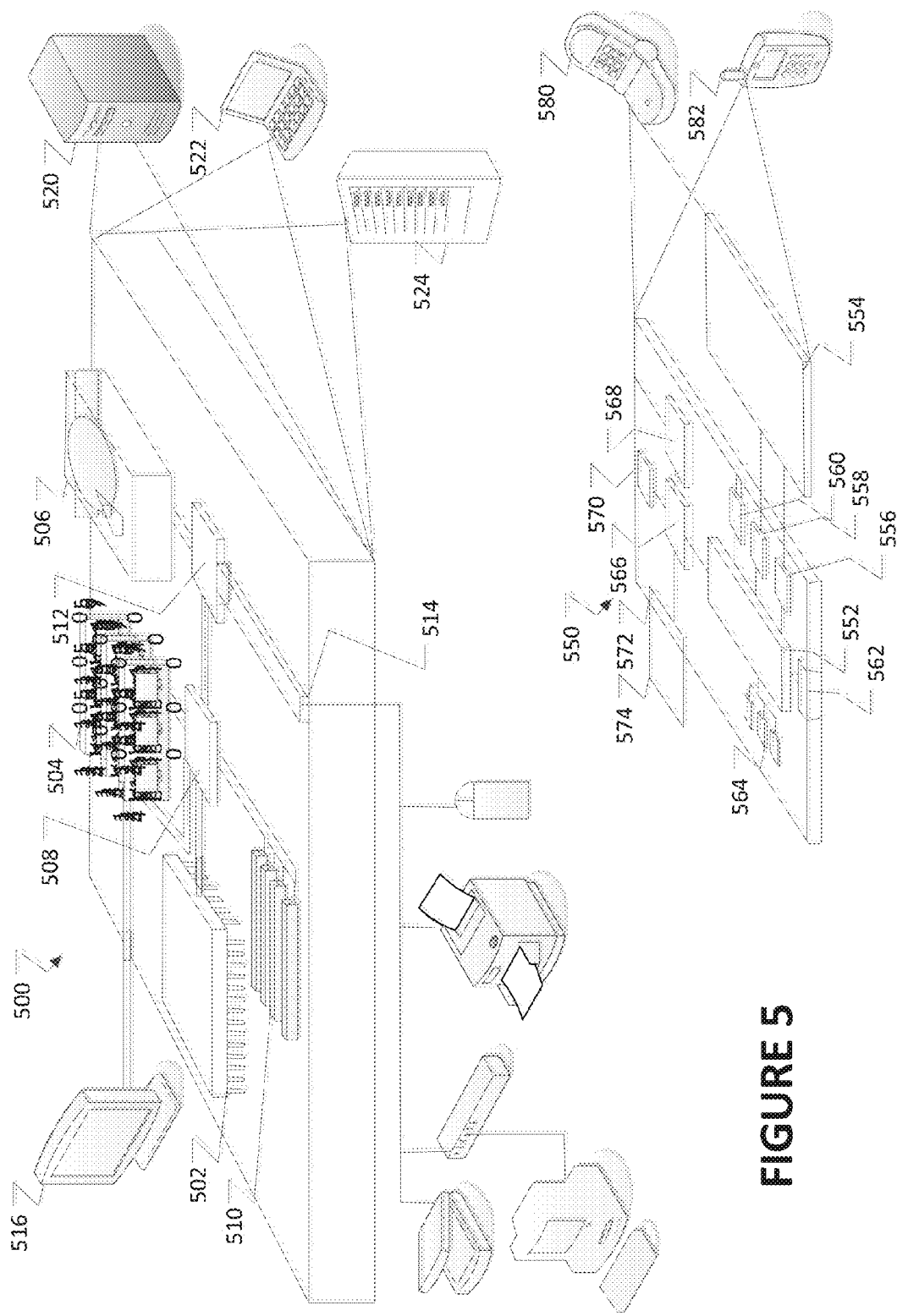

FIG. 5 shows an example of a computing device 500 and a mobile device 550, which may be used with the techniques and system described here. For example, referring to FIG. 2, the devices 202, 206, 210, 214, 222 could be examples of the computing device 500 or the mobile device 550, and the server 218 could include one or more computer devices 500. Computing device 500 is intended to represent various forms of digital computers, such as laptops, desktops, workstations, personal digital assistants, servers, blade servers, mainframes, and other appropriate computers. Mobile device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a person through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a person. The control interface 558 may receive commands from a person and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550.

Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a person and convert it to usable digital information. Audio codec 560 may likewise generate audible sound for a person, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a person, the systems and techniques described here can be implemented on a computer having a display device (e.g., a CRT (cathode ray tube) or LCD (liquid crystal display) monitor) for displaying information to the person and a keyboard and a pointing device (e.g., a mouse or a trackball) by which the person can provide input to the computer. Other kinds of devices can be used to provide for interaction with a person as well. For example, feedback provided to the person can be any form of sensory feedback (e.g., visual feedback, auditory feedback, or tactile feedback). Input from the person can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a person can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are also within the scope of the following claims.

The invention claimed is:

1. An apparatus comprising
a terminal at a supplier, the terminal configured for communication with a system for (a) receiving order information, and (b) determining a territory that is served by the supplier, the terminal comprising:
   a user interface configured to (a) display information about products available for sale, by the supplier, at locations within the territory served by the supplier and (b) display order information received from the system about products to be sold to customers within the territory,
   a communication facility configured to (a) communicate with mobile devices of people who sell the products to the locations in accordance with the order information received from the system, and (b) collect, from one or more scanning devices, data representing customer identification (ID) cards of customers to whom products are sold, and
   A processor configured to:
      automatically track inventory of the products at least partly based on location-related wireless data received through the communication facility from the mobile devices;
      manage information about customers and sale locations of the orders;
      transform the collected data representing the customer ID cards into metrics indicative of customer demographics and geography of order sales;
      generate an interactive map for display based on the metrics indicative of customer demographics and geography of order sales;
      receive a user request for one or more metrics associated with a particular geographic zone of the interactive map; and
      provide, in response to the user request, the one or more metrics that are associated with the particular geographic zone, wherein the user request includes data indicative of user interaction with the processor-generated interactive map, the data indicative of user interaction defining the boundaries of the particular geographic zone.

2. The apparatus of claim 1, wherein the terminal comprises a point of sale terminal.

3. The apparatus of claim 1, wherein the communication facility is configured to also communicate with a server that maintains information about the products, orders, customers, and sales on behalf of the supplier.

4. The apparatus of claim 3, wherein the communication facility is configured to also communicate order information to a payment processor.

5. The apparatus of claim 1, wherein the supplier has a right, exclusive relative to other suppliers, to sell the products within the territory.

6. The apparatus of claim 5, wherein the territory comprises a geographic area.

7. The apparatus of claim 5, wherein the territory comprises a brand of products.

8. The apparatus of claim 1, wherein the user interface is configured to also receive payment information about the products to be sold.

9. The apparatus of claim 1, wherein the communication facility is configured to instruct at least one of the mobile devices to not sell a product to a particular consumer, based on a customer ID card for that particular consumer being unverifiable or based on a system being unable to verify an age of the particular consumer from the customer ID card.

* * * * *